United States Patent [19]

Martin et al.

[11] Patent Number: 4,481,580
[45] Date of Patent: Nov. 6, 1984

[54] DISTRIBUTED DATA TRANSFER CONTROL FOR PARALLEL PROCESSOR ARCHITECTURES

[75] Inventors: Richard J. Martin, Rosemount; David W. Bondurant, Eden Prairie; Leslie W. Nelson, Excelsior, all of Minn.

[73] Assignee: Sperry Corporation, New York, N.Y.

[21] Appl. No.: 461,334

[22] Filed: Jan. 27, 1983

Related U.S. Application Data

[63] Continuation of Ser. No. 321,856, Nov. 16, 1981, which is a continuation of Ser. No. 95,908, Nov. 19, 1979.

[51] Int. Cl.³ .............................................. G06F 13/00
[52] U.S. Cl. .................................................... 364/200
[58] Field of Search ................................. 364/200, 900

[56] References Cited

U.S. PATENT DOCUMENTS

| | | | |
|---|---|---|---|
| 3,287,702 | 11/1966 | Borck, Jr. | 364/200 |
| 3,287,703 | 11/1966 | Slotnick | 364/200 |
| 3,815,095 | 6/1974 | Wester | 364/200 |
| 3,936,806 | 2/1976 | Batcher | 364/200 |
| 4,001,790 | 1/1977 | Barlow | 364/200 |
| 4,032,899 | 6/1977 | Jenny et al. | 364/200 |
| 4,040,028 | 8/1977 | Pauker | 364/200 |
| 4,047,201 | 9/1977 | Kerllerevich | 364/200 |
| 4,067,059 | 1/1978 | Derchak | 364/200 |
| 4,181,936 | 1/1980 | Kober | 364/200 |

Primary Examiner—Raulfe B. Zache
Assistant Examiner—David Y. Eng
Attorney, Agent, or Firm—William C. Fuess; Kenneth T. Grace; Marshall M. Truex

[57] ABSTRACT

An apparatus for distributing the control of data transfers within single instruction stream multiple data stream processors. Each of the parallel processors or arithmetic units is coupled to a dedicated local memory. A main memory provides storage of system data. Each dedicated local memory and the main memory are coupled to a bus interface unit. Each bus interface unit is coupled to a common data bus for the transfer of data between the main memory and the dedicated local memories. Each bus interface unit provides the control functions required to transfer data between the common data bus and the main or local memory to which it is coupled. One bus interface unit is designated the resource controller. The resource controller performs all of the functions of a bus interface unit and also provides the system level functions of supplying clock signals and performing bus arbitration. Each bus interface unit is capable of managing transfers to and from its associated memory thereby distributing control of the multiple data streams eliminating the potential problems associated with requiring a single controller to manage these parallel data transfers.

4 Claims, 59 Drawing Figures

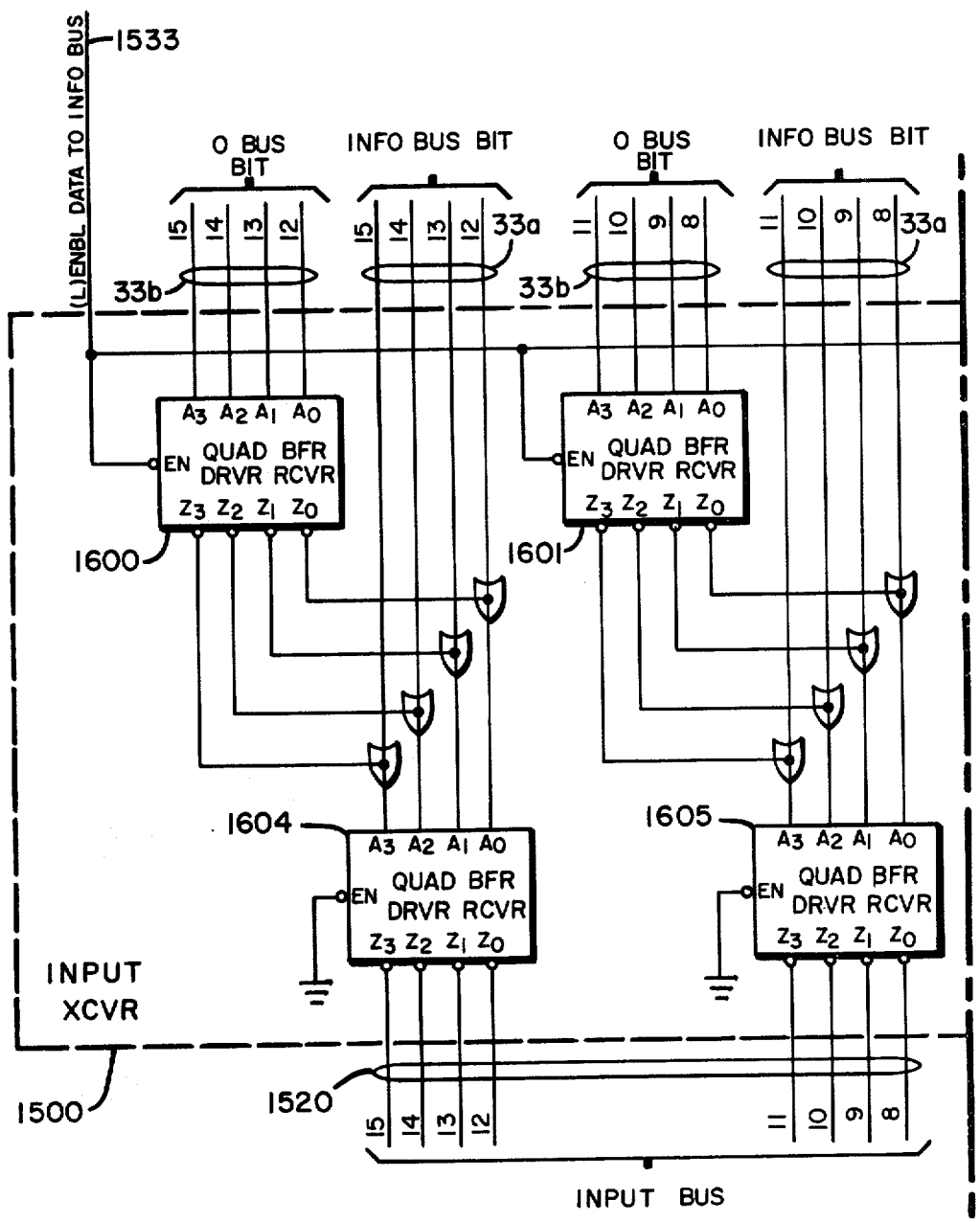
_Fig. 3a_

MEMORY ADDRESS MULTIPLEXER

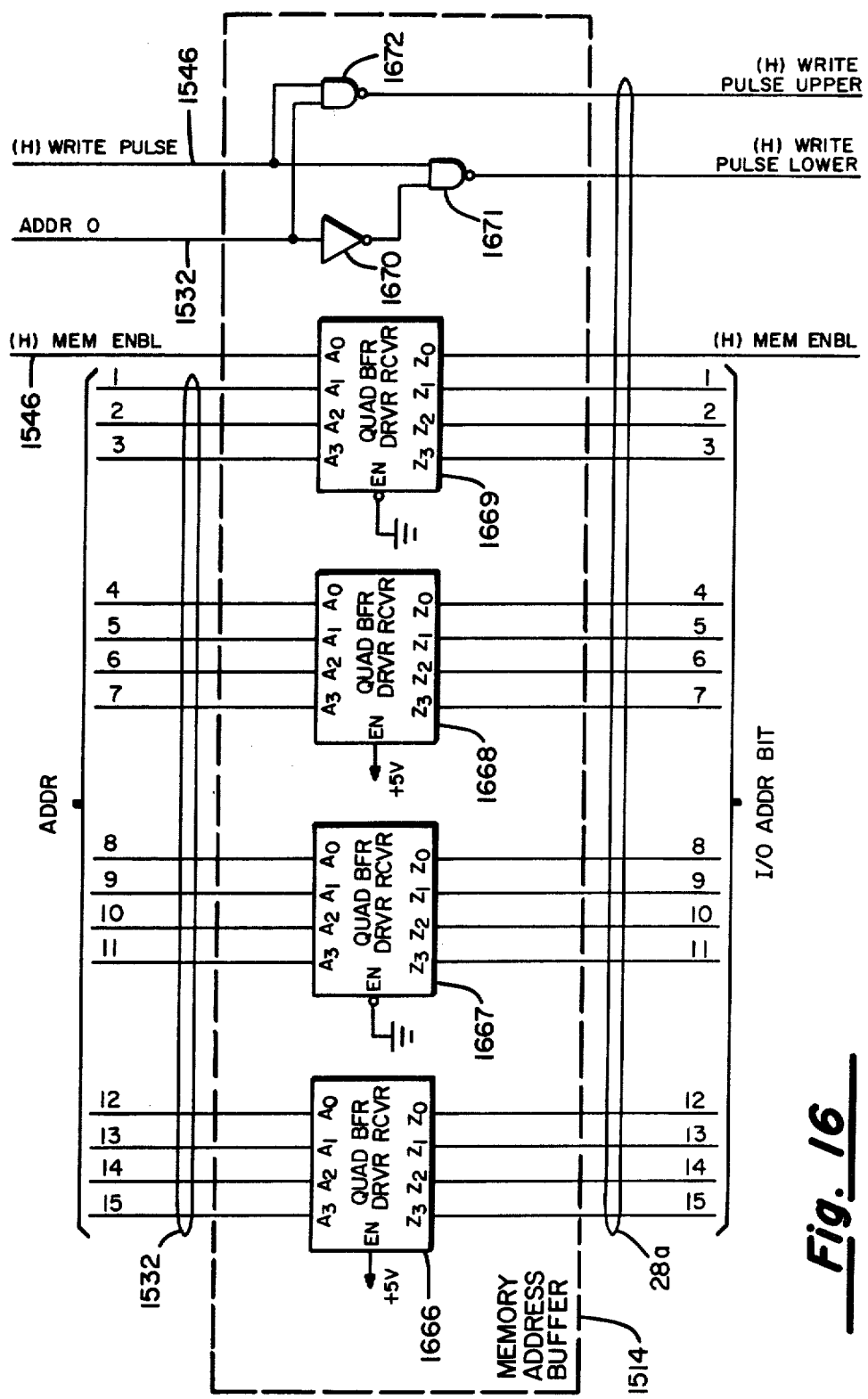

Fig. 23

| PRODUCT TERM | | | | | | | | | | | | | | | | | ACTIVE LEVEL | | | | | | | |
|---|---|---|---|---|---|---|---|---|---|---|---|---|---|---|---|---|---|---|---|---|---|---|---|---|
| | INPUT VARIABLE | | | | | | | | | | | | | | | | H | H | L | H | H | H | H | H |
| NO. | I15 | I14 | I13 | I12 | I11 | I10 | I9 | I8 | I7 | I6 | I5 | I4 | I3 | I2 | I1 | I0 | \\multicolumn{8}{c}{OUTPUT FUNCTION} | | | | | | | |
| | | | | | | | | | 7 | 6 | 5 | 4 | 3 | 2 | 1 | 0 | 7 | 6 | 5 | 4 | 3 | 2 | 1 | 0 |
| 0 | – | – | – | – | – | – | – | – | 0 | 0 | 0 | 1 | 0 | 1 | 0 | 1 | | | | | | | | A |
| 1 | – | – | – | – | – | – | – | – | 0 | 0 | 0 | 1 | 0 | 1 | 0 | 0 | | | | | | | A | |
| 2 | – | – | – | – | – | – | – | – | 0 | 0 | 1 | 1 | 0 | 1 | 1 | 1 | | | | | | A | | |
| 3 | – | – | – | – | – | – | – | – | 0 | 1 | 1 | 0 | 0 | 1 | 0 | 0 | | | | | A | | | |
| 4 | – | – | – | – | – | – | – | – | 0 | 1 | 0 | 0 | 0 | 1 | 0 | 1 | | | | A | | | | |
| 5 | – | – | – | – | – | – | – | – | – | – | – | – | 0 | 1 | 0 | 0 | | | A | | | | | |

Fig. 30

| BIU INPUT FROM MAIN BUS | | | | BIU INPUT/OUTPUT TO/FROM MAIN BUS | | | |
|---|---|---|---|---|---|---|---|
| SIGNAL | FIG | CABLE | COND | SIGNAL | FIG | CABLE | COND |
| CLASS III LO | 9 | 33e | 1 | INFO BUS BITS 0-15 | 3 | 33a | 16 |
| SELECT RDY | 26 | 33c | 1 | BUS ADR 0→7 | 5 | 33d | 8 |
| POS SEL 0→3 | 26 | 33c | 4 | TYPE 0→2 | 5 | 33d | 3 |
| BIU CLR | 27 | 33c | 1 | OP CODE 0→2 | 5 | 33d | 3 |
| SYNC CLOCK | 27 | 33c | 1 | REQ RDY | 26 | 33c | 1 |
| | | | | BUSY | 27 | 33c | 1 |
| | | | | TERM RDY | 27 | 33c | 1 |
| | | | | ORIG RDY | 27 | 33c | 1 |
| | | | | POS REQ 0→7 | 28 | 33c | 8 |
| | | | | IOC SCAN EN | 9 | 33c | 1 |

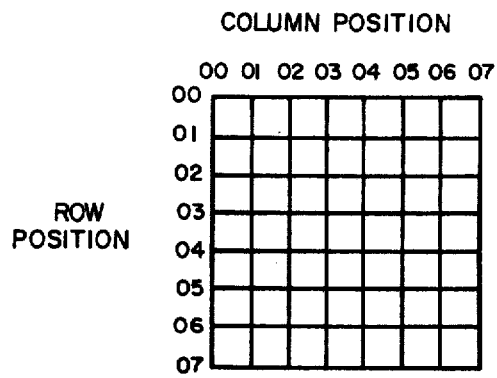
Fig. 34
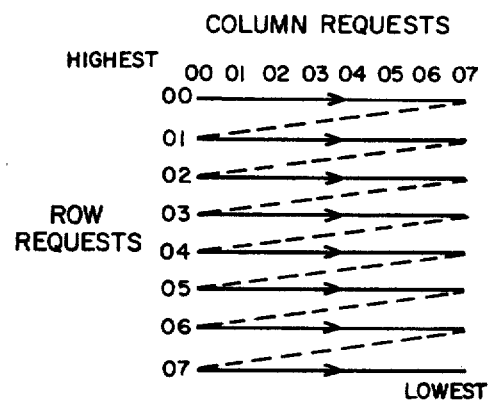
Fig. 35
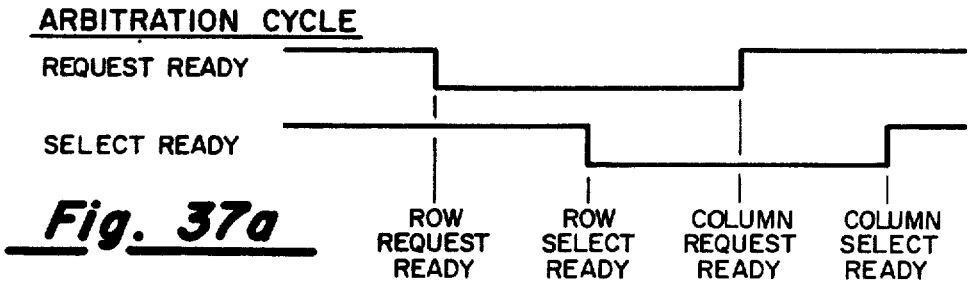
Fig. 36
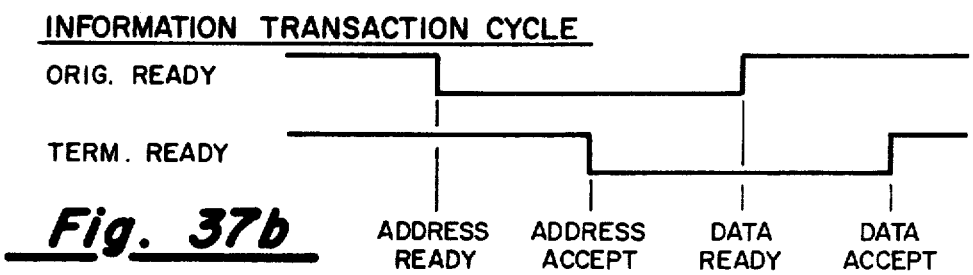
Fig. 37a
Fig. 37b

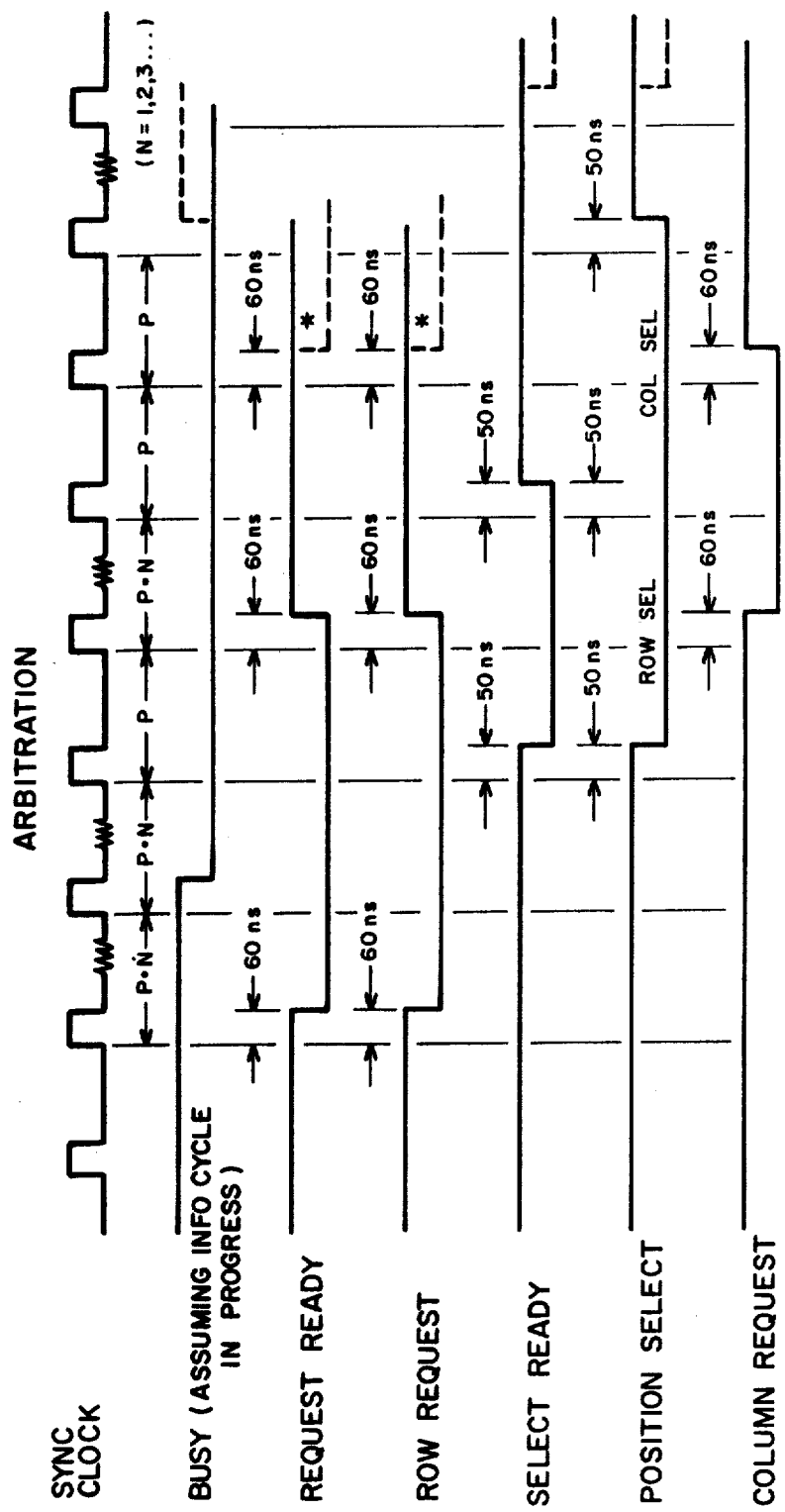

4,481,580

DISTRIBUTED DATA TRANSFER CONTROL FOR PARALLEL PROCESSOR ARCHITECTURES

This is a continuation of application Ser. No. 321,856 filed Nov. 16, 1981 which is a continuation of application Ser. No. 95,908 filed Nov. 19, 1979.

BACKGROUND OF THE INVENTION

The present invention generally relates to digital data processing system architectures and more specifically relates to control of single instruction stream multiple data stream (SIMD) machines.

In the normal SIMD machine, a single control structure is used to manage a number of parallel processing structures, called arithmetic units. The SIMD architecture can be employed when parallelism is inherent in the processing problem. Considerably improved performance may be realized because of the parallel processing (i.e., SIMD) approach whereby many time consuming arithmetic operations may be accomplished in a parallel rather than a serial fashion. The reader is urged to consult Kenneth J. Thurber, "Large Scale Computer Architecture," Hayden 1976, for a more rigorous discussion of SIMD architectures.

The SIMD architecture is also likely to be advantageous from a cost standpoint for those tasks having substantial parallelism. This occurs because of the advantages inherent in making a number of small parallel rather than one large serial processing element for a given size processing task.

Despite these advantages, parallel processing using an SIMD architecture has two major problems which may preclude its use. The first is a characteristic of the processing task to be accomplished. Put simply, the task may not involve sufficient parallelism to make an SIMD approach practical. A solution to this problem is not within the scope of this disclosure and so will not be addressed further.

The second problem is a function of the control architecture chosen. For a single instruction stream to control a number of arithmetic units each processing one of the multiple data streams, the arithmetic units must be tightly coupled to one another and to the overall control structure. This is usually accomplished using a master or control processor which responds to the single instruction stream by controlling or managing the individual arithmetic units.

Historically, the functions of the control processor have tended to grow in complexity necessitating a more and more powerful control processor. Yet, the control processor continues to be the major performance limiting element because a part of its functions must be performed in serial fashion. The tendency has been to make the control processor responsible for all transfers of control information and data to or from the arithmetic units. This tends to severely limit performance particularly if these transfers are all accomplished in a serial fashion. A partial solution to the problem is assigning responsibility for managing some of the transfers to the arithmetic unit involved in the transfer. However, this approach may also limit performance because of the processing capacity of the arithmetic units consumed by housekeeping activities.

SUMMARY OF THE INVENTION

The solution proposed by the present invention uses a central data bus, called the main bus. The Main Bus is the highway which interconnects the Control Processor and the Arithmetic Units for the transfer of all data and control information. Interposed between each processor (i.e., the Control Processor and the Arithmetic Units) and the Main Bus is a dedicated Local Memory which is used to buffer control information and data between the Main Bus and the corresponding processor. Control of transfers between the Main Bus and each of the Local Memories is accomplished by a dedicated Bus Interface Unit. Each Bus Interface Unit is responsible for managing all transfers between the Main Bus and the corresponding Local Memory. Each Bus Interface Unit may be individually programmed to manage complex transfers between Local Memories freeing the Control Processor and the Arithmetic Units from substantial housekeeping chores. A system level memory, called a Main Memory, is connected to the Main Bus through a dedicated Bus Interface Unit as if it were a Local Memory.

Any Bus Interface Unit may initiate a transfer of control information or data from its corresponding memory (i.e., Local Memory or Main Memory) to any other memory. A special Bus Interface Unit, called a Resource Controller, supplies clocking signals to all other Bus Interface Units and also arbitrates contention for utilization of the Main Bus. Depending upon the application, the Resource Controller may also provide a direct interface (i.e., not via Local Memory) between the Control Processor and the Main Bus.

By assigning responsibility for all control information and data transfers to the Bus Interface Units, the Control Processor and Arithmetic Units are permitted to dedicate maximum capacity to performing the arithmetic processing.

BRIEF DESCRIPTION OF THE DRAWINGS

FIG. 16 is a diagram of MEMORY ADDRESS BUFFER 1514.

FIG. 23 is a Table showing the program for LOGIC ARRAY 1712.

FIG. 30 is a Table showing the signals transferred via MAIN BUS 10.

FIG. 31b is a block diagram of a preferred RESOURCE CONTROLLER 11.

FIG. 34 conceptually shows the arbitration process.

FIG. 35 conceptually shows priority determination during the arbitration process.

FIG. 36 shows the sequence of signals to complete a transaction.

FIG. 37a shows the timing of signals during the arbitration cycle.

FIG. 37b shows the timing of signals during the information transaction cycle.

FIG. 38 shows the detailed timing of arbitration.

DESCRIPTION OF THE PREFERRED EMBODIMENT

Figure 1:
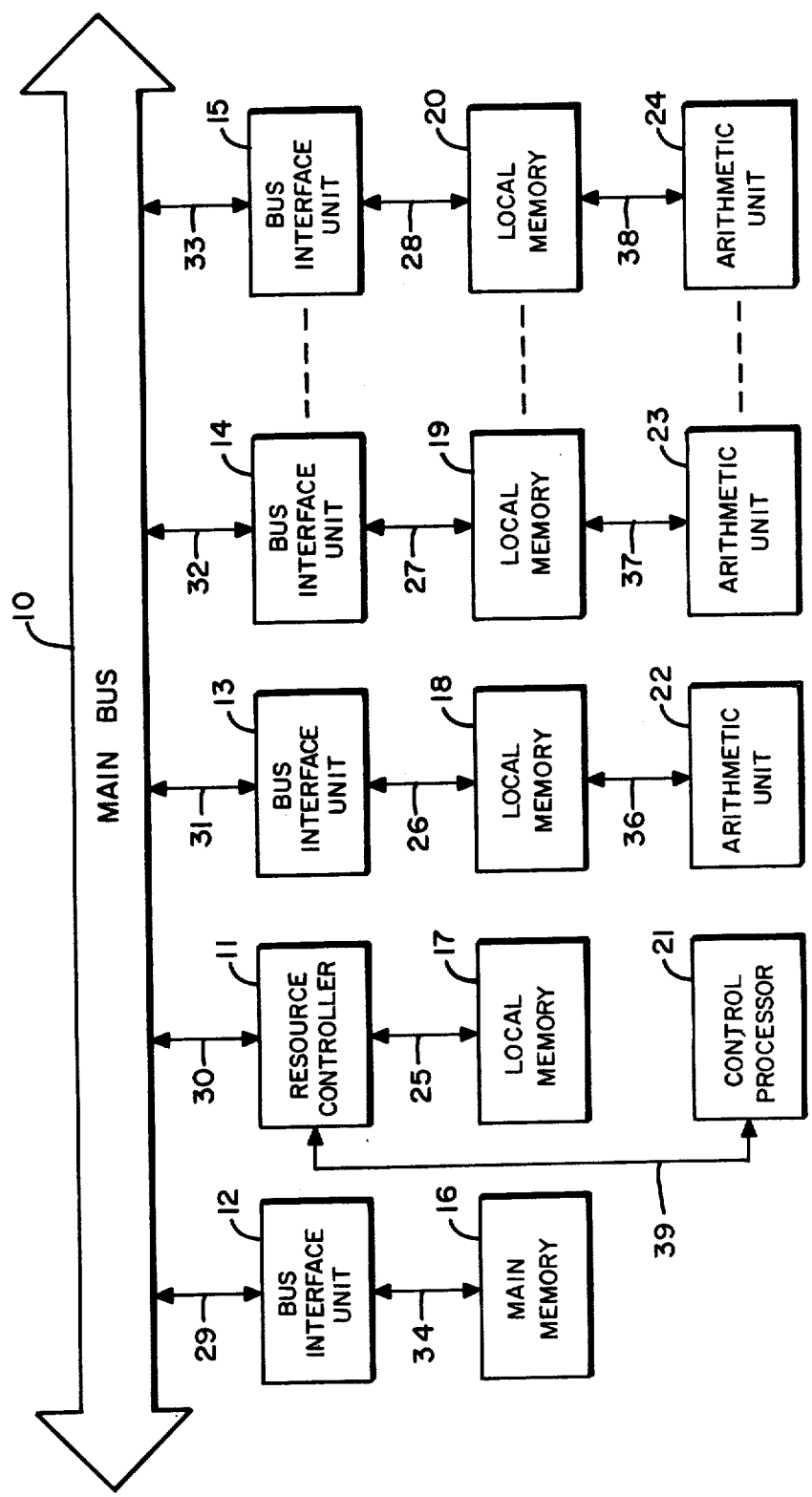
FIG. 1 is a functional description of the overall SIMD architecture.

FIG. 1 shows the overall architecture of a single instruction stream multiple data stream (SIMD) data processing system incorporating the present invention. CONTROL PROCESSOR 21 is the processor which initiates arithmetic manipulation of the multiple data streams. ARITHMETIC UNITS 22, 23, ..., 24 are the arithmetic processors which perform the actual computations. Each of the ARITHMETIC UNITS performs computations on a one of the multiple data streams. Whereas CONTROL PROCESSOR 21 is a conventional, general purpose, programmable processor, ARITHMETIC UNITS 22, 23, ..., 24 are of a special purpose design to optimize arithmetic rather than control capabilities. ARITHMETIC UNITS 22, 23, ..., 24 are programmable in a limited sense but should be considered to be special purpose processors.

CONTROL PROCESSOR 21 executes programs which are stored within LOCAL MEMORY 17. ARITHMETIC UNIT 22 operates upon data stored within LOCAL MEMORY 18 and returns resultants to LOCAL MEMORY 18. Similarly, ARITHMETIC UNIT 23, ..., 24 operate upon data stored within LOCAL MEMORY 19, ..., 20 and return resultants to LOCAL MEMORY 19, ..., 20, respectively. The programs to be executed by CONTROL PROCESSOR 21 are stored for relatively long periods in MAIN MEMORY 16 and transferred from MAIN MEMORY 16 to LOCAL MEMORY 17 for execution by CONTROL PROCESSOR 21. Similarly, MAIN MEMORY 16 stores system level data a portion of which is transferred to each of LOCAL MEMORY 18, 19, ..., 20 for processing by ARITHMETIC UNIT 22, 23, ..., 24 with resultants returned to MAIN MEMORY 16 from LOCAL MEMORY 18, 19, ..., 20.

MAIN BUS 10 transfers all data and control information between MAIN MEMORY 16 and LOCAL MEMORY 17, 18, 19, ..., 20. All interfaces to MAIN BUS 10 are via an Interface Unit. MAIN MEMORY 16 is interfaced to MAIN BUS 10 via BUS INTERFACE UNIT 12. LOCAL MEMORY 18, 19, ..., 20 are interfaced to MAIN BUS 10 via BUS INTERFACE UNIT 13, 14, ..., 15, respectively. LOCAL MEMORY 17 is interfaced to MAIN BUS 10 via a special Interface Unit, RESOURCE CONTROLLER 11, which is similar to BUS INTERFACE UNIT 12, 13, 14, ..., 15, except for the differences noted below. CONTROL PROCESSOR 21 has a special interface to MAIN BUS 10 via cable 39 and RESOURCE CONTROLLER 11, which is also further discussed below.

In the preferred embodiment, CONTROL PROCESSOR 21 is a military processor designated AN/UYK-502, which is a 16-bit general purpose machine implemented using the Advanced Micro Devices, Inc., AMD 2900 family of microprocessor components. However, those skilled in the art will readily appreciate that other general purpose processors may be used. ARITHMETIC UNIT 22, 23, ..., 24 are special purpose processors constructed using the TRW Model TDC-1003J Multiplier/Accumulator. The exact nature of these processors is not particularly relevant to the present invention. MAIN MEMORY 16 and LOCAL MEMORY 17, 18, 19, ..., 20 are implemented using the INTEL Corporation, Part Number 2147, 4K×1 bit static memory devices. MAIN MEMORY 16 contains up to $2^{18}$ addressable locations. LOCAL MEMORY 17, 18, 19, ..., 20 contains $2^{15}$ addressable locations. It is apparent, however, that the memory elements may be implemented in a wide variety of ways.

The heart of the present invention is the implementation and operation of BUS INTERFACE UNIT 12, 13, 14, ..., 15 and RESOURCE CONTROLLER 11. Each of these elements is autonomous and yet each may be directed by another. Each may initiate transfers and yet each may be commanded to participate in other transfers. RESOURCE CONTROLLER 11 functions in the same manner as BUS INTERFACE UNIT 12, 13, 14, ..., 15 except that RESOURCE CONTROLLER 11 performs the bus arbitration function and supplies the master clock to all users of MAIN BUS 10. Also, because RESOURCE CONTROLLER 11 has a special interface to CONTROL PROCESSOR 21, its internal structure is slightly different as discussed below.

Figure 2:
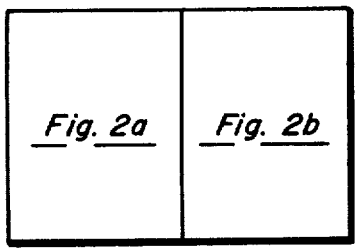
FIGS. 2a and 2b are block diagrams of the Bus Interface Unit.

FIG. 2 shows an overall block diagram of BUS INTERFACE UNIT 15 which is identical to the other Bus Interface Units. BUS INTERFACE UNIT 15 interfaces with MAIN BUS 10 via cable 33 and with LOCAL MEMORY 20 via cable 28. The input receivers, INPUT XCVR 1500 condition the 16 bit data input received from MAIN BUS 10 via line 33a for use internal to BUS INTERFACE UNIT 15. OUTPUT MULTIPLEXER 1501 selects either the 16 bit output from MEMORY DATA IN MULTIPLEXER 1515 (received via line 1519) or the 16 bit output from MICRO PROCESSOR 1511 received via line 1518 for output to MAIN BUS 10 via line 33b under control of OPERATION CONTROL 1506 via line 1534. The 14 control bits transferred to MAIN BUS 10 via line 33d are transformed to bus driver levels by BUS INFORMATION BUFFER 1502.

ADDRESS BUFFER 1503 is used to temporarily store the 16 bit quantity received from INPUT XCVR 1500 via line 1520, when that 16 bit quantity is to address LOCAL MEMORY 20 or a register of MICRO PROCESSOR 1511. DATA BUFFER 1505 performs a similar function when that 16 bit quantity is to be a data input to MICRO PROCESSOR 1511 or LOCAL MEMORY 20. MICRO PROCESSOR 1511 executes micro programs stored within INSTRUCTION PROM 1510 primarily to transform data received via line 1526 into addresses for LOCAL MEMORY 20, and data and control signals to be supplied to MAIN BUS 10. INSTRUCTION COUNTER 1508 is used to address INSTRUCTION PROM 1510. CONTROL PROM 1504 is also addressed by INSTRUCTION COUNTER 1508 and supplies a number of control signals. OPERATION CONTROL 1506 likewise distributes a number of timing and control signals.

INFORMATION MULTIPLEXER 1507 selects which control signals received via lines 1527a and 1527b should be transferred to MAIN BUS 10 via BUS INFORMATION BUFFER 1502. MEMORY ADDRESS LATCH 1512 serves as a temporary storage for the 16 bit output of MICRO PROCESSOR 1511 to be used to address LOCAL MEMORY 20. MEMORY ADDRESS MULTIPLEXER 1513 selects which 16 bit quantity will be used to address LOCAL MEMORY 20. MEMORY ADDRESS BUFFER 1514. MEMORY DATA IN MULTIPLEXER 1515, and DRIVERS 1516 are used to interface BUS INTERFACE UNIT 15 to LOCAL MEMORY 20 via cable 28.

Figure 3:
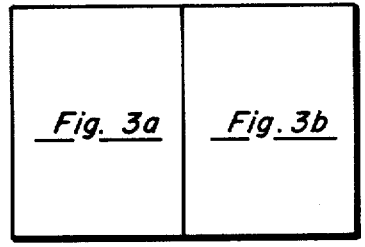
FIGS. 3a and 3b are diagrams of INPUT XCVR 1500.

FIG. 3 is a detailed view of INPUT XCVR 1500. The 16 conductors of cable 33a transfer data in a bidirectional fashion to and from MAIN BUS 10. INFO BUS BIT ∅-INFO BUS BIT 15 are the designations given to the individual data signals on MAIN BUS 10. Each conductor of cable 33a is electrically connected to the corresponding conductor to cables 29a, 30a, 31a, 32a, . . . , (see also FIG. 1). Cable 33b has 16 conductors which represent the 16 bit output of OUTPUT MULTIPLEXER 1501. The signals on the 16 conductors are labeled O BUS BIT ∅-O BUS BIT 15. QUAD BUFFER DRVR RCVR's 1600, 1601, 1602, and 1603 convert the level of the 16 signals O BUS BIT ∅-O BUS BIT 15 to the level present on MAIN BUS 10. Each of the 16 outputs of QUAD BUFFER DRVR RCVR's is wire-ored with the corresponding conductor of cable 33a. Notice also that a low on line 1533, called ENBL DATA TO INFO BUS, permits OPERATION CONTROL 1506 to enable O BUS BIT ∅-O BUS BIT 15 to be gated to MAIN BUS 10 as INFO BUS BIT ∅-INFO BUS BIT 15 at the appropriate time (see also FIG. 2). ENBL DATA TO INFO BUS signal is discussed further below.

QUAD BUFFER DRVR RCVR 1604, 1605, 1606, and 1607 convert the signals from the levels used on MAIN BUS 10 (i.e., signals INFO BUS BIT ∅-INFO BUS BIT 15) to the levels used internal to BUS INTERFACE UNIT 15. The converted signals are designated INPUT BUS ∅-INPUT BUS 15, respectively, and are transferred via cable 1520. The enable inputs (i.e., EN) of QUAD BUFFER DRVR RCVR 1604, 1605, 1606, and 1607 are grounded thereby causing them to always be enabled. Therefore the 16 data signals present on MAIN BUS 10 and, hence, cable 33a (i.e., INFO BUS BIT ∅-INFO BUS BIT 15) are always present after level conversion on the corresponding conductors of cable 1520 as INPUT BUS ∅-INPUT BUS 15, respectively.

Figure 4:
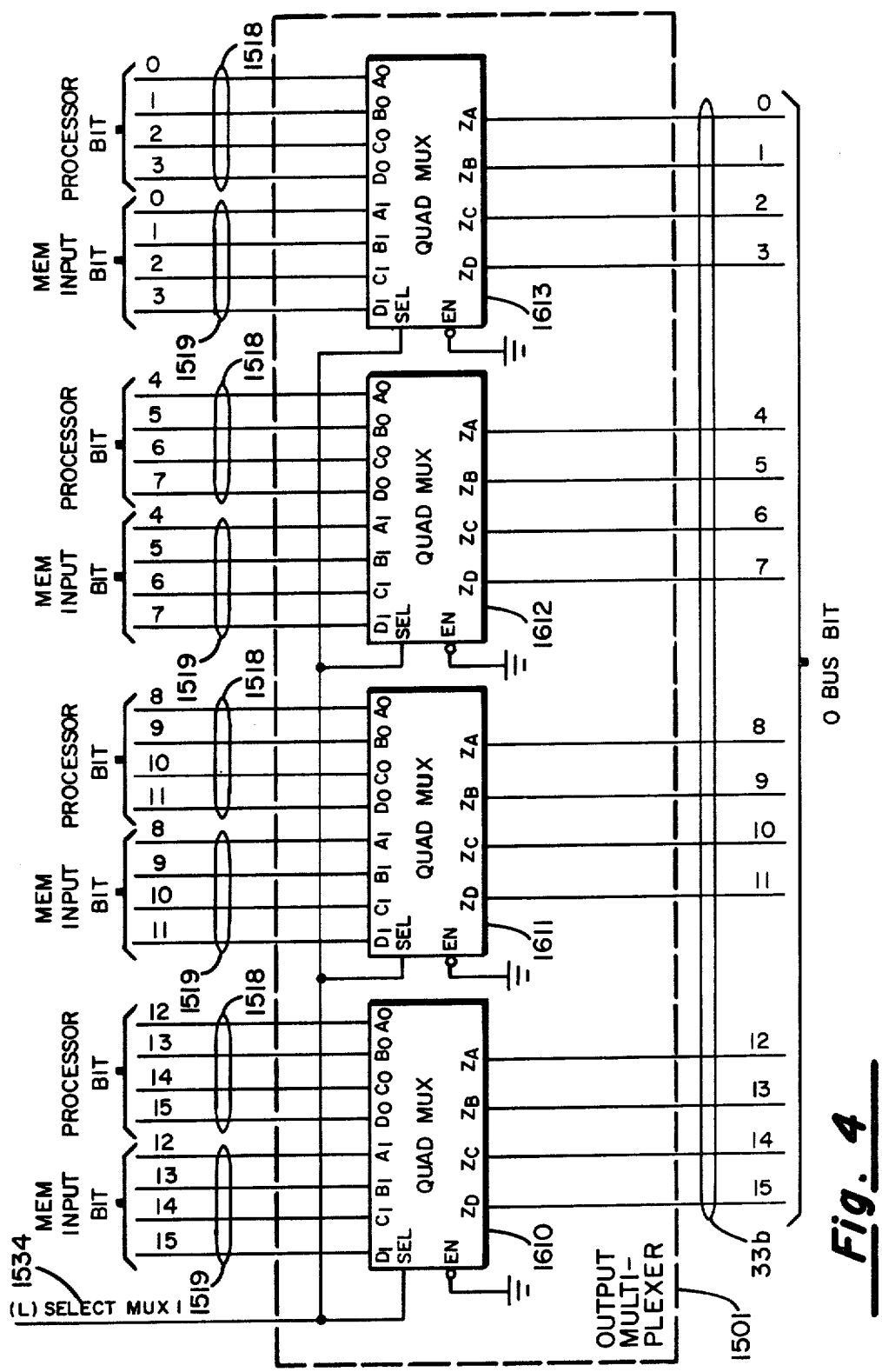
FIG. 4 is a diagram of OUTPUT MULTIPLEXER 1501.

FIG. 4 shows OUTPUT MULTIPLEXER 1501 in detail. QUAD MUX 1610, 1611, 1612, and 1613 select either the 16 bits from cable 1518 or the 16 bits from cable 1519 for transfer via cable 33b under control of OPERATION CONTROL 1506 via line 1534. A low signal on line 1534 is designated SELECT MUX 1. The generation of SELECT MUX 1 is discussed in more detail below. The enable inputs (i.e., EN) of QUAD MUX 1610, 1611, 1612, and 1613 are grounded, thereby constantly enabling output to cable 33b. The 16 conductors of cable 1518 conduct signals PROCESSOR BIT 0-PROCESSOR BIT 15. The 16 conductors of cable 1519 transfer signals designated MEM INPUT BIT 0-MEM INPUT BIT 15. The signals transferred via cable 33b are designated O BUS BIT ∅-O BUS BIT 15. Referring again to FIG. 2, it can be seen that OUTPUT MULTIPLEXER 1501 selects either the 16 bit output of MICRO PROCESSOR 1511 received via cable 1518 or the 16 bit output of LOCAL MEMORY 20 received via cable 1519 and MEMORY DATA IN MULTIPLEXER 1515 for transfer to MAIN BUS 10 via cable 33b.

Figure 5:
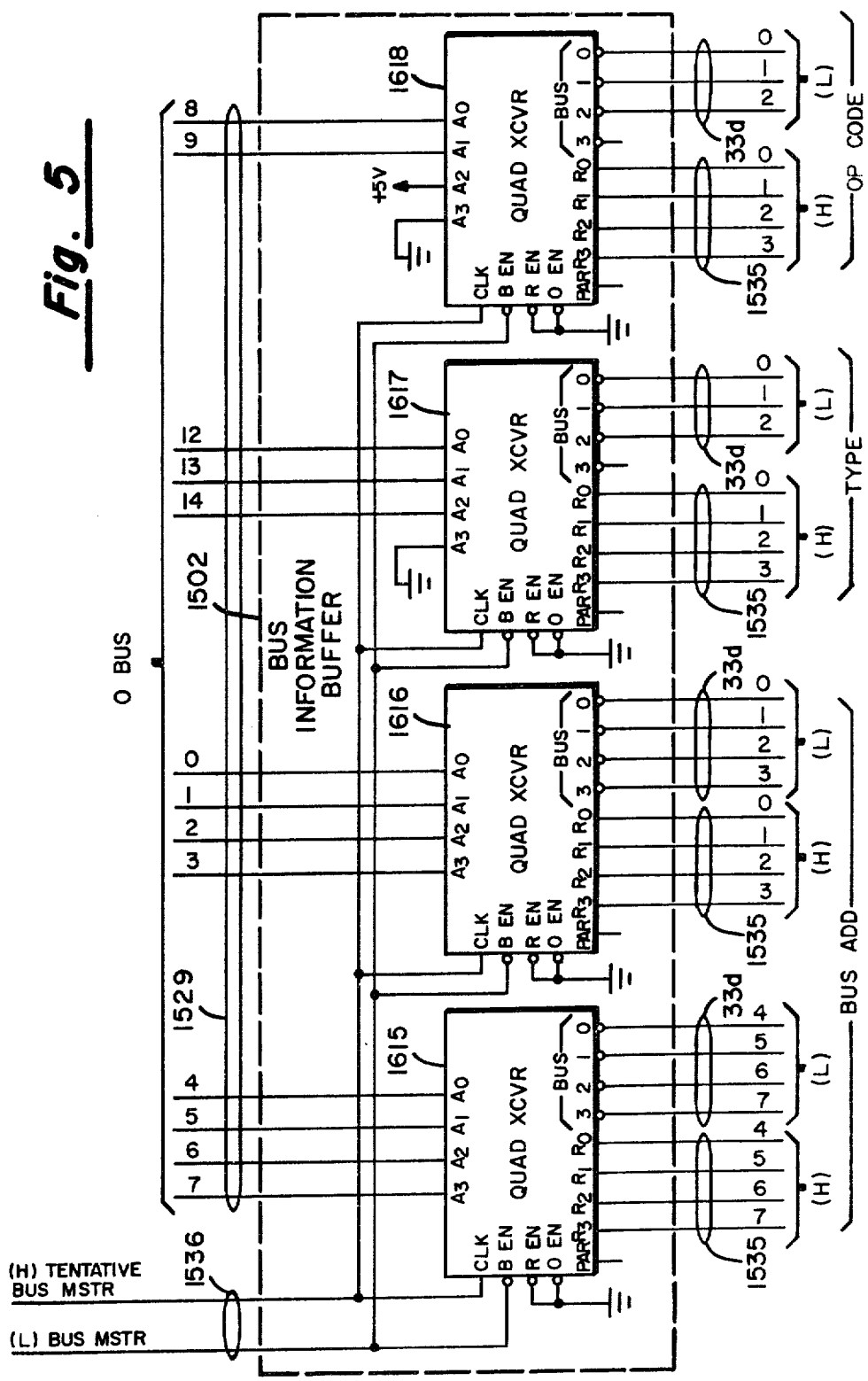
FIG. 5 is a diagram of BUS INFORMATION BUFFER 1502.
Figure 6A:
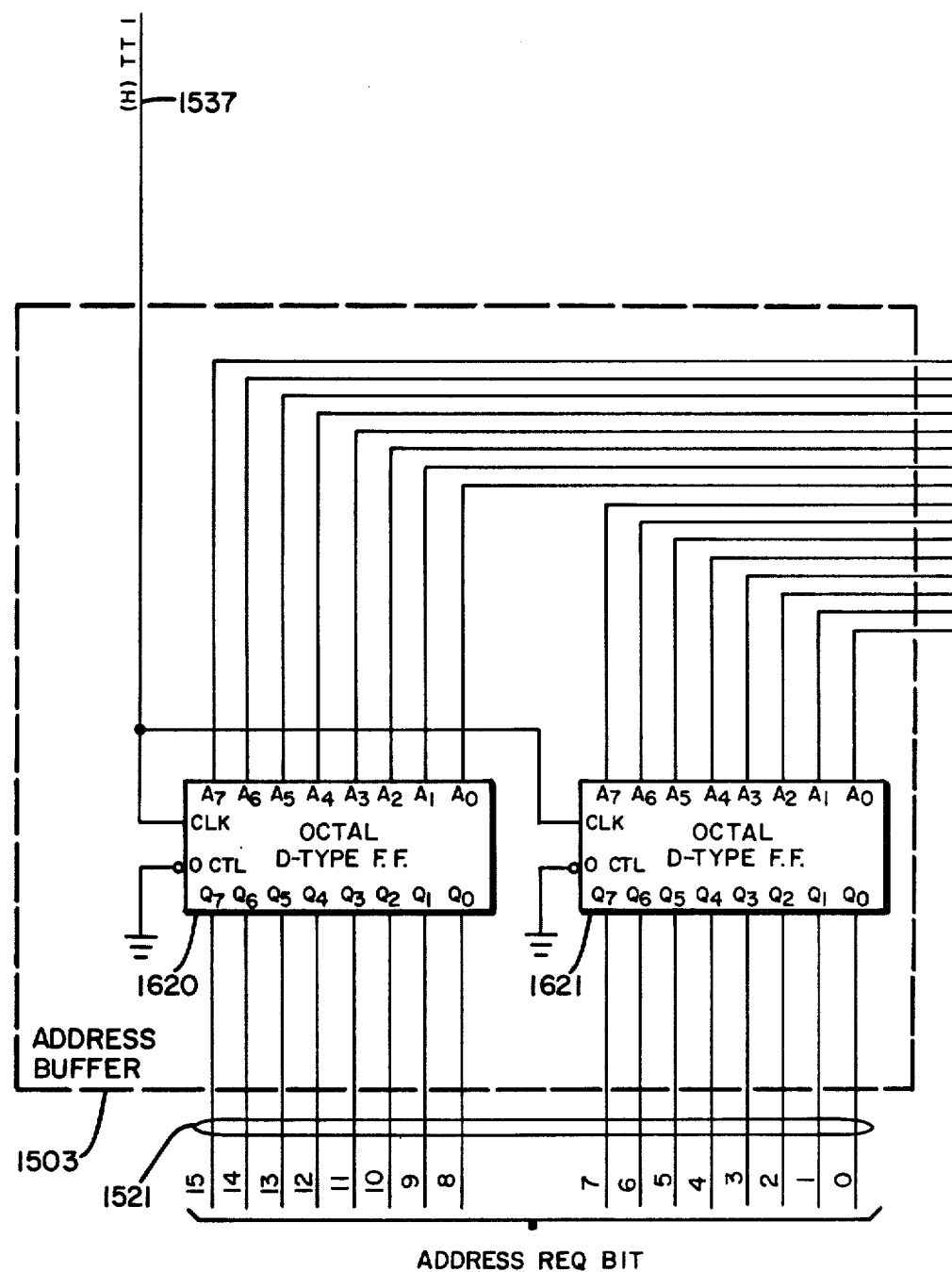
Figure 6B:
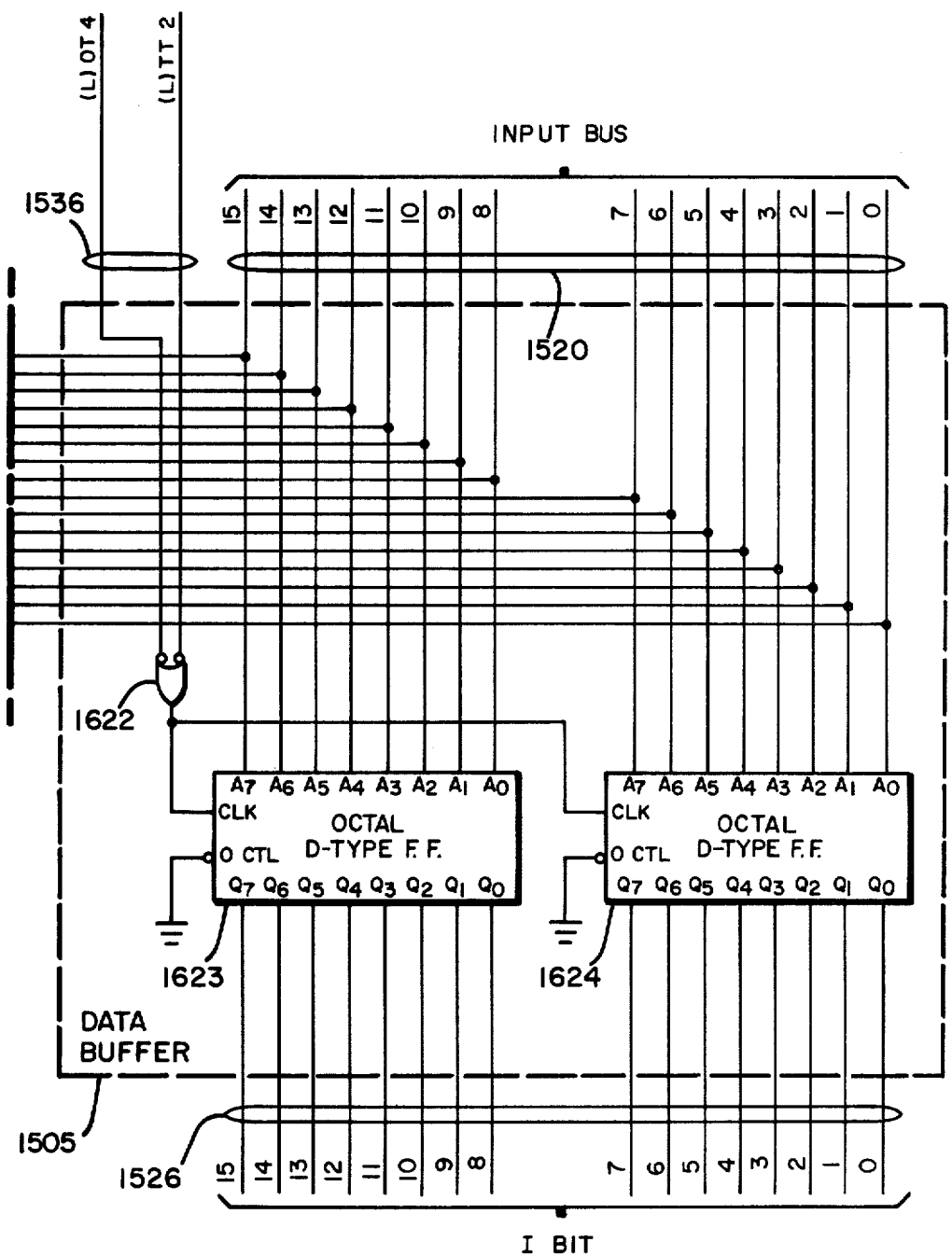
Figure 7A:
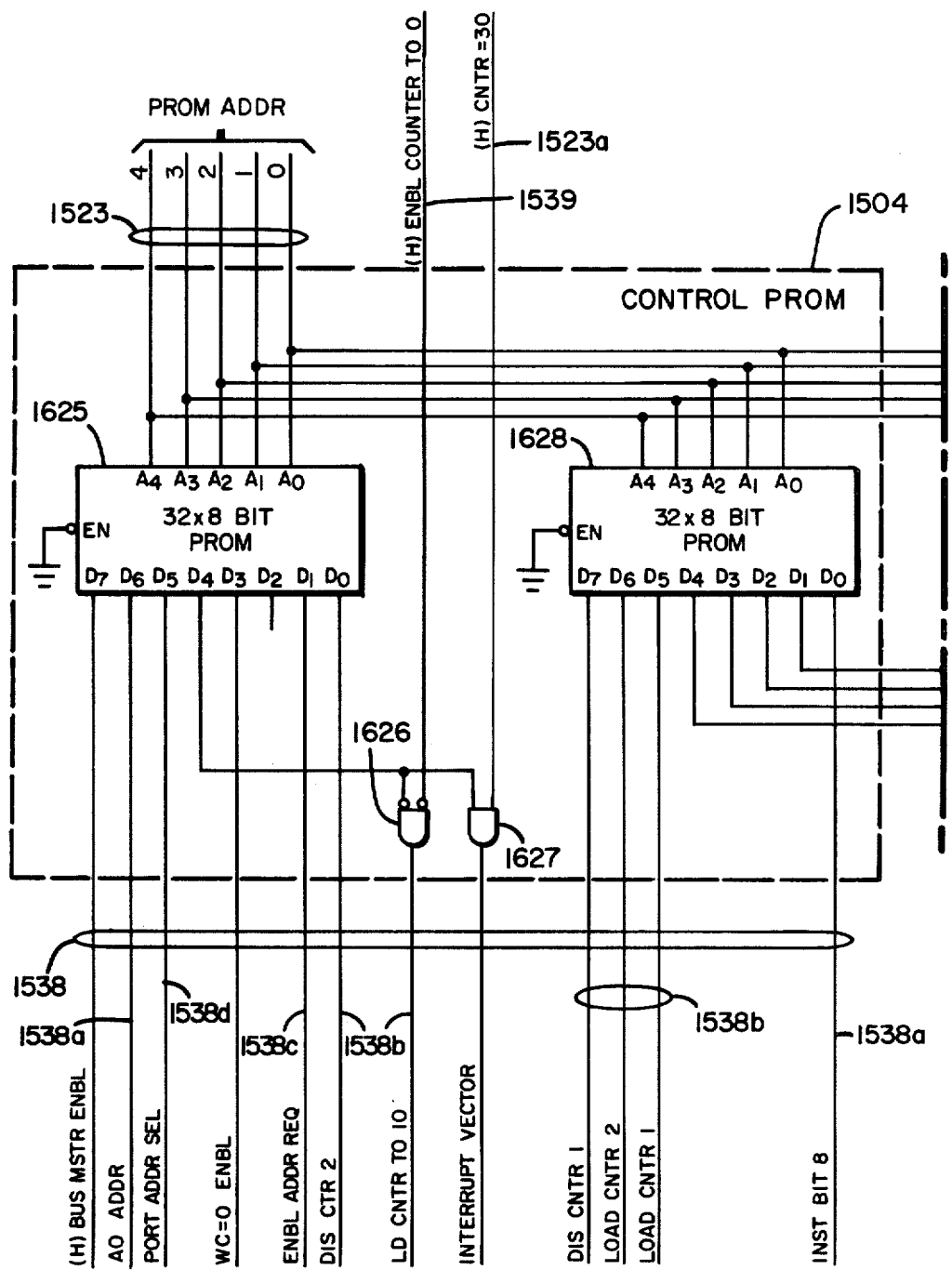
Figure 7B:
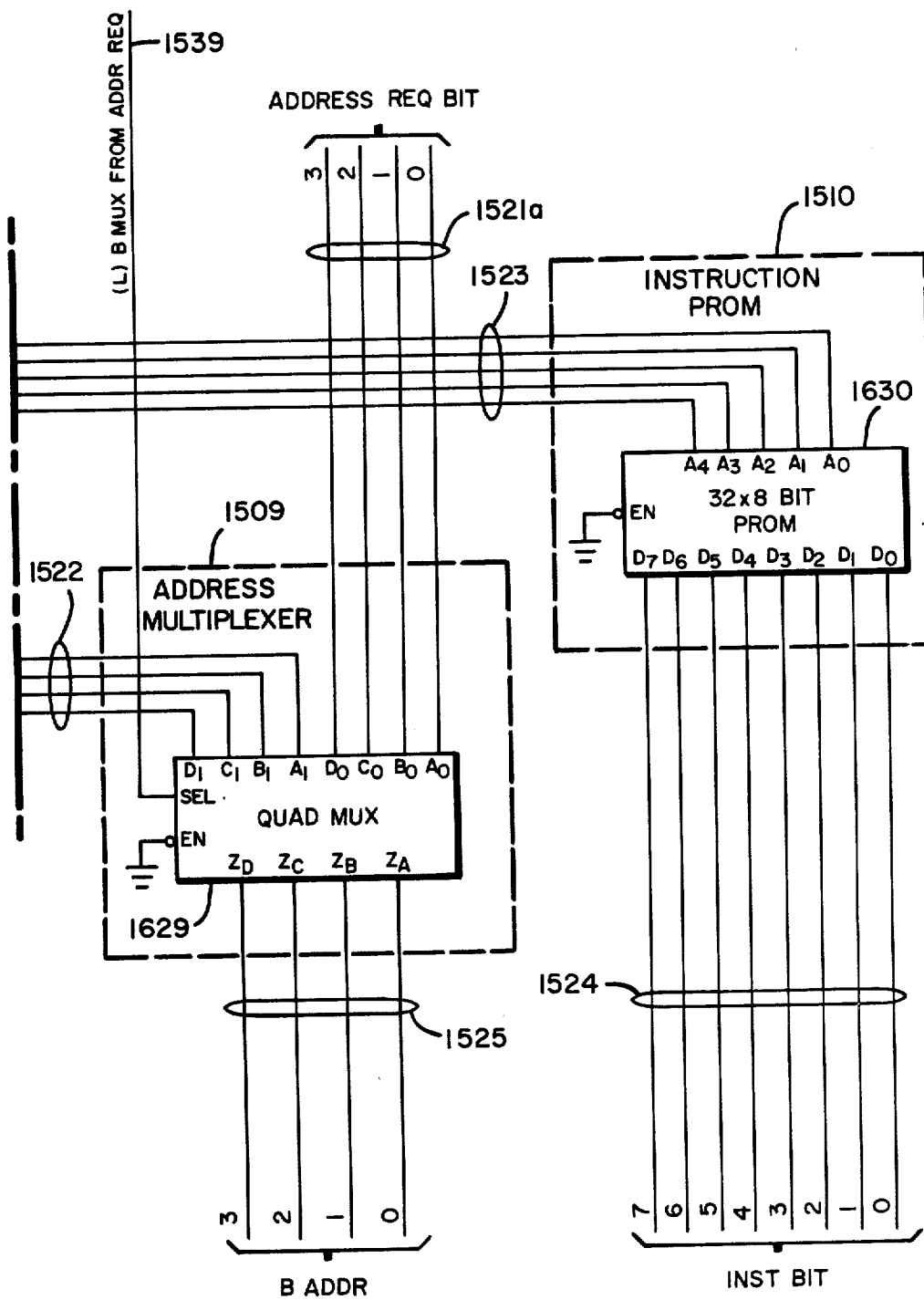

BUS INFORMATION BUFFER 1502 is shown in detail in FIG. 5. BUS INFORMATION BUFFER 1502 performs the function of converting the levels of the control signals received from MAIN BUS 10 via cable 33d to the internal levels used within BUS INTERFACE UNIT 15 and transferring the converted signals to OPERATION CONTROL 1506 via cable 1535. BUS INFORMATION BUFFER 1535 also transfers internally generated control signals received via cable 1529 to MAIN BUS 10 via cable 33d under control of cable 1536. These functions are accomplished by QUAD XCVR 1615, 1616, 1617, and 1618. Cable 1529 has 13 conductors which transfer the signals O BUS 0-O BUS 9 and O BUS 12-O BUS 14 from INFORMATION BUFFER 1507 (see also FIG. 2). Notice that input A3 of both QUAD XCVR 1617 and 1618 are grounded (i.e., always low). Notice also that input A2 of QUAD XCVR 1618 is connected to +5 volts (i.e., always high). The 14 conductors of 33d are coupled directly to MAIN BUS 10 and are therefore at the level of MAIN BUS 10. The signals are designated OP CODE ∅-OP CODE 2, TYPE ∅-TYPE 2, and BUS ADD ∅-BUS ADD 7. Notice that OP CODE 2 is always present (i.e., at a low state). The same signals at levels compatible to internal signals are transferred to OPERATION CONTROL 1506 via cable 1535. Notice also that OP CODE 3 and TYPE 3 are never present (i.e., always low) but are connected via cable 1535. The TENTATIVE BUS MSTR (i.e., high) transferred via one conductor of cable 1536 supplies the clocking signal (i.e., CLK input) to QUAD XCVR 1615, 1616, 1617, and 1618. The BUS MSTR (i.e., low) signal on the other conductor of cable 1536 provides the signal (i.e., input B EN) which enables the signals from 1529 (i.e., signals O bus ∅-O BUS 9 and O bus 12-O BUS 14) to MAIN BUS 10 via cable 33d. The generation of signals TENTATIVE BUS MSTR and BUS MSTR is discussed further below.

Figure 6:
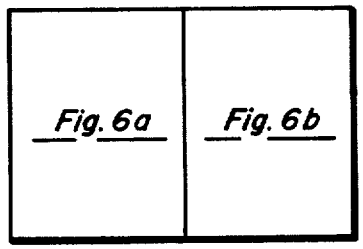
FIGS. 6a and 6b are diagrams of ADDRESS BUFFER 1503 and DATA BUFFER 1505.

The details of ADDRESS BUFFER 1503 and DATA BUFFER 1505 are shown in FIG. 6. Each uses two OCTAL D-TYPE F.F.'s to temporarily store the output of INPUT XCVR 1500 received via cable 1520. ADDRESS BUFFER 1503 uses OCTAL D-TYPE F.F. 1620 and 1621 to temporarily store the 16 bits received via cable 1520 when INPUT BUS 0–INPUT BUS 15 are an address. OCTAL D-TYPE F.F. 1620 and 1621 are clocked by timing signal TT1 received from OPERATION CONTROL 1506 via line 1537. The 16 output signals of ADDRESS BUFFER 1503 are designated ADDRESS REQ BIT 0–ADDRESS REQ BIT 15.

CONTROL PROM 1504 uses 32×8 BIT PROM 1625 and 1628 to store control information. Both INSTRUCTION PROM 1510 and CONTROL PROM 1504 are addressed by the five conductors of cable 1523 which transfers the five signals PROM ADDR 0–PROM ADDR 4. Because 32×8 BIT PROM 1625, 1628, and 1630 are commonly addressed, they may be thought of as comprising a single memory of 32 addressable locations and 24 bits in width, where 32×8 BIT PROM 1630 contains the least significant bits and 32×8 BIT PROM 1625 contains the most significant bits. The contents of this 32×24 bit memory is as follows:

```
@REWIND AB.
FURPUR 27R3A     E33 SL73R1 05/23/79 08:15:56
@HDG,P SPE BIUC CONTROL PROMS
@*U1616.GPAS,S KMIKE*TUNA1.SPEBIUCPROMS
CYCLE 01 GPA ASSEMBLED BY V-6 ON 23 MAY 79 AT 08:15:57
   1.                                     *ULTRA 5PEBIU
   2.                                     5PE BIU CONTROL PROMS FOR 2901
   3.          ADDRESS    CONTENTS        WRD 32 .
   4.    00    000000     00000717033     000717033 .
   5.          000001     00000637337     000637337 . WRITE CONTROL MEMORY
   6.          000002     00000000000     0 .
   7.          000003     00000000000     0 .
   8.          000004     00000637033     000637033 . READ CONTROL MEMORY
   9.          000005     00000000000     0 .
  10.          000006     00000000000     0 .
  11.          000007     00000000000     0 .
  12.          000010     00000100033     000100033 . READ OR WRITE DMA TRANSFER
  13.          000011     00002502033     002502033 .
  14.          000012     00040503033     040503033 .
  15.          000013     00000501033     000501033 .
  16.          000014     00000500301     000500301 .
  17.          000015     00020501301     020501301 .
  18.          000016     00000542313     000542313 .
  19.          000017     00000000000     0 .
  20.          000020     00000000000     0 .
  21.          000021     00000000000     0 .
  22.          000022     00000000000     0 .
  23.          000023     00000000000     0 .
  24.          000024     00000000000     0 .
  25.          000025     00000000000     0 .
  26.          000026     00000000000     0 .
  27.          000027     00000000000     0 .
  28.          000030     00050503033     050503033 . MONITOR INTERRUPT
  29.          000031     00006542033     006542033 .
  30.          000032     00000000000     0 .
  31.          000033     00000000000     0 .
  32.          000034     00000000000     0 .
  33.          000035     00000000000     0 .
  34.          000036     00000000000     0 .
  35.          000037     00000000000     0 .
  36.                                     END .
@REWIND AB.
FURPUR 27R3A     E33 SL73R1 05/23/79 08:16:08
@HDG,F SPE BIUC CONTROL PROM DATA
@XQT *DA36.DMPC/32DNEW1
```

BIT 15.

DATA BUFFER 1505 uses OCTAL D-TYPE F.F. 1623 and 1624 to temporarily store the 16 signals termed INPUT BUS 0–INPUT BUS 15 whenever these signals are data to be used as input to LOCAL MEMORY 20 or MICRO PROCESSOR 1511. The 16 output signals of DATA BUFFER 1505 are designated I BIT 0–I BIT 15. OCTAL D-TYPE F.F. 1623 and 1624 may be clocked by either timing signal TT2 or OT4 transferred from OPERATION CONTROL 1506 by gate 1622. Generation of these timing signals is discussed further below.

Figure 7:
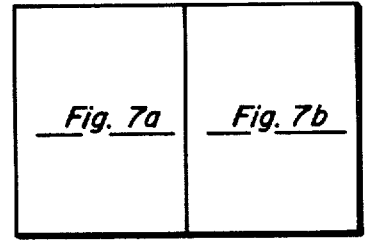
FIGS. 7a and 7b are diagram of CONTROL PROM 1504, ADDRESS MULTIPLEXER 1509 and INSTRUCTION PROM 1510.

FIG. 7 shows the detailed implementation of CONTROL PROM 1504, ADDRESS MULTIPLEXER 1509, and INSTRUCTION PROM 1510. INSTRUCTION PROM 1510 uses 32×8 BIT PROM 1630 to store instructions for MICRO PROCESSOR 1511.

The eight output signals of INSTRUCTION PROM 1510 are designated INST BIT 0–INST BIT 7 and are transferred to MICRO PROCESSOR 1511 via cable 1524. One of the eight outputs of 32×8 BIT PROM 1628 (i.e., output D0) is the most significant bit position of the instruction, called INST BIT 8, and is transferred to MICRO PROCESSOR 1511 via line 1538a. Four of the eight outputs of 32×8 BIT PROM 1628 (i.e., outputs D1, D2, D3, and D4) are transferred to ADDRESS MULTIPLEXER 1509 via cable 1522. The remaining three outputs of 32×8 BIT PROM 1628 (i.e., outputs D5, D6, and D7) are transferred via cable 1538b to INSTRUCTION COUNTER 1508. The three corresponding signals are designated LOAD CNTR 1, LOAD CNTR 2, and DIS CNTR 1. The purpose of these signals is discussed in detail below.

The first of the eight outputs of 32×8 BIT PROM 1625 (i.e., output D0) is transferred directly to INSTRUCTION COUNTER 1508 via cable 1538*b* as a signal designated DIS CTR 2. The second of the eight outputs of 32×8 BIT PROM 1625 (i.e., output D1) is transferred directly to MEMORY ADDRESS LATCH 1512 via line 1538*c* as a signal designated ENBL ADDR REQ. The third output (i.e., output D2) is not used. The fourth output of 32×8 BIT PROM 1625 (i.e., output D3) is transferred via cable 1538 to OPERATION CONTROL 1506 as signal WC=0 ENBL. The signal designated LD CNTR TO 10 is transferred to INSTRUCTION COUNTER 1508 via cable 1538*b*. The signal is generated by gate 1626 whenever the signal ENBL COUNTER TO 0 (i.e., high) is not received from OPERATION CONTROL 1506 via line 1539 and the fifth output (i.e., output D4) of 32×8 BIT PROM 1625 is low. INTERRUPT VECTOR is the designation for the output of gate 1627 which is transferred to OPERATION CONTROL 1506 via cable 1538. The signal is generated whenever the fifth output (i.e., output D4) of 32×8 BIT PROM 1625 is high and signal CNTR=30 (i.e., high) is received from INSTRUCTION COUNTER 1508 via line 1523*a*.

The sixth output (i.e., output D5) of 32×8 BIT PROM 1625 is transferred via line 1538*d* to INFORMATION MULTIPLEXER 1507. The signal is designated PORT ADDR SEL. The seventh output (i.e., output D6) of 32×8 BIT PROM 1625 is a signal designated A0 ADDR. It is transferred via cable 1538*a* to MICRO PROCESSOR 1511. The eighth output (i.e., D7) of 32×8 BIT PROM 1625 is transferred via cable 1538 to OPERATION CONTROL 1506 with a signal designation BUS MSTR ENBL. The purpose of each of the output signals of CONTROL PROM 1504 is discussed in more detail below.

FIG. 7 also shows the detailed implementation of ADDRESS MULTIPLEXER 1509. QUAD MUX 1629 is always enabled as can be seen (i.e., input EN is attached to ground). QUAD MUX 1629 selects for output via cable 1525 either the signals received via cable 1522 or the signals received via cable 1521*a*. The selection is based upon the state of line 1539. When OPERATION CONTROL 1506 makes line 1539 low, signal BMUX FROM ADDR REQ is said to be present and the input from cable 1521*a* is selected by QUAD MUX 1629 for output via cable 1525. When OPERATION CONTROL 1506 makes line 1539 high, signal BMUX FROM ADDR REQ is not present causing QUAD MUX 1629 to select the input received via cable 1522 for output via cable 1525. The four conductors of cable 1522 transfer the states of four of the eight bit positions of 32×8 BIT PROM 1628 as shown. Cable 1521*a* transfers four of the 16 bit positions of cable 1521 originating at ADDRESS BUFFER 1503 to ADDRESS MULTIPLEXER 1509. The output of ADDRESS MULTIPLEXER 1509 (i.e., cable 1525) supplies the four bit input to the MICRO PROCESSOR 1511. This is discussed further below.

Figure 8:
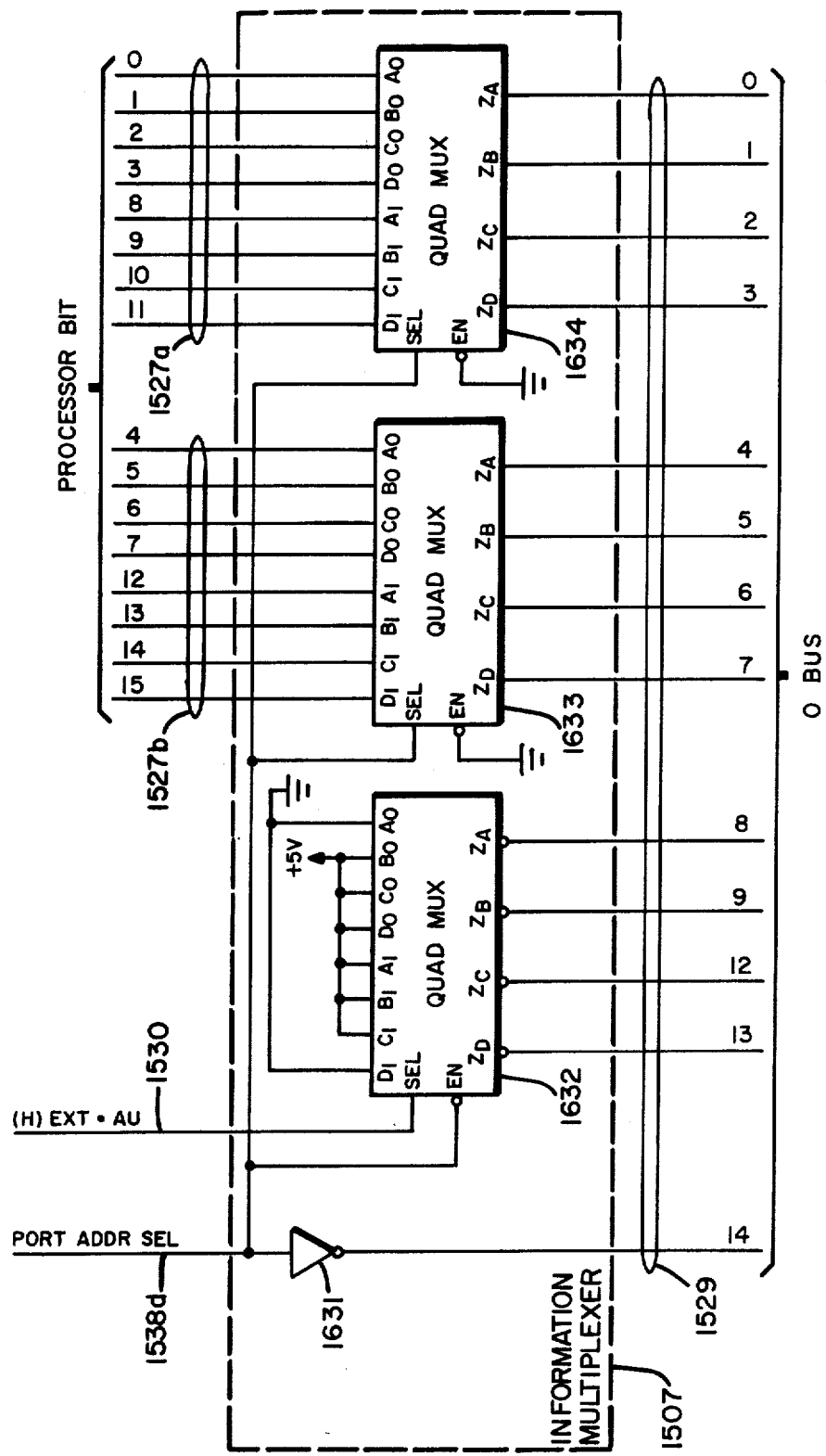
FIG. 8 is a diagram of INFORMATION MULTIPLEXER 1507.
Figure 9A:
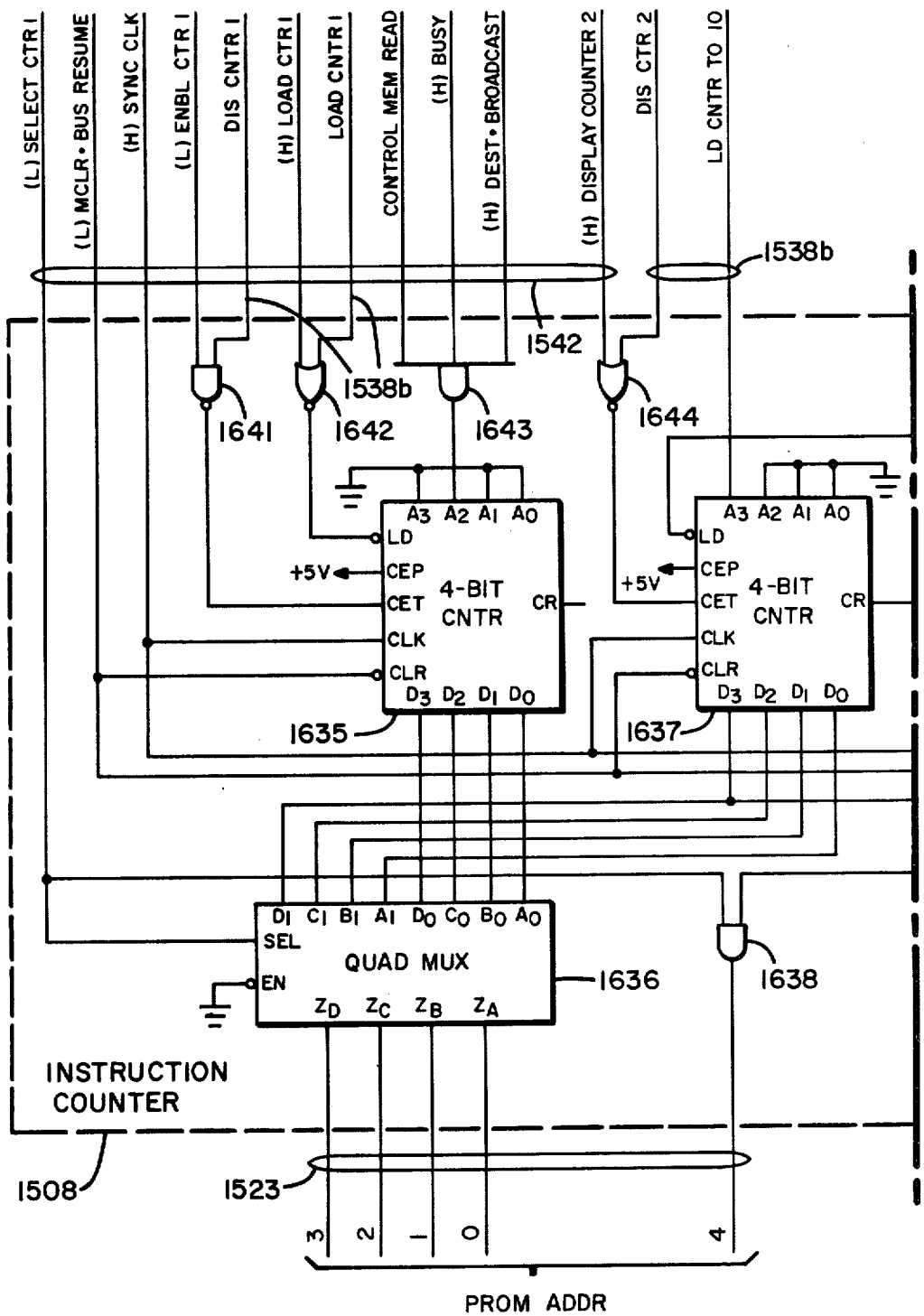
Figure 9B:
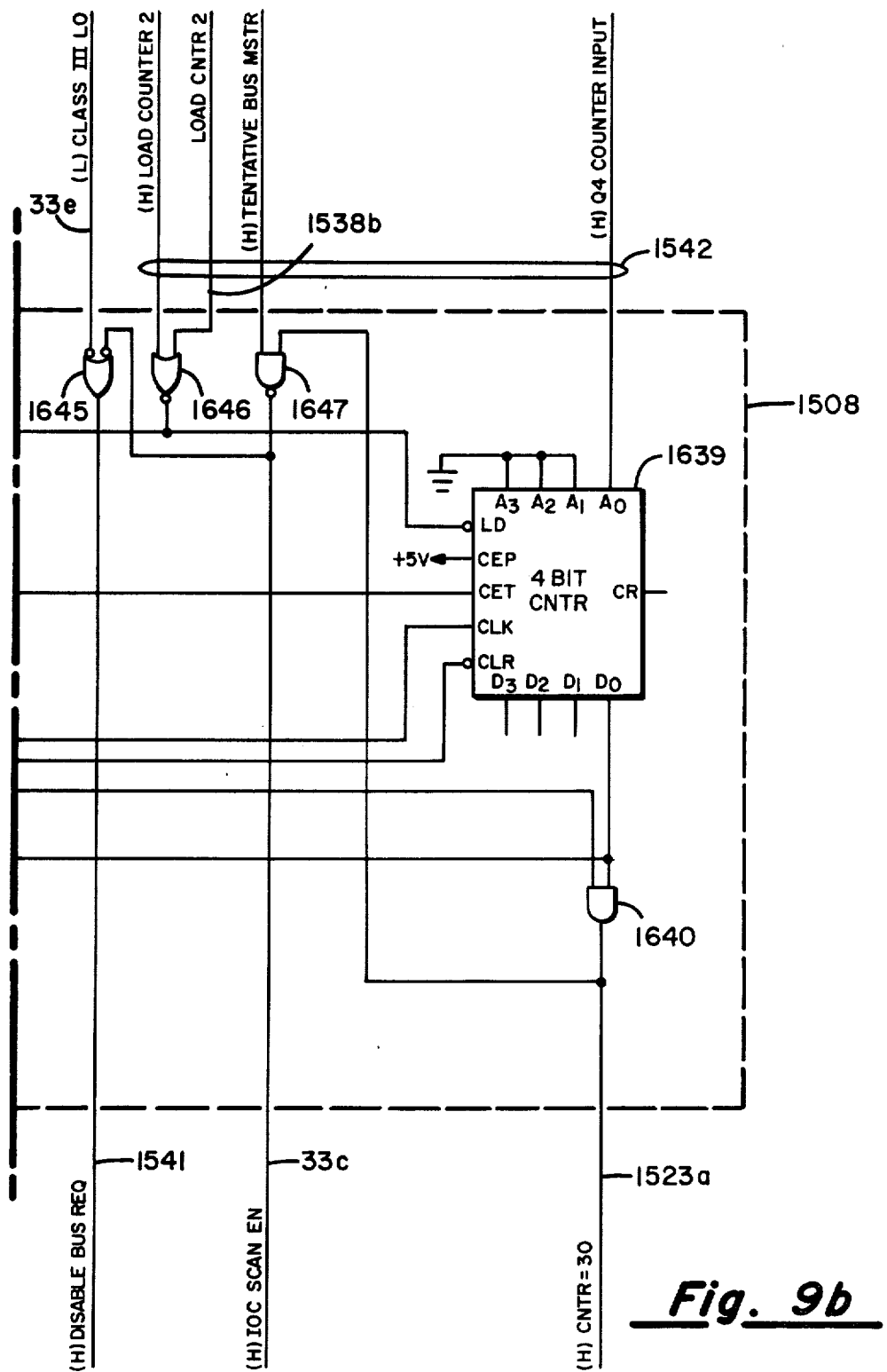

INFORMATION MULTIPLEXER 1507 is shown in detail by FIG. 8. INFORMATION MULTIPLEXER 1507 combines data received from MICRO PROCESSOR 1511 (via cables 1527*a* and 1527*b*) and elsewhere, to produce composite control signals to be transferred to MAIN BUS 10 (via cable 1529, BUS INFORMATION BUFFER 1502 and cable 33*d*), enabling MICRO PROCESSOR 1511 to communicate with other BUS INFORMATION UNITS. QUAD MUX 1633 and 1634 actually produce the eight lower order bits by selecting either PROCESSOR BIT 0--PROCESSOR BIT 7 received via cable 1527*a* or PROCESSOR BIT 8-PROCESSOR BIT 15 for transfer to BUS INFORMATION BUFFER 1502 via cable 1529. The selection is made based upon the state of line 1538*d* received from CONTROL PROM 1504. If signal PORT ADDR SEL is present (i.e., line 1538*d* is high), PROCESSOR BIT 8-PROCESSOR BIT 15 is selected. As stated above, the state of line 1538*d* is directly determined by output D5 of 32×8 BIT PROM 1625 (see also FIG. 7). QUAD MUX 1633 and 1634 are always enabled (i.e., input EN is grounded).

Inputs A0 and D1 of QUAD MUX 1632 are grounded and all other signal inputs are connected to +5 volts. QUAD MUX 1632 has its enable input connected to line 1538*d*, disabling QUAD MUX 1632 whenever line 1532*d* is high. The selection input (i.e., input SEL) of QUAD MUX 1632 is connected to OPERATION CONTROL 1506 via line 1530. Whenever signal EXT.AU is present (i.e., line 1530 is high) and QUAD MUX 1632 is enabled, output ZA is low and output ZD is high. Whenever signal EXT.AU is not present and QUAD MUX 1632 is enabled, output ZA is high and output ZD is low. In either case, outputs ZB and ZC are low. The most significant bit position output from INFORMATION MULTIPLEXER 1507 via line 1529 is designated O BUS 14 which is simply the state of line 1538*d* inverted by inverter 1631.

Figure 9:
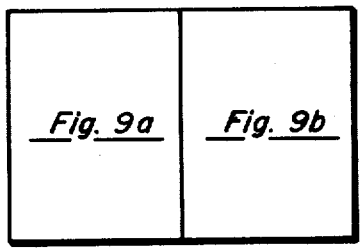
FIGS. 9a and 9b are diagrams of INSTRUCTION COUNTER 1508.

FIG. 9 shows the details of INSTRUCTION COUNTER 1508, whose output is used primarily to address INSTRUCTION PROM 1510 and CONTROL PROM 1504. QUAD MUX 1636 selects whether the four least significant bits of that address (i.e., PROM ADDR 0-PROM ADDR 3) are from counter 1 (i.e., 4-BIT CNTR 1635) or from counter 2 (i.e., 4-BIT CNTR 1637). The selection is made based upon whether signal SELECT CTR 1 is present (i.e., corresponding conductor of cable 1542 low) or not (i.e., corresponding conductor of cable 1542 high). If SELECT CTR 1 is present, QUAD MUX 1636 selects the output of 4-BIT CNTR 1635. If SELECT CTR 1 is not present, QUAD MUX 1636 selects the output of 4-BIT CNTR 1637. Notice that the enable input (i.e., input EN) is grounded so QUAD MUX 1636 is always enabled for output.

The most significant bit position of the prom address (i.e., PROM ADDR 4) is output from gate 1638. It can be seen that PROM ADDR 4 will always be low whenever SELECT CTR 1 is present. Therefore, counter 1 (i.e., 4-BIT CNTR 1635) can only be used to address the first 16 addressable locations (i.e., address 0-15) of 32×8 BIT PROM 1625, 32×8 BIT PROM 1628, and 32×8 BIT PROM 1630. The address is, of course, transferred to CONTROL PROM 1504 and to INSTRUCTION PROM 1510 via cable 1523.

As explained above, counter 1 can only address the first 16 addressable locations of the proms. Counter 2 can address all 32 addressable locations of the proms. Because 4-BIT CNTR 1637 can only uniquely address 16 addressable locations, an additional bit position is needed. The lowest order bit position (i.e., output D0) of 4-BIT CNTR 1639 serves this function and is connected to gate 1638. The counter enable input (i.e., input CET) of 4-BIT CNTR 1639 is connected to the carry output (i.e., output CR) of 4-BIT CNTR 1637 to enable 4-BIT CNTR 1639 to assist in addressing the 16 upper addressable locations (i.e., addresses 16-31) of the proms. 4-BIT CNTR 1635, 1637, and 1639 are all cleared by a signal designated MCLR.BUS RESUME (i.e., low) on the corresponding conductor of cable 1542. 4-BIT CNTR 1635, 1637, and 1639 are incremented by the clock input from signal SYNC CLK received from OPERATION CONTROL 1506. As is explained below, SYNC CLK is actually derived from the MASTER CLOCK signal transferred via MAIN BUS 10.

As explained above, 4-BIT CNTR 1639 is enabled for incrementation by the carry output (i.e., output CR) of 4-BIT CNTR 1637. 4-BIT CNTR 1637 is enabled for incrementation (i.e., high present at input CET) from the output of gate 1644. As can be seen 4-BIT CNTR 1637 is enabled for incrementation only when the two inputs of gate 1644 are low (i.e., signal DISPLAY COUNTER 2 and signal DIS CTR 2 are not present). 4-BIT CNTR 1635 is enabled for incrementation by gate 1641 whenever signal ENBL CTR 1 is present (i.e., corresponding conductor of cable 1542 is low) or when signal DIS CNTR 1 is not present (i.e., corresponding conductor of cable 1538b is low).

As can be seen from the listing of the contents of INSTRUCTION PROM 1508 and CONTROL PROM 1504 (see above), execution by MICRO PROCESSOR 1511 beginning at address 0 performs a WRITE CONTROL MEMORY (i.e., control registers of MICRO PROCESSOR 1511); beginning at address 4 performs a READ CONTROL MEMORY (i.e., control registers of MICRO PROCESSOR 1511); beginning at address $10_8$ performs a READ or WRITE DMA (i.e., BULK) TRANSFER; and beginning at address $30_8$ generates a MONITOR INTERRUPT. To perform these various functions, therefore, INSTRUCTION COUNTER 1508 must be preset to the desired beginning address value. This is accomplished by loading or presetting 4-BIT CNTR 1635, 1637, and 1639 with the predetermined values for the functions desired. For example, 4-BIT CNTR 1635 may be preset to a value of 4 by receipt of a high at the third bit position of the data input (i.e., input A2) and a low at the load enable input (i.e., input LD). A high is produced at input A2 by gate 1643 if signal CONTROL MEMORY READ, signal BUSY, and signal DEST.BROADCAST, being all highs, are present at gate 1643. A low is produced at input LD by gate 1642 if either signal LOAD CTR 1 or signal LOAD CNTR 1 is present.

4-BIT CNTR 1637 may be loaded to $10_8$ (i.e., to be interpreted as either $10_8$ or $30_8$ depending upon the contents of 4-BIT CNTR 1639) by receiving a high as input A3 (i.e., signal LD CNTR TO 10 present) and a low at input LD which is driven by gate 1646. A high at either input to gate 1646 causes input LD to be low. Either the presence of signal LOAD COUNTER 2 or the presence of LOAD CNTR 2 will cause gate 1646 to make input LD of 4-BIT CNTR 1637 low. Notice that the LD input of 4-BIT CNTR 1639 also becomes low at the same time. This permits 4-BIT CNTR 1637 to be loaded with a 1 (i.e., output D0 becomes high which is interpreted as $20_8$) if signal Q4 COUNTER INPUT is also present (i.e., corresponding conductor of cable 1542 is high).

The remaining logic of INSTRUCTION COUNTER 1508 (i.e., gates 1645, 1647 and 1640) are used for control of MONITOR INTERRUPT. As stated above, this mode is present when MICRO PROCESSOR 1511 executes the MONITOR INTERRUPT micro program beginning at prom address $30_8$. Gate 1640 senses whenever 4-BIT CNTR 1637 and 4-BIT CNTR 1639 contain at least $30_8$. This is done by observing output D3 of 4-BIT CNTR 1637 and output D0 of 4-BIT CNTR 1639. Whenever both of these are high, gate 1640 outputs a high on line 1523a as signal CNTR=30 which is transferred to CONTROL PROM 1504 (see also FIG. 7). Gate 1647 produces signal IOC SCAN EN (i.e., high on corresponding conductor of cable 33c whenever CNTR=30 is not present or signal TENTATIVE BUS MSTR is not present (i.e., low on corresponding conductor of cable 1542). Gate 1645 produces signal DISABLE BUS REQ (i.e., high on corresponding conductor 1541) whenever IOC SCAN EN is not present or signal CLASS III LO is present (i.e., low on corresponding conductor of cable 33e is low). As is explained below, CLASS III LO is generated by RESOURCE CONTROLLER 11 and transferred via MAIN BUS 10 which is coupled to cable 33 in the manner also explained below.

Figure 10:
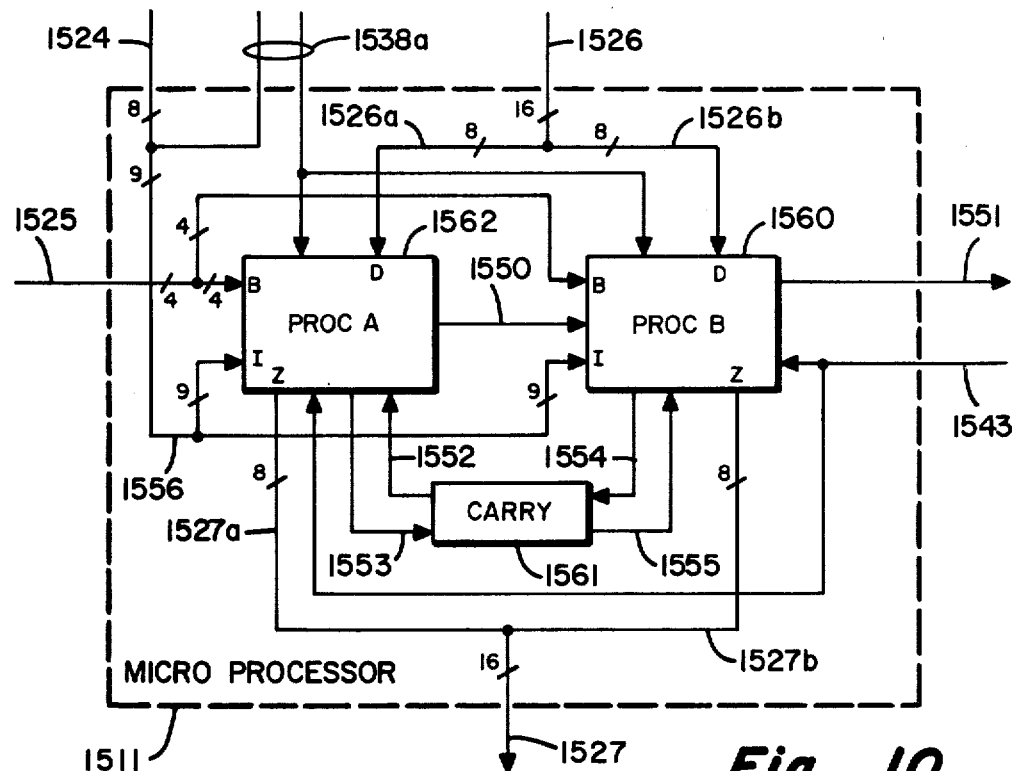
FIG. 10 is a block diagram of MICRO PROCESSOR 1511.

FIG. 10 shows the overall operation of MICRO PROCESSOR 1511. The Advanced Micro Devices (AMD) Model 2901A microprocessor was chosen. The AMD 2901A is a "bit-sliced" device. That is, the basic part handles 4-bit arithmetic but is expandable horizontally to process wider data words. In the preferred embodiment, four such devices are connected horizontally to process a data word width of 16 bits. FIG. 10 shows the interconnection of PROC A 1562 which contains two AMD 2901A devices with PROC B 1560 which also contains two AMD 2901A devices. PROC A 1562 is an eight bit microprocessor which when coupled to PROC B 1560, also an eight bit microprocessor, as shown, produces the desired 16 bit microprocessor. CARRY 1561 is the logic required for propagation of arithmetic carries between PROC A 1562 and PROC B 1560.

The 16 bit data input to MICRO PROCESSOR 1511 is received from DATA BUFFER 1505 via cable 1526. The 16 bit data output of MICRO PROCESSOR 1511 is via cable 1527. The eight least significant bits of the nine bit instruction word are supplied from INSTRUCTION PROM 1510 via line 1524. The most significant bit position of the instruction word is supplied from CONTROL PROM 1504 via one of the conductors of cable 1538a as shown. The remaining conductor of cable 1538a and the four conductors of cable 1525 transfer a register address to MICRO PROCESSOR 1511. Line 1543 transfers signal SYNC CLK which synchronizes MICRO PROCESSOR 1511 to the remainder of the system.

Figure 11:
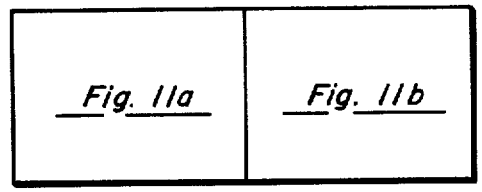
FIGS. 11a and 11b are diagrams of PROC A 1562.
Figure 12:
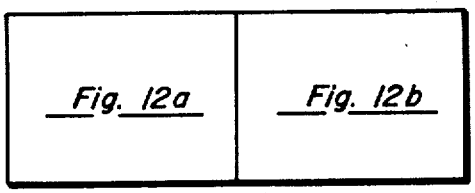
FIGS. 12a and 12b are diagrams of PROC B 1560.

PROC A 1562 is shown in detail in FIG. 11 and PROC B 1560 is shown in detail in FIG. 12. Each contains two AMD 2901A four bit microprocessors (i.e., 4-BIT PROCESSOR, 1650, 1651, 1652, and 1653). 4-BIT PROCESSOR 1651 handles the four least significant bit positions of the 16 bit data words. 4-BIT PROCESSOR 1650 handles the four next least significant. 4-BIT PROCESSOR 1652 handles the four most significant bit positions, and 4-BIT PROCESSOR 1653 handles the four next most significant. The four conductors of cable 1525 transfer signals B ADDR 0-3 from ADDRESS MULTIPLEXER 1509. These signals select a B register (internal to the AMD 2901A) for arithmetic computations. Line 1538a transfers signal A0 ADDR which is used to select one of two A registers. The connections to all four 4-BIT PROCESSORS is similar in that each receives the same instruction word, B ADDR input, A ADDR input, and SYNC CLK signal.

Figure 12A:
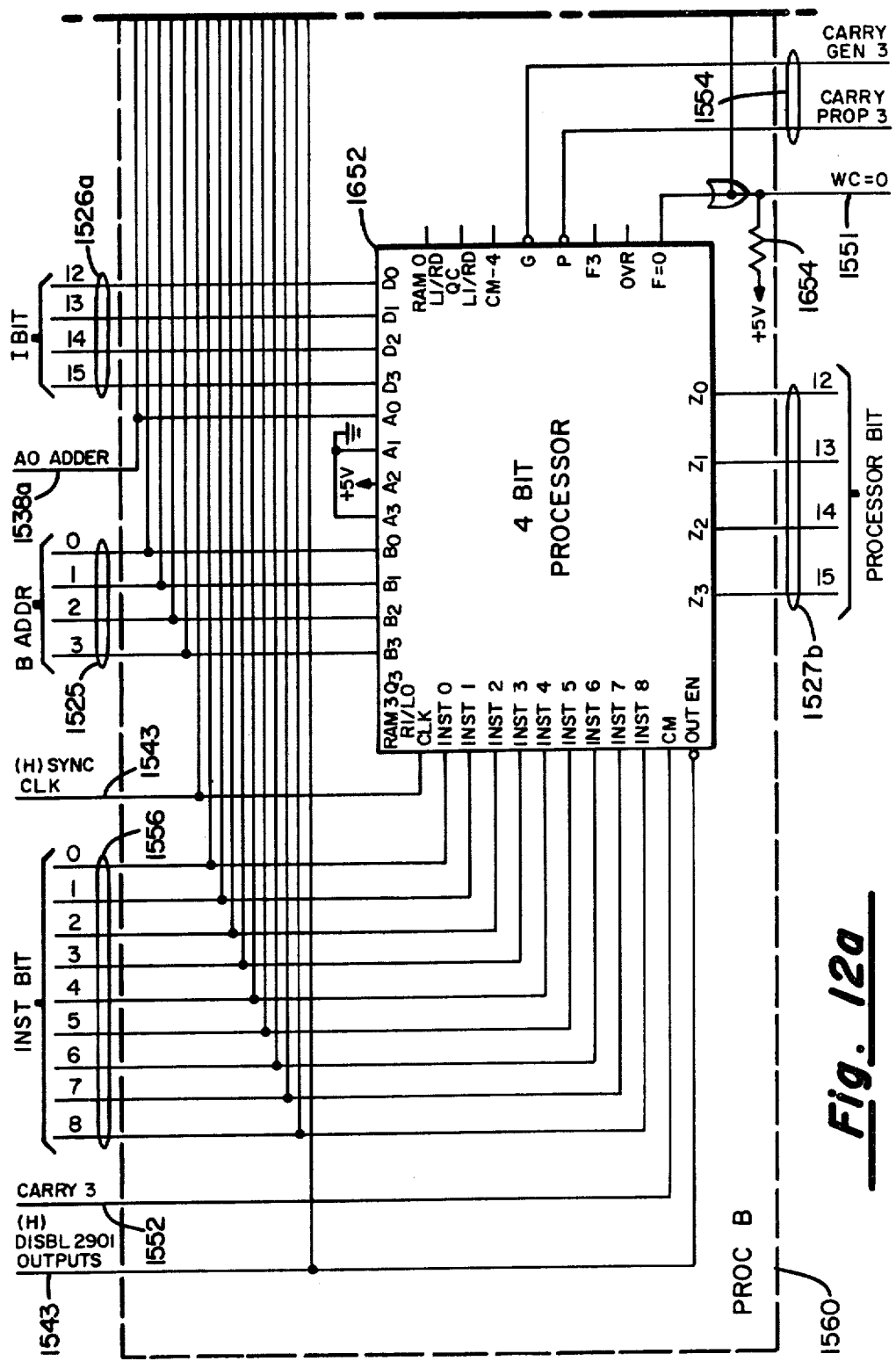
Figure 12B:
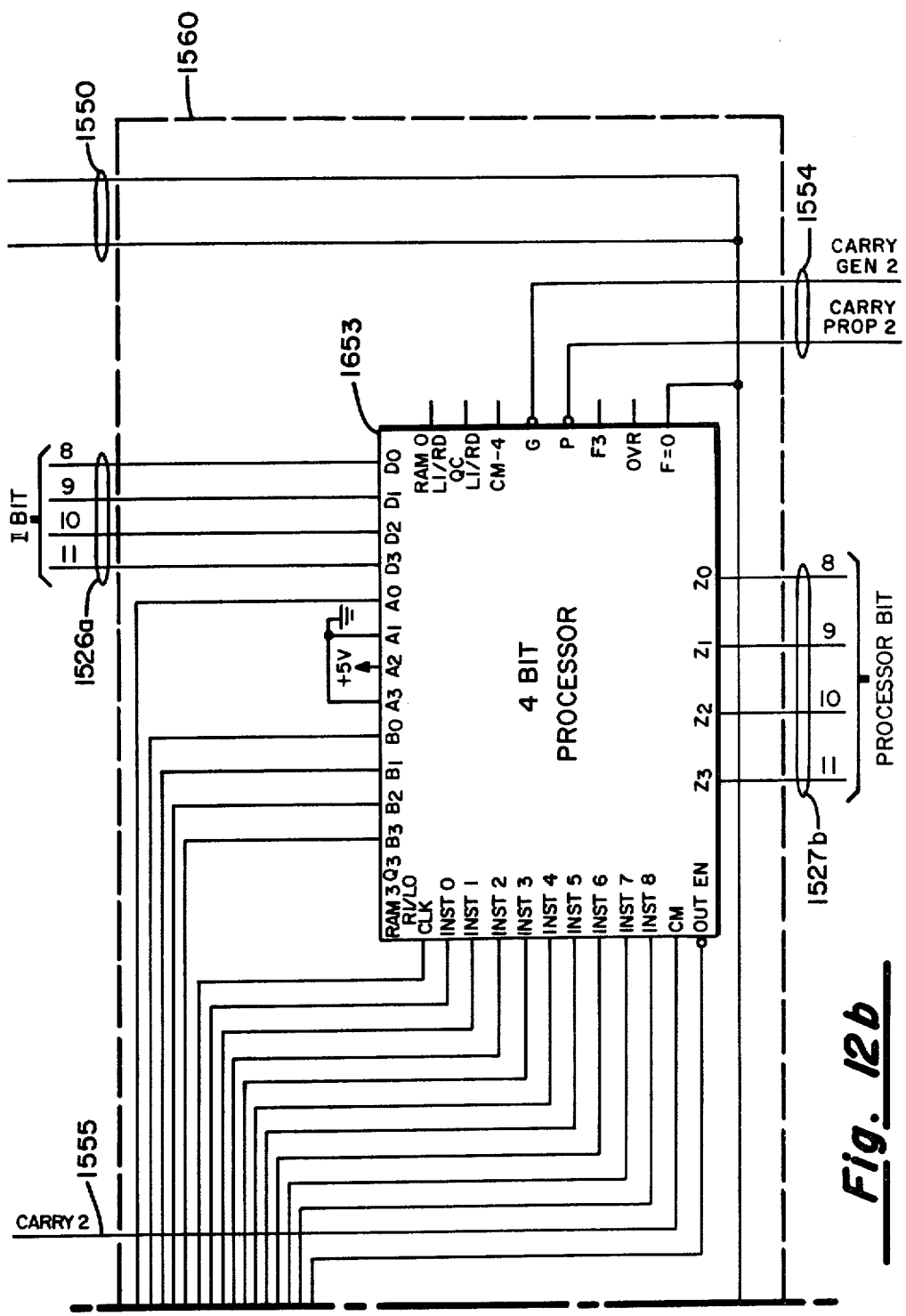

The major differences are that each receives a different four bit position as input from cable 1526 and each transfers its output via a different four of the conductors of cable 1527. Another difference is that each is connected to CARRY 1561 in a manner to properly handle carry propagation. Each 4-BIT PROCESSOR has an output F=0 which become high whenever the microprocessor arithmetic section becomes zero. These four outputs are wire-ored together and if all high, produce signal WC=0 (see FIG. 12a). This means the word count has reached zero and the function is complete. WC=0 is transferred to OPERATION CONTROL 1506 via line 1551.

Figure 13:
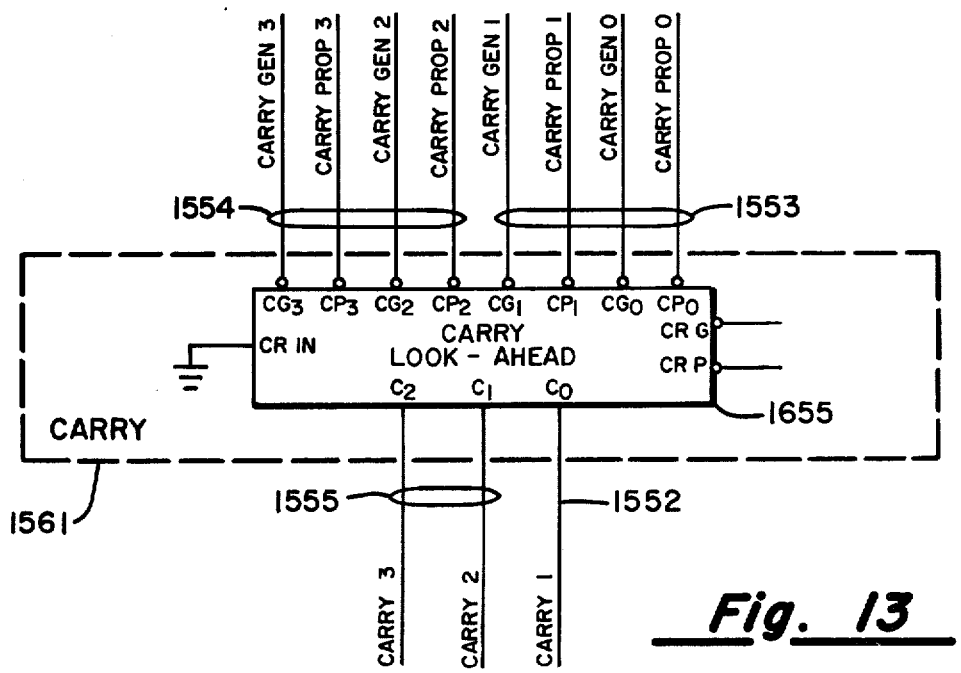
FIG. 13 is a diagram of CARRY 1561.
Figure 11A:
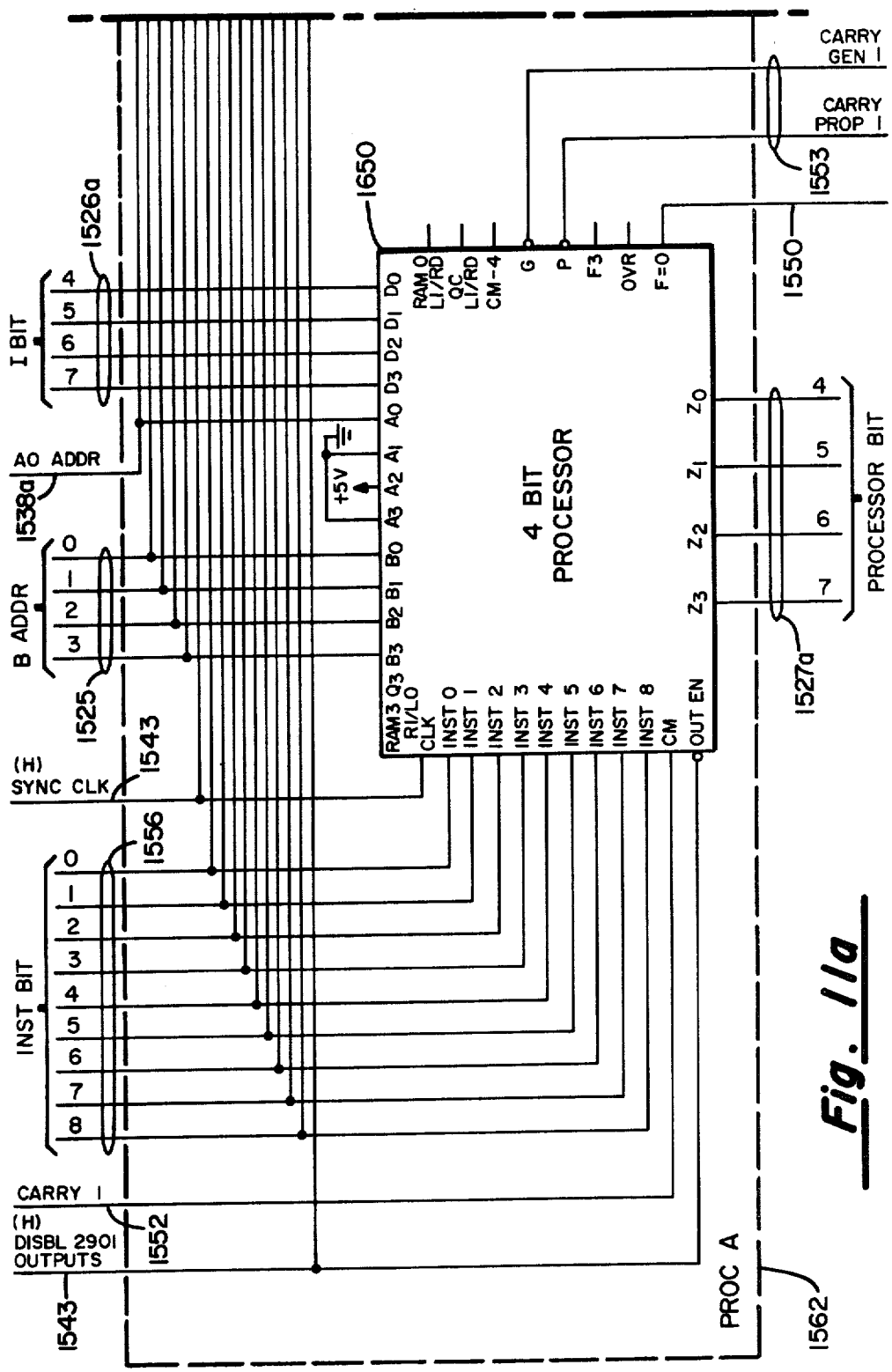
Figure 11B:
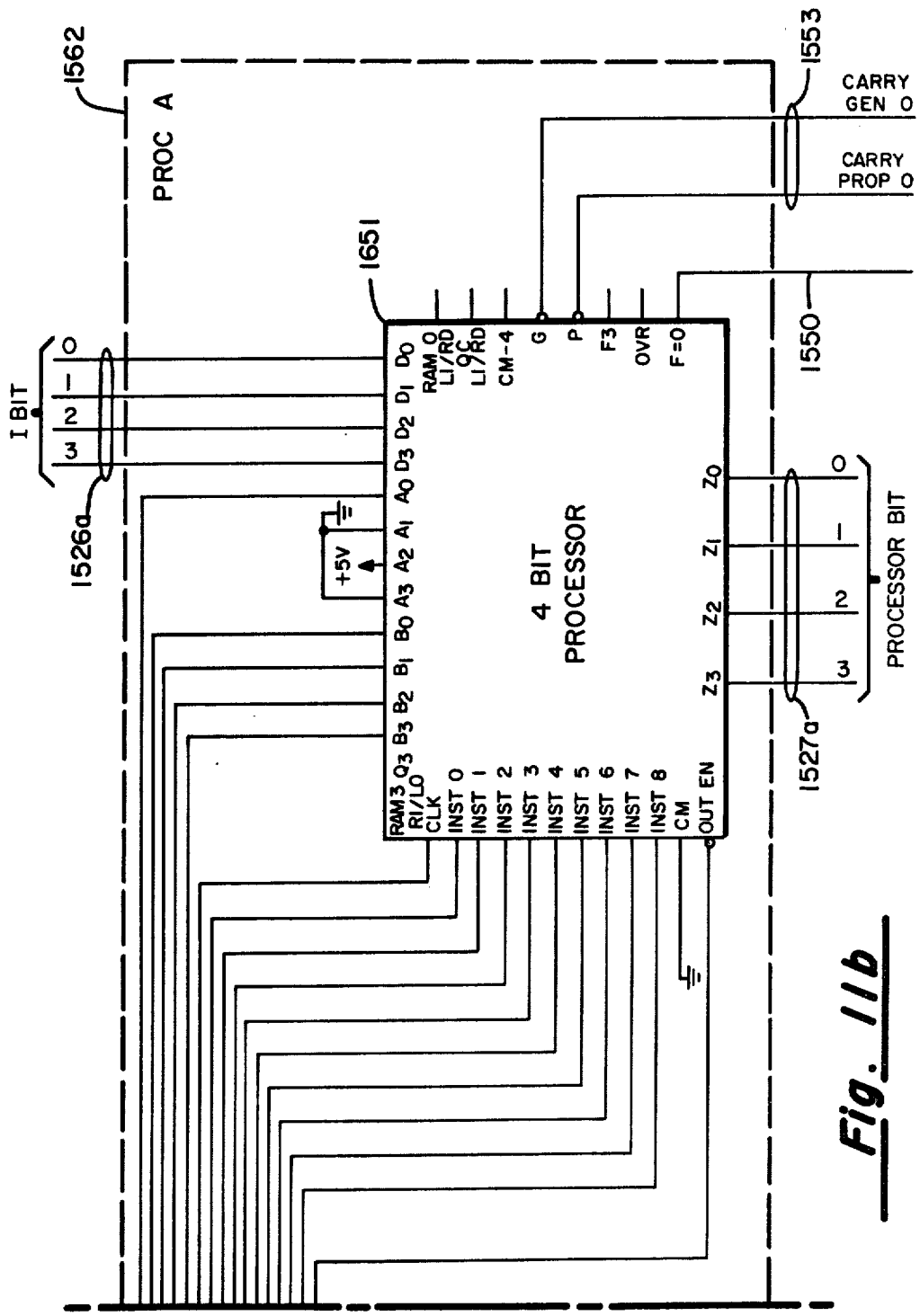

FIG. 13 is the detailed description of CARRY 1561. CARRY LOOK-AHEAD 1655 is industry standard part 74S182. CARRY 1561 simply propagates the carries generated by the four 4-BIT PROCESSORS.

Figure 14:
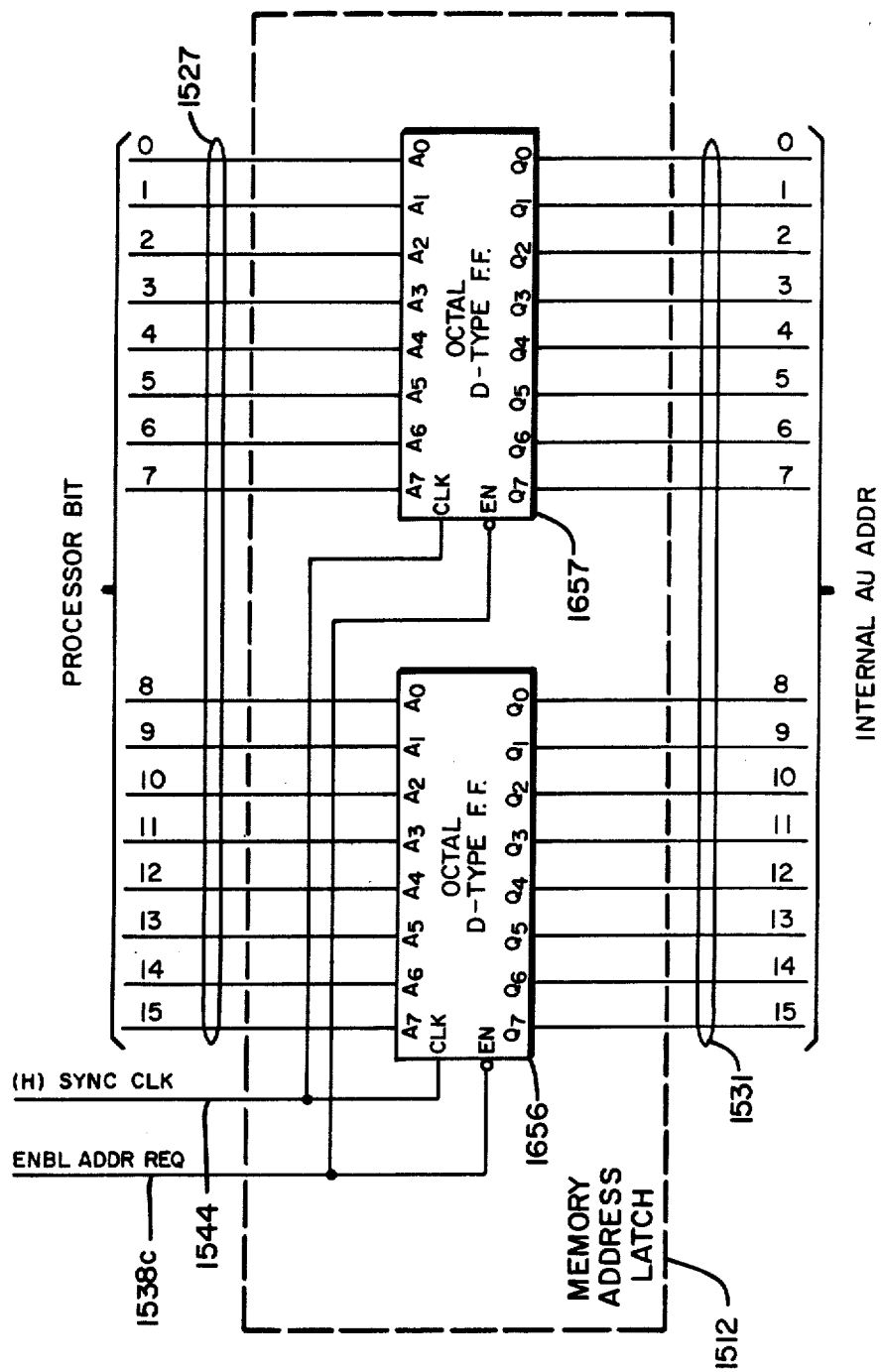
FIG. 14 is a diagram of MEMORY ADDRESS LATCH 1512.
Figure 15A:
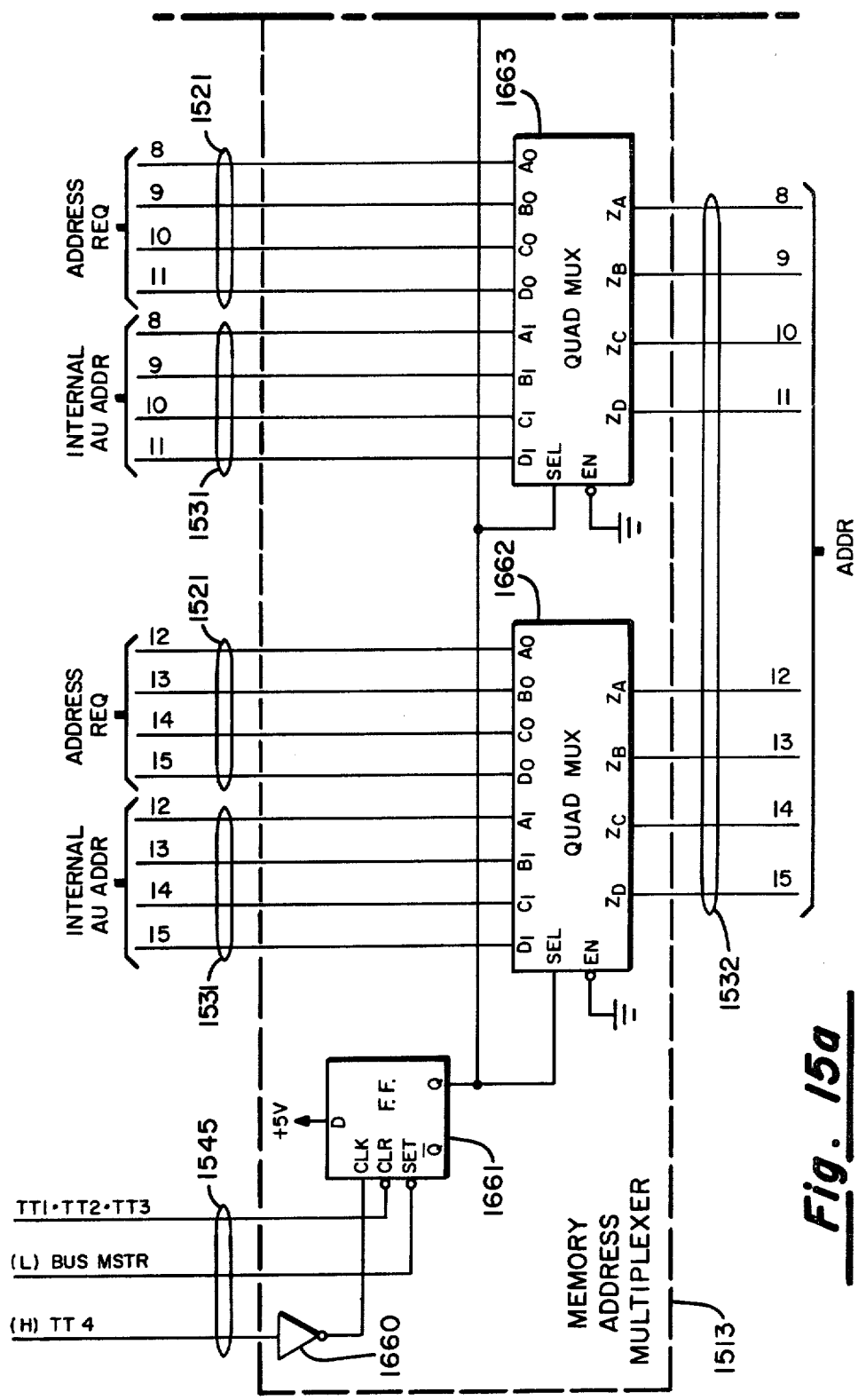
Figure 15B:
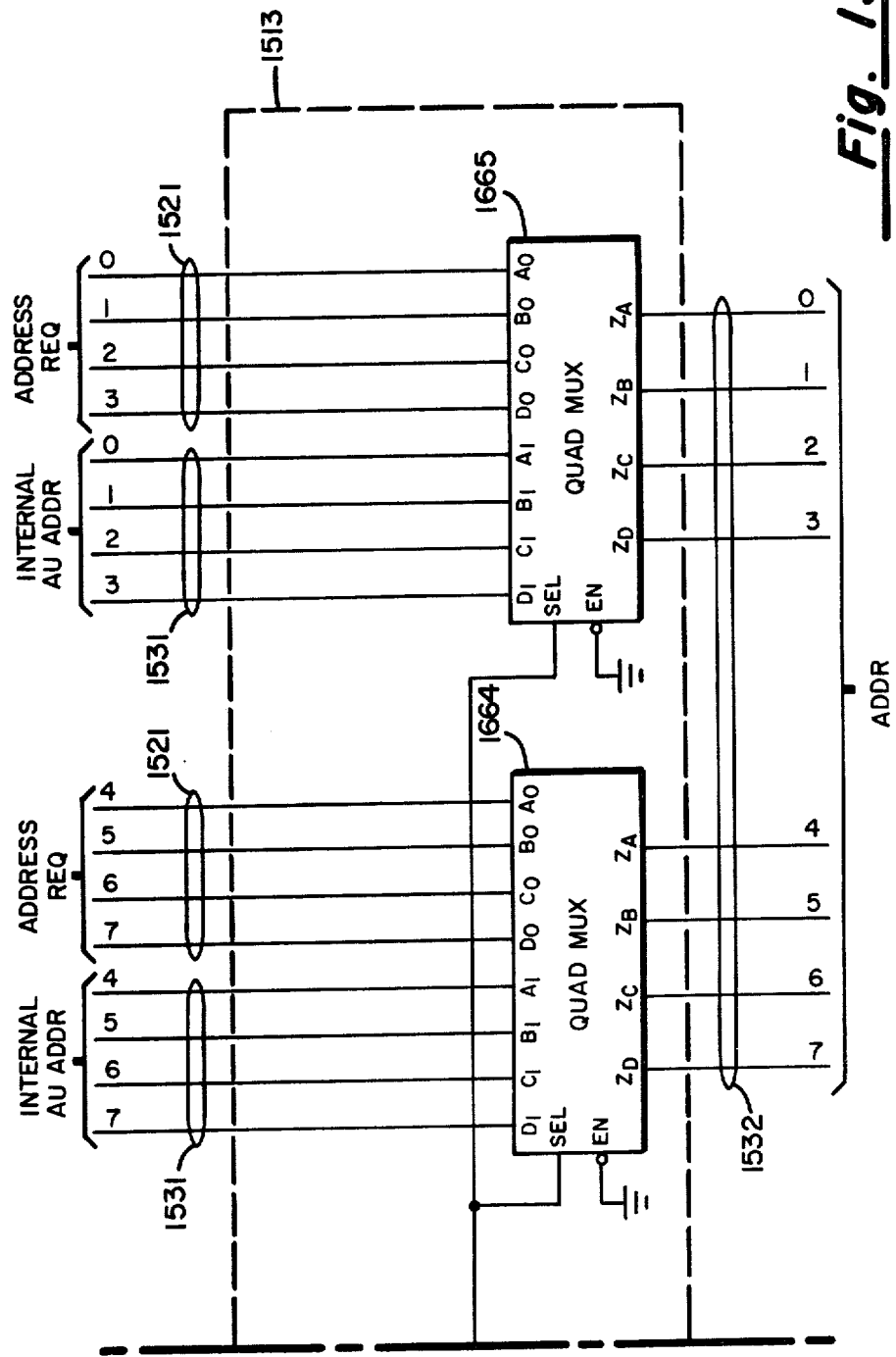

MEMORY ADDRESS LATCH 1512 is shown in detail in FIG. 14. MEMORY ADDRESS LATCH 1512 uses OCTAL D-TYPE F.F. 1656 and 1657 to temporarily store the 16 bit output of MICRO PROCESSOR 1511 when that 16 bit output is an address to be used to access LOCAL MEMORY 20. The 16 bit output of MICRO PROCESSOR 1511 is received via cable 1527. The buffered output of MEMORY ADDRESS LATCH 1512 is transferred to MEMORY ADDRESS MULTIPLEXER 1513 via cable 1531. The clock input (i.e., input CLK) of OCTAL D-TYPE F.F. 1656 and 1657 is signal SYNC CLK received from OPERATION CONTROL 1506 via line 1544. The enable input (i.e., input EN) is received from CONTROL PROM 1504 as signal ENBL ADDR REQ (i.e., low on line 1538c). Reference to FIG. 7 shows that ENBL ADDER REQ is produced by 32×8 BIT PROM 1625 at bit position 1 (i.e., output D1).

Figure 15:
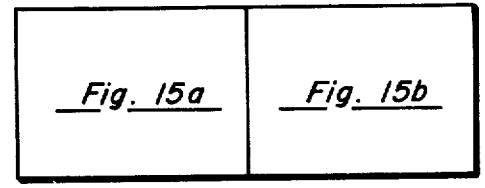
FIGS. 15a and 15b are diagrams of MEMORY ADDRESS MULTIPLEXER 1513.
Figure 2A:
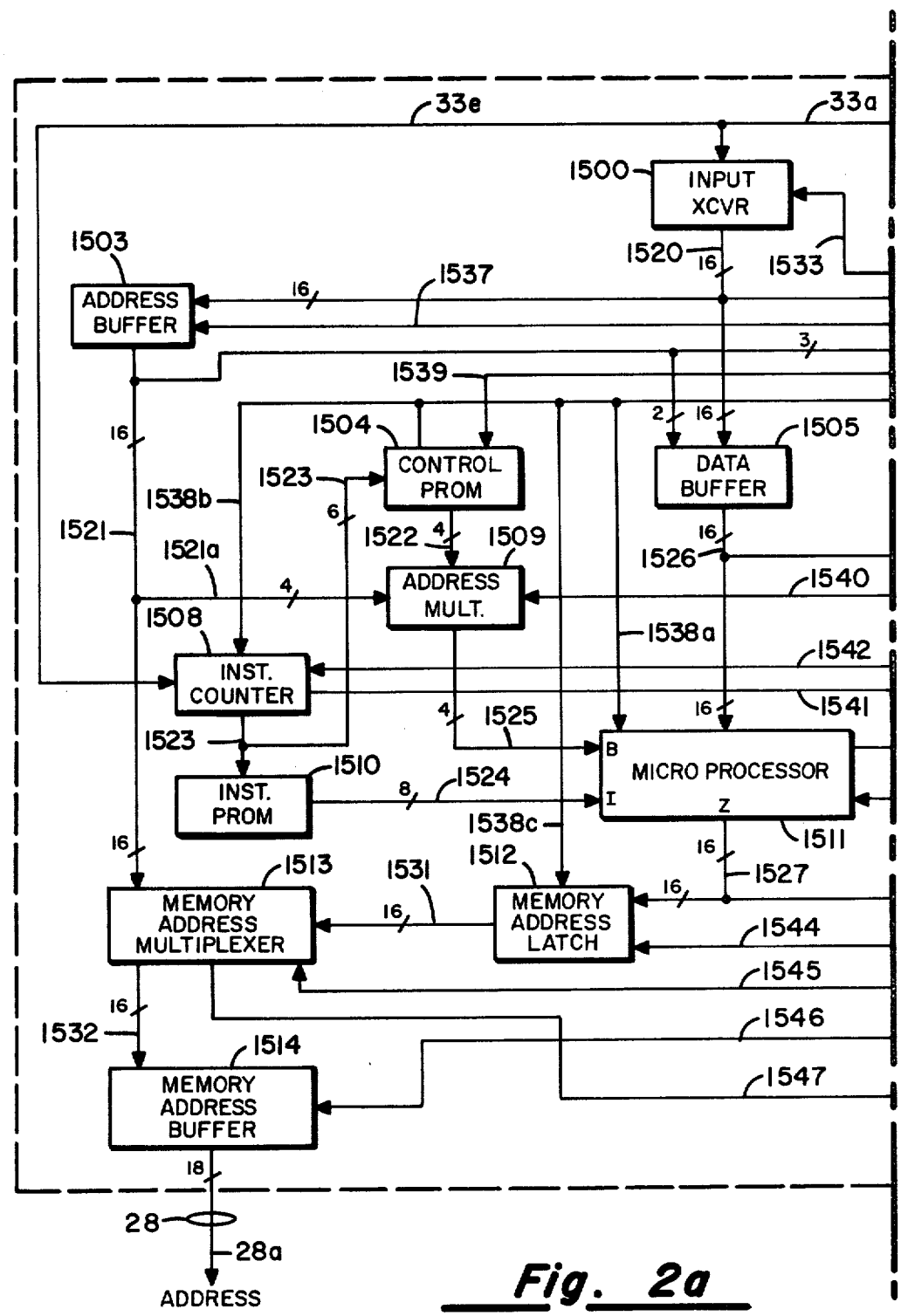
Figure 2B:
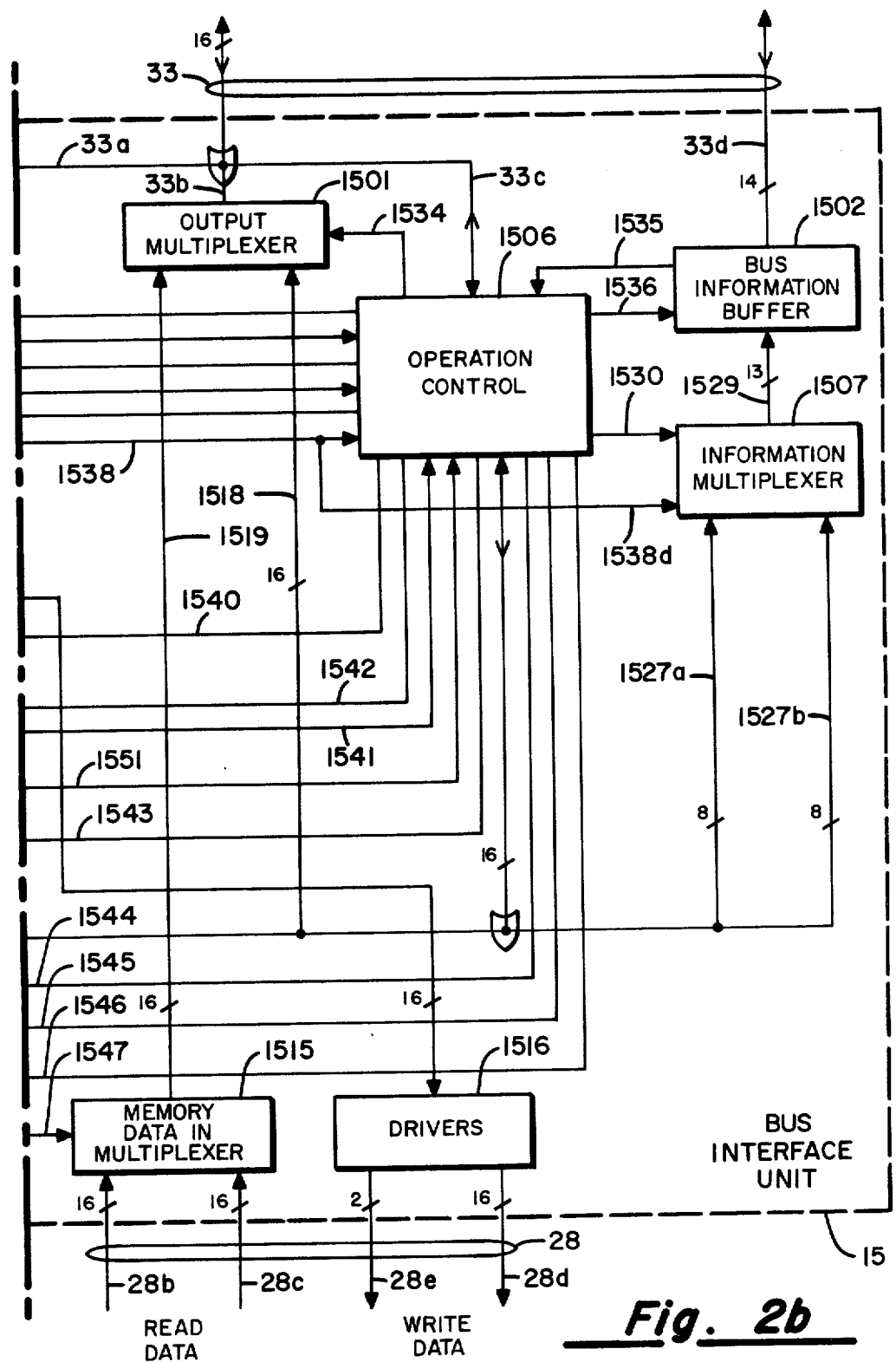
Figure 3B:
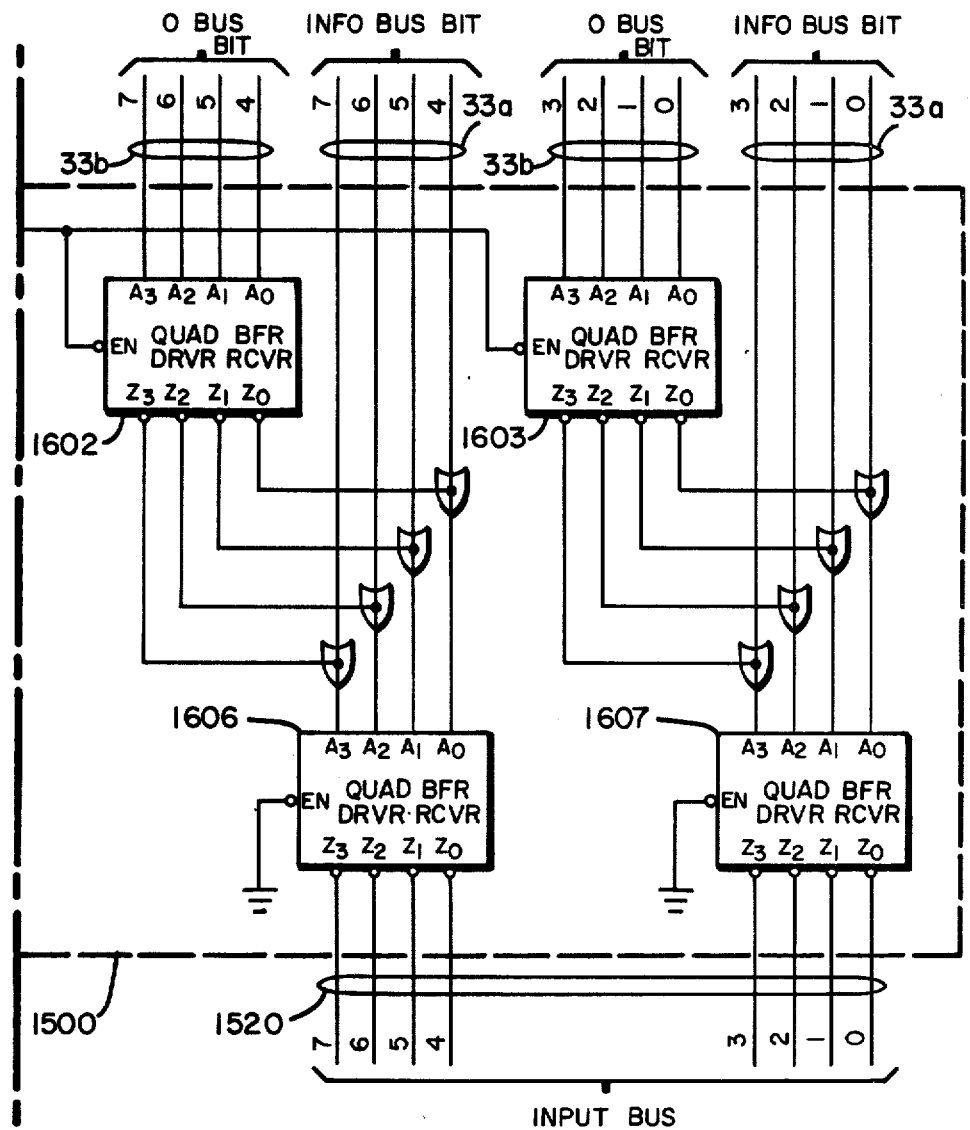

As shown in FIG. 15, the 16 conductors of cable 1531 are connected to QUAD MUX 1662, 1663, 1664, and 1665 of MEMORY ADDRESS MULTIPLEXER 1513. The other four data inputs of QUAD MUX 1662, 1663, 1664, and 1665 are connected to the corresponding conductors of cable 1521 which transfers a 16 bit address from ADDRESS BUFFER 1503. It can be seen that MEMORY ADDRESS MULTIPLEXER 1513 selects for transfer to MEMORY ADDRESS BUFFER 1514 via cable 1532, either the 16 bit address received via cable 1521 or the 16 bit address received via cable 1531. The selection is made based upon the state of D-TYPE F.F. 1661. If D-TYPE F.F. 1661 is set, output Q is high and the 16 bits received from MICRO PROCESSOR 1511 via cable 1531 are selected. If D-TYPE F.F. 1661 is clear, output Q is low and the 16 bits received from ADDRESS BUFFER 1504 via cable 1521 are selected. Presence of signal BUS MSTR (i.e., low on corresponding conductor of cable 1545) causes D-TYPE F.F. 1661 to be set. Presence of timing signal TT1.TT2.TT3 (i.e., low on corresponding conductor of cable 1545) causes D-TYPE F.F. 1661 to be cleared. Because it is a data flip-flop, each transition to a high signal at the clock input causes D-TYPE F.F. 1661 to be set as input D is always high. This is caused by presence and absence of signal TT4 (i.e., high and then low on corresponding conductor of cable 1545) as inverted by inverter 1660. As can be seen, MEMORY ADDRESS MULTIPLEXER 1513 is always enabled for output.

Referring to FIG. 16, MEMORY ADDRESS BUFFER 1514 is used primarily to drive the address lines (i.e., signals I/O ADDR BIT 1-I/O ADDR BIT 15 on the corresponding conductors of cable 28a) from BUS INTERFACE UNIT 15 to LOCAL MEMORY 20. QUAD BUFFER DRVR RCVR 1666, 1667, 1668, and 1669 transfer 15 bit positions of the 16 bit output of MEMORY ADDRESS MULTIPLEXER 1513 received via cable 1532 to LOCAL MEMORY 20 via cable 28a. Notice that bit position 0 (i.e., signal ADDR 0) is not transferred via QUAD BUFFER DRVR RCVR 1669. QUAD BUFFER DRVR RCVR 1666, 1667, 1668, and 1669 are constantly enabled. The memory enable signal, MEM ENBL, uses the least significant bit position of QUAD BUFFER DRVR RCVR 1669. Gates 1671 and 1672 cause transfer of the signals WRITE PULSE LOWER and WRITE PULSE UPPER (i.e., high on the corresponding conductor of cable 28a) to LOCAL MEMORY 20. This enables utilization of a LOCAL MEMORY 20 having a word width of 32 bit positions and $2^{15}$ addressable locations. The timing of either signal is determined by signal WRITE PULSE (i.e., high on corresponding conductor of cable 1546). WRITE PULSE produces either a low output from gate 1671 or a low output from gate 1672 depending upon whether the least significant bit position of the 16 bit address, ADDR 0 (i.e., high on corresponding conductor of 1532), is or is not present. ADDR 0 is applied to gate 1672. $\overline{ADDR\ 0}$ is applied to gate 1671 by inverter 1670.

Figure 17:
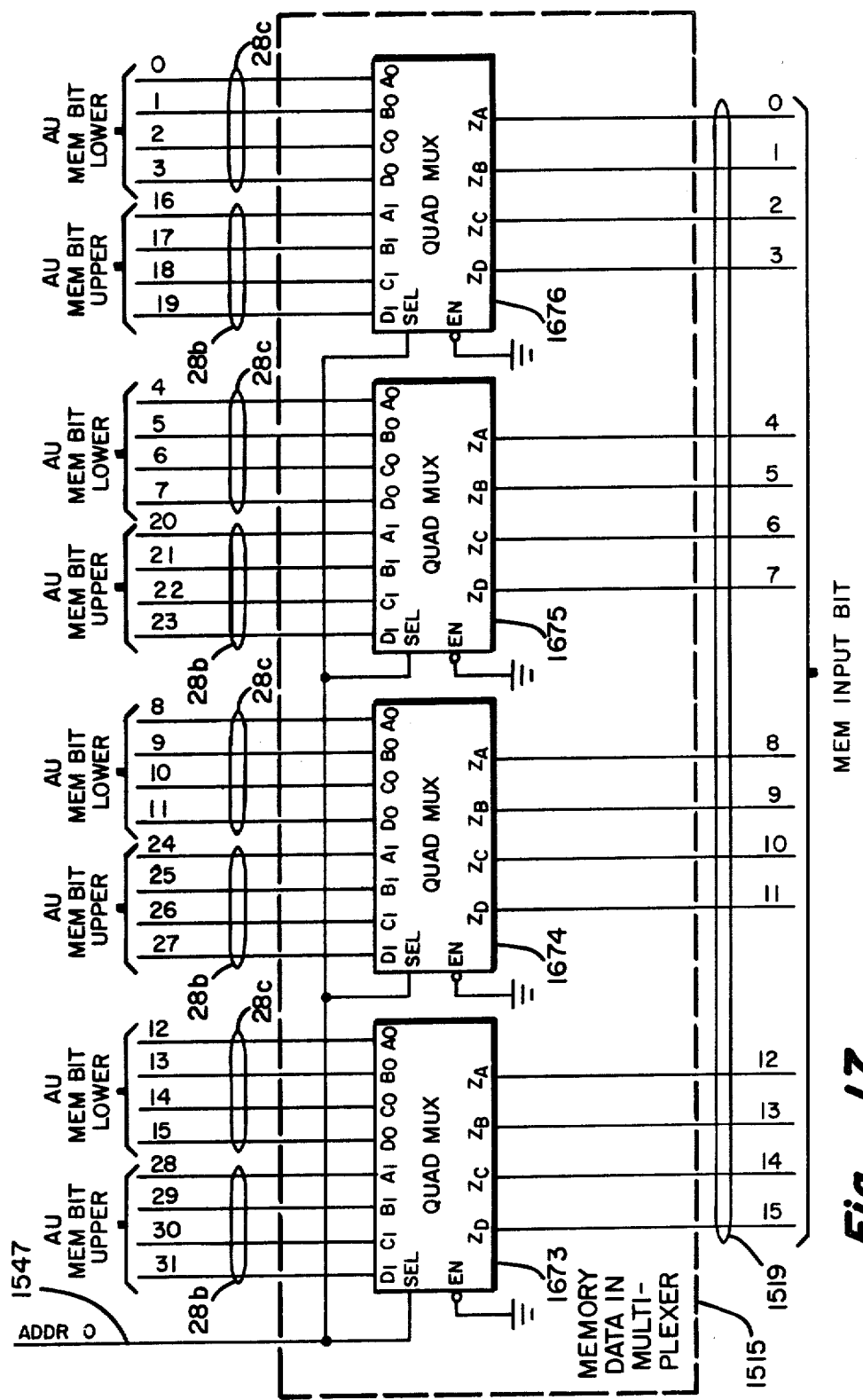
FIG. 17 is a diagram of MEMORY DATA IN MULTIPLEXER 1515.

MEMORY DATA IN MULTIPLEXER 1515 is shown in detail in FIG. 17. The purpose of MEMORY DATA IN MULTIPLEXER 1515 is the selection of the least significant bit positions or the 16 most significant bit positions as read from LOCAL MEMORY 20. As stated above, LOCAL MEMORY 20 has a basic word width of 32 bit positions. The selection is made by QUAD MUX 1673, 1674, 1675, and 1676 of the 16 bit positions received via cable 28b or the 16 bit positions received via cable 28c. As shown in FIG. 17, cable 28b transfers the 16 most significant bit positions (i.e., Signals AU MEM BIT 16 UPPER-AU MEM BIT 31 UPPER) and cable 28c transfers the 16 least significant bit positions (i.e., signals AU MEM BIT 0 LOWER-AU MEM BIT 15 LOWER). The selection is based upon the state of line 1547. If line 1547 is high, cable 28b is selected. If line 1547 is low, cable 28c is selected. As with MEMORY ADDRESS BUFFER 1514, the selection is based upon the least significant bit position of the 16 bit address received from MEMORY ADDRESS MULTIPLEXER 1513. Notice that QUAD MUX 1673, 1674, 1675, and 1676 are constantly enabled for output via cable 1519.

Figure 18:
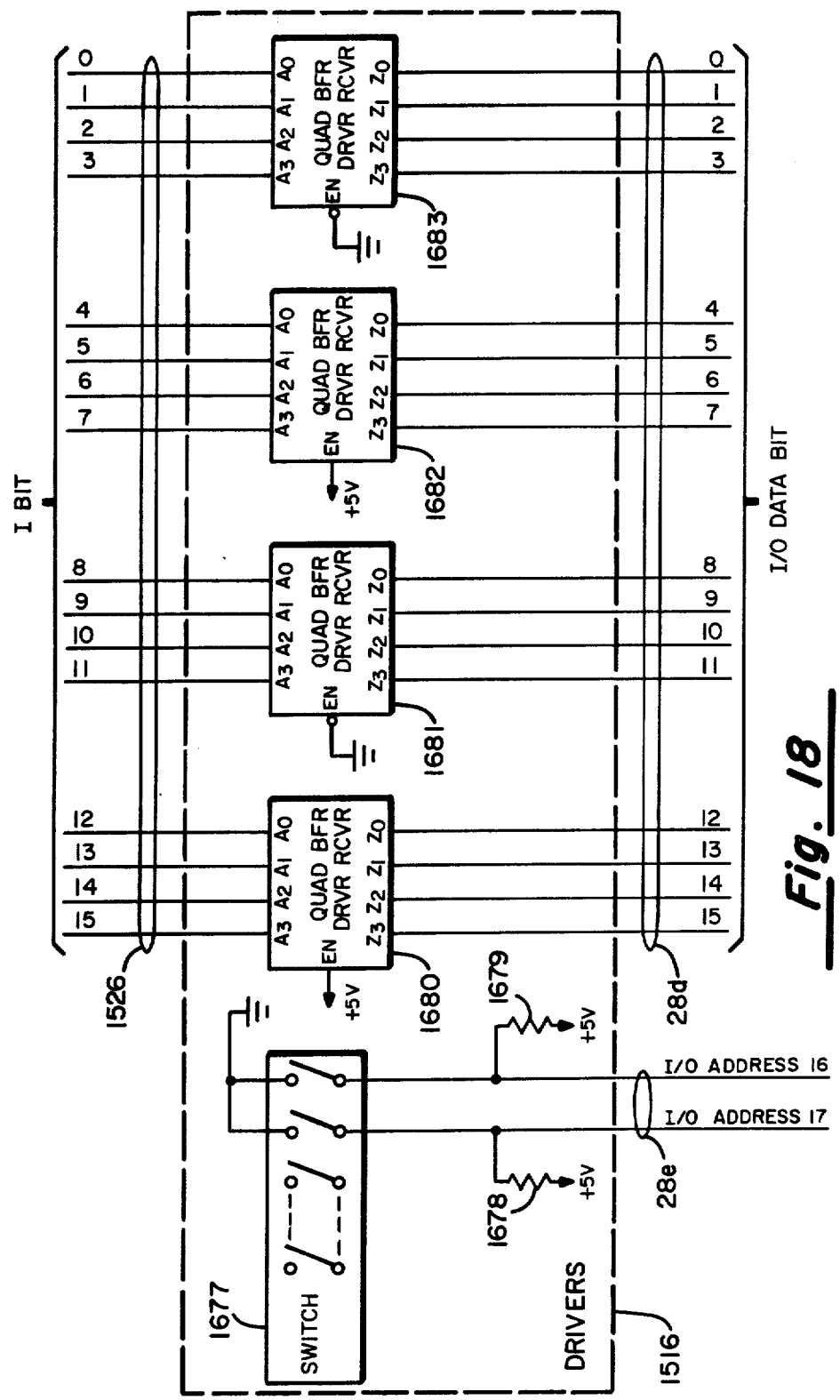
FIG. 18 is a diagram of DRIVERS 1516.

FIG. 18 shows DRIVERS 1516 in detail. It is the function of DRIVERS 1516 to drive the 16 data lines (i.e., cable 28d) for write operations in LOCAL MEMORY 20. This is accomplished by QUAD BUFFER DRVR RCVR 1680, 1681, 1682, and 1683. The data to be written into LOCAL MEMORY 20 is received via cable 1526 and transferred to LOCAL MEMORY 20 via cable 28d. SWITCH 1677 is used to manually add two additional bits of addressing if desired permitting a single continuous memory to be partitioned into several dedicated LOCAL MEMORIES.

Figure 19:
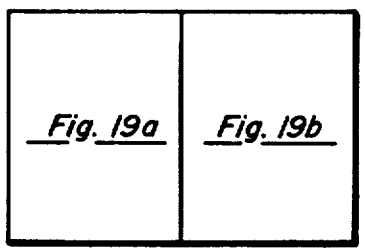
FIGS. 19a and 19b are block diagrams of OPERATION CONTROL 1506.

FIG. 19 shows the overall function of OPERATION CONTROL 1506. INTERNAL BUS DRIVER 1576 places commands and data generated by OPERATION CONTROL 1506 onto the processor bus used to distribute the output of MICRO PROCESSOR 1511 internally within BUS INTERFACE UNIT 15. MODE CONTROL 1575 contains the logic to control the mode changes within BUS INTERFACE UNIT 15.

The various operational sequences are timed by signals generated by SEQUENCE CONTROL 1571. INITIATE CONTROL 1577 is responsible for initializing the various modes. ID CHECK 1578 makes the comparisons to determine whether BUS INTERFACE UNIT 15 is being addressed by another user of MAIN BUS 10. TIMING 1572 receives the MASTER CLOCK signal from MAIN BUS 10 and generates and distributes derivative timing signals. DEVICE DECODE 1574 decodes the device code to be transmitted to activate the proper device request line. The device address is set by ID SET 1570.

Figure 20:
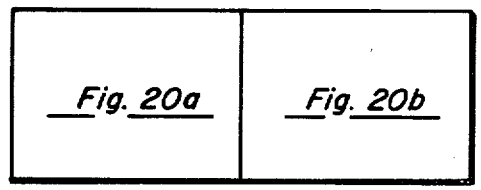
FIGS. 20a and 20b are diagrams of INTERNAL BUS DRIVER 1576.

FIG. 20 shows the detail of INTERNAL BUS DRIVER 1576 wherein the device identification code is wire-ored with the 16 bit output of MICRO PROCESSOR 1511. The 16 bit output of MICRO PROCESSOR 1511 is transferred via the 16 conductors of cable 1527 with the signals designated PROCESSOR BIT 0–PROCESSOR BIT 15. QUAD BUFFER DRVR RCVR 1687 wire-ores a low state at the four most significant bit positions (i.e., PROCESSOR BIT 12–PROCESSOR BIT 15) whenever enabled. QUAD BUFFER DRVR RCVR 1687 is enabled whenever inverter 1685 applies a high to input EN which occurs whenever signal ENBL INTERRUPT VECTOR is present (i.e., corresponding conductor of cable 1580 is low). Cable 1580 is received from SEQUENCE CONTROL 1571. Therefore, whenever SEQUENCE CONTROL 1571 produces the ENBL INTERRUPT VECTOR signal, PROCESSOR BIT 12–PROCESSOR BIT 15 of cable 1527 are driven low.

The output of QUAD BUFFER DRVR RCVR 1688 is wire-ored with PROCESSOR BIT 8–PROCESSOR BIT 11 of cable 1527. The most significant three bit positions of DEVICE ID (i.e., DEVICE ID 5–DEVICE ID 7) and ground comprise the four data inputs to QUAD BUFFER DRVR RCVR 1688. As with QUAD BUFFER DRVR RCVR 1687, QUAD BUFFER DRVR RCVR 1688 is enabled for output whenever signal ENBL INTERRUPT VECTOR is present, causing DEVICE ID 5–DEVICE ID 7 and a low to be impressed upon PROCESSOR BIT 8–PROCESSOR BIT 11.

The outputs of both QUAD BUFFER DRVR RCVR 1689 and 1690 are wire-ored with PROCESSOR BIT 4–PROCESSOR BIT 7. QUAD BUFFER DRVR RCVR 1689 receives DEVICE ID 1–DEVICE ID 4 as its data input. Therefore, QUAD BUFFER DRVR RCVR 1689 impresses DEVICE ID 1–DEVICE ID 4 on PROCESSOR BIT 4–PROCESSOR BIT 7 whenever ENBL INTERRUPT VECTOR signal is received and inverted by inverter 1685. QUAD BUFFER DRVR RCVR 1690 has signals EXT.AU, BROADCAST ENBL and two grounds as its four data inputs. Therefore, whenever enabled, QUAD BUFFER DRVR RCVR 1690 drives PROCESSOR BIT 4 and PROCESSOR BIT 5 to the state of EXT.AU and BROADCAST ENBL, respectively, and drives PROCESSOR BIT 6 and PROCESSOR BIT 7 to low. QUAD BUFFER DRVR RCVR 1690 is enabled whenever the output of inverter 1686 is high which occurs whenever signal ENBL STATUS REQ is present (i.e., corresponding conductor of cable 1580 is low).

The outputs of QUAD BUFFER DRVR RCVR 1691 and 1692 are wire-ored with PROCESSOR BIT 0–PROCESSOR BIT 3. QUAD BUFFER DRVR RCVR 1691 has two grounds, a +5 volts (i.e., VXA), and signal DEVICE ID 0 as its four data inputs. Therefore, whenever signal ENBL INTERRUPT VECTOR is present, QUAD BUFFER DRVR RCVR 1691 drives PROCESSOR BIT 0 and PROCESSOR BIT 2 low, drives PROCESSOR BIT 1 high, and drives PROCESSOR BIT 3 to the state of DEVICE ID 0. QUAD BUFFER DRVR RCVR 1692 has four control signals as its data inputs. If enabled by signal ENBL STATUS REQ, QUAD BUFFER DRVR RCVR makes PROCESSOR BIT 0 the state of BUFFER ACTIVE, makes PROCESSOR BIT 1 the state of MONITOR ENBL, makes PROCESSOR BIT 2 the state of BUS RESUME, and makes PROCESSOR BIT 3 the state of OUTPUT BANK SEL.

Figure 21:
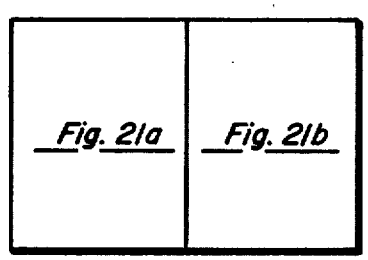
FIGS. 21a and 21b are diagrams of MODE CONTROL 1575.

FIG. 21 shows the details of MODE CONTROL 1575, which receives and stores the various commands received by BUS INTERFACE UNIT 15 from MAIN BUS 10. JK FF 1695 is set for an active buffer. D-TYPE F.F. 1699 controls activity initiation. JK FF 1701 stores broadcast mode indicating whenever a transfer is being made in the broadcast mode (i.e., BUS INTERFACE UNIT 15 receives a transfer made to all BUS INTERFACE UNITS). D-TYPE F.F. 1707 stores the direction of the data to be transferred either to or from MAIN BUS 10. JK FF 1703 indicates whether monitor interrupts may be initiated by BUS INTERFACE UNIT 15. JK FF 1704 controls operation as a result of a timeout on MAIN BUS 10.

FK FF 1695 is set for buffer activity (i.e., time data is being transferred to or from MAIN BUS 10). The clock input (i.e., input CLK) is when the signal LOAD COMMAND INT is not present (i.e., low on line 1589). The data inputs to JK FF 1695 are INPUT BUS 0 and INPUT BUS 3 for the J and K sides, respectively. The outputs are via cables 1581 and 1585 which indicate via a high and low, respectively, when a buffer is active (i.e., signal BUFFER ACTIVE). Gate 1700 merely inverts BUFFER ACTIVE and outputs the signal BIU ACTIVE via cable 33c.

D-TYPE F.F 1699 uses signal SYNC CLK as its clock input (i.e., input CLK). D-TYPE F.F. 1699 is cleared by signal MCLR as received from MAIN BUS 10 via cable 33c and inverted by inverter 1697. The data input (i.e., input D) is signal BUFFER ACTIVE received from JK FF 1695. The outputs of D-TYPE F.F. 1699, called signal INIT FF, are used to initiate a new transfer activity involving BUS INTERFACE UNIT 15.

Broadcast mode is controlled by JK FF 1701. As can be seen JK FF 1701 is clocked in the same manner as JK FF 1695 (see above). The data inputs (i.e., inputs J and K) are from INPUT BUS 2 and INPUT BUS 5, respectively. The output (i.e., output Q) of JK FF 1701 is signal BROADCAST ENBL (i.e., line 1588 and corresponding conductor of cable 1581).

D-TYPE F.F. 1707 controls the direction of data flow between MAIN BUS 10 and BUS INTERFACE UNIT 15. D-TYPE F.F. 1707 is clocked by a high output of gate 1702. Gate 1702 produces a high (or clocking output) whenever its three inputs are all high. This occurs when INPUT BUS 0 is high, signal LOAD COMMAND INT is present (i.e., high), and no data transfer is in progress (i.e., JK FF 1695 is not set making its output Q high). Therefore, D-TYPE F.F. 1707 is clocked, or permitted to change state, at the initiation of a new transfer only. The state of D-TYPE F.F. 1707 is determined by the state of INPUT BUS 4. The output of D-TYPE F.F. (i.e., output Q) is a signal EXT.AU (i.e., high on line 1530 and corresponding conductor of cable 1581) to indicate that the transfer of data is from MAIN BUS 10 to LOCAL MEMORY 20 (via BUS INTERFACE UNIT 15). If signal EXT.AU is not present, the transfer is from LOCAL MEMORY 20 to MAIN BUS 10 (via BUS INTERFACE UNIT 15).

JK FF 1703 shows when the generation of a monitor interrupt is permitted. The data inputs are INPUT BUS 1 and INPUT BUS 3 for the J and K inputs, respectively. As with JK FF 1701, JK FF 1703 is clocked by signal LOAD COMMAND INT received via line 1589. Gate 1696 permits JK FF 1703 to be cleared either by signal INTERRUPT VECTOR received via line 1538 or by a high output from inverter 1706. Gate 1705 makes the input of inverter 1706 low by receipt of either signal CLR INT F/F via line 1584 or signal BUS RESUME from output Q of JK FF 1704. Notice that a low output from gate 1705 also clears JK FF 1695. The Q and $\bar{Q}$ outputs of JK FF 1703 are transferred via cables 1581 and 1585.

The generation of signal BUS RESUME (i.e., high on corresponding conductor of cable 1581) is accomplished by JK FF 1704 as a result of a timeout of MAIN BUS 10. The K input is signal INPUT BUS 6. JK FF 1704 is clocked in the same manner as JK FF 1701 and 1703. JK FF 1704 is cleared in the same manner as D-TYPE F.F. 1699, JK FF 1701, and JK FF 1707. JK FF 1704 is set by gate 1698 whenever signal BIU CLR and BUS MSTR are both present. As is seen below, this occurs when MAIN BUS 10 is timed-out.

Inverter 1697 also supplies a low to one conductor of cable 1585 as a result of receiving signal MCLR. Gate 1709 supplies signal MCLR.BUS RESUME (i.e., low on line 1542) to indicate termination of activity as a result of setting of JK FF 1704 or receipt of signal MCLR.

Figure 22:
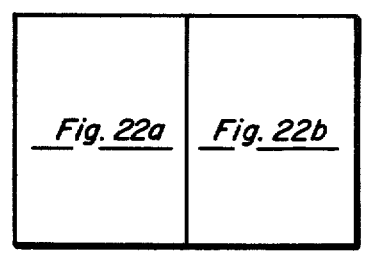
FIGS. 22a and 22b are diagrams of SEQUENCE CONTROL 1571.

FIG. 22 shows the detail of SEQUENCE CONTROL 1571 which is responsible for decoding TYPE and OP CODE received from MAIN BUS 10. The heart of SEQUENCE CONTROL 1571 is LOGIC ARRAY 1712 which is a Signetics Bipolar Field Programmable Logic Array type 82S100. The program for LOGIC ARRAY 1712 is shown in FIG. 23. As can be seen from FIGS. 22 and 23, LOGIC ARRAY 1712 decodes the four bit operation code (i.e., OP CODE 0-OP CODE 3) and the four bit type code (i.e., TYPE CODE 0-TYPE CODE 3) and produces the signals required to perform the commands to BUS INTERFACE UNIT 15 defined thereby. From FIG. 23, it can be seen that six conditions are defined, each of which has a unique combination of operation code (i.e., input variable 0-3) and type code (i.e., input variable 4-7). Each of the six conditions results in the activation of one of six output lines (i.e., output function 0-5) such that condition 0 activates output 0, condition 1 activates output 1, condition 2 activates output 2, condition 3 activates output 3, condition 4 activates output 4, and condition 5 activates output 5. Each of the six conditions may be given a description:
  Condition 0 = Write into MICRO PROCESSOR 1511 control registers;
  Condition 1 = Read from MICRO PROCESSOR 1511 control registers;
  Condition 2 = Generate command interrupt;
  Condition 3 = Read from LOCAL MEMORY 20;
  Condition 4 = Write into LOCAL MEMORY 20; and
  Condition 5 = Read.

From the six conditions shown, it can be seen that the operation codes are defined as:

Op Code 4 = READ;
  Op Code 5 = WRITE; and
  Op Code 7 = INTERRUPT.
  Similarly, the defined type codes become:
  Type Code 1 = MICRO PROCESSOR 1511 Control Registers;
  Type Code 3 = COMMAND
  Type Code 4 = Output (from originator) Data
  Type Code 6 = Input (to originator) Data Referring again to FIG. 22 it can be seen how these various conditions are used to control the sequences of BUS INTERFACE UNIT 15. Condition 0, for example, produces a high at output Z0 of LOGIC ARRAY 1712. Gate 1725 uses this output along with timing signal TT2 received via cable 1593 to produce signal ENBL CNTR 1 (i.e., low on corresponding conductor of cable 1542). This causes MICRO PROCESSOR 1511 to execute a microprogram using counter 1 of INSTRUCTION COUNTER 1508, as explained above. Condition 0 also causes a low to be output from gate 1727 to gate 1732. A high is output from gate 1732 for condition 0 whenever signal TT1.TT2. TT3 is present (i.e., line 1545 is low). The state of line 1545 is determined by gate 1714 which simply "ors" timing signals TT1, TT2, and TT3 received via cable 1593. A high output of gate 1732 is inverted by inverter 1735 and output via line 1540 as signal BMUX FROM ADDR REQ to ADDRESS MULTIPLEXER 1509 as explained above. A high output of gate 1732 also causes signal SELECT CTR 1 (i.e., low on corresponding conductor of cable 1542) to be generated by gate 1736. SELECT CTR 1 is also generated by gate 1736 as a result of signal INIT F/F not being present (i.e., high on line 1590) received from MODE CONTROL 1575.

Condition 1 results in a high output from LOGIC ARRAY 1712 output Z1. Signal CONTROL MEMORY READ is directly transferred via one of the conductors of cable 1542. Additionally, condition 1 supplies a high input to each of the gates 1723, 1724, 1726, 1727, and 1730. Each of these gates develops control signals necessary in reading the control registers of MICRO PROCESSOR 1511. Gate 1723 requires the presence of signal TT1 (i.e., high on corresponding conductor of cable 1593) at condition 1 to generate signal LOAD CTR 1 (i.e., high on corresponding conductor of cable 1542). Gate 1724 has a high output during condition 1 if signal DEST.BROADCAST is also present (i.e., high on corresponding conductor of cable 1595). A high output of gate 1724 causes gate 1729 to output a low generating signal SELECT MUX 1 which is transferred to OUTPUT MULTIPLEXER 1501 via line 1534. Notice that signal SELECT MUX 1 is also generated by the presence of signal OT 2 (i.e., high on corresponding conductor of cable 1593). Condition 1 also supplies a high to gate 1726. Notice that gate 1726 outputs a low at either condition 1 or condition 3. Timing signal TT2 is inverted by inverter 1713 and applied to gate 1731 along with the output of gate 1726. When gate 1731 has both inputs low, a high is output causing gate 1734 to generate signal ENBL DATA TO INFO BUS (i.e., high on line 1533). This signal enables INPUT XCVR 1500 (see also FIG. 3). ENBL DATA TO INFO BUS is also generated by timing signal OT 2 (i.e., high on corresponding conductor of cable 1593) or by the output of gate 1718 which is discussed below. Condition 1 also causes a low output from gate 1727 which has the same effect as a low from gate 1727 caused by condition 0 discussed above. Condition 1 also provides a high input to gate 1730. A second input of gate 1730 is high when signal ADDRESS REQ BIT 3 received via line 1521a from ADDRESS BUFFER 1503 is high. The third input of gate 1730 is received from gate 1714 as inverted by inverter 1728. Whenever the output of gate 1714 is low as explained above, inverter 1728 applies a high to the third input of gate 1730 signal ENBL STATUS REQ (i.e., low on corresponding conductor of cable 1582) is generated whenever all three inputs to gate 1730 are high.

Condition 2 produces a high at output Z2 of LOGIC ARRAY 1712. The high serves as one of the two inputs of each of gates 1721 and 1722. The second input to gate 1721 is made high when signal TT3 is present on the corresponding conductor of cable 1593. Both high inputs to gate 1721 causes an output of $\overline{\text{LOAD COMMAND INT}}$ (i.e., low on line 1589). Condition 2 also applies a high to one of the two inputs of gate 1722. The other input received via cable 1593 is a high when signal BUS MSTR is present. Both inputs high cause gate 1722 to output a low, designated signal ENBL INTERRUPT VECTOR, via cable 1582.

As explained above, condition 3 produces a high on output Z3 of LOGIC ARRAY 1712. One effect of condition 3 is to cause gate 1726 to output a low with the same results as explained above for condition 1. Condition 3 also causes a high to be impressed upon one of the three inputs of gate 1720. A second input will also be high if timing signal OT 4 is present on the appropriate conductor of cable 1593. The remaining input will also be high if signal BUS MSTR DLYD is present on line 1592. Gate 1720 outputs a low to gate 1708 whenever all three of its inputs are high. A low at either input to gate 1708 causes generation of signal WRITE PULSE (i.e., high on corresponding conductor of cable 1546) which is transferred to MEMORY ADDRESS BUFFER 1514. Condition 3 also causes a high input to gate 1715. A high at either one of the two inputs of gate 1715 causes a low to be transferred to gate 1716. The second input to gate 1716 is low if signal DEST.-BROADCAST is present on line 1592. If both inputs to gate 1716 are low, a high is output to gate 1717. If either input to gate 1717 is high (i.e., high from gate 1716 or signal BUS MSTR DLYD is present) signal MEM ENBL is generated (i.e., corresponding conductor of cable 1546 is high).

Condition 4 causes a high to be applied to the second input of gate 1715 having the same result as for condition 3. Condition 4 also applies a high to one input of gate 1719. The second input of gate 1719 is high if timing signal TT3 is present on the corresponding conductor of cable 1593. If gate 1719 has two high inputs, a low is transferred to gate 1708 which causes generation of signal WRITE PULSE as explained above.

Condition 5 causes a low to be present at output Z5 of LOGIC ARRAY 1712. Condition 5, thereby directly generates signal READ (i.e., low on line 1594) which is transferred to TIMING 1572. Condition 5 also transfers a low to gate 1718 causing its output to be low. Notice, therefore, that whenever condition 5 does not exist, a high is applied to that input of gate 1718. The second input of gate 1718 is also high if timing signal OT 3 is present on the corresponding conductor of cable 1593. A high output of gate 1718 is generated when both of its inputs are high causing gate 1734 to generate signal ENBL DATA TO INFO BUS (i.e., low on corresponding conductor of cable 1593).

Figure 24:
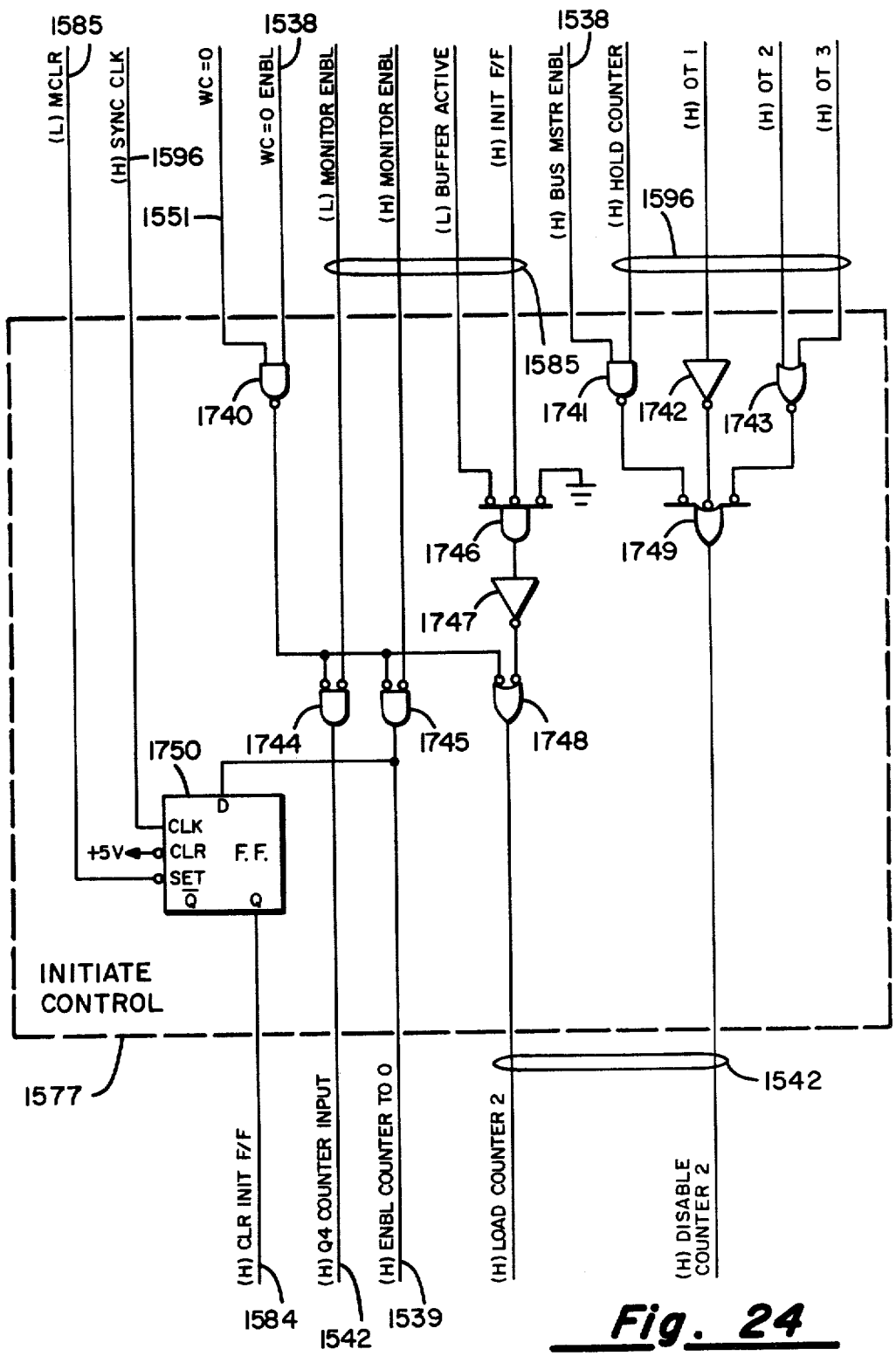
FIG. 24 is a diagram of INITIATE CONTROL 1577.

As illustrated in FIG. 24, control of BUS INTERFACE UNIT 15 initiation is via operation of INITIATE CONTROL 1577. Gate 1749 generates signal DISABLE COUNTER 2 (i.e., high on corresponding conductor of cable 1542) whenever a low is received at a one of its three inputs. One input is made low by gate 1741 whenever signal BUS MSTR ENBL is present (i.e., high on corresponding conductor of cable 1538) and signal HOLD COUNTER is present (i.e., high on corresponding conductor of cable 1596). A second input to gate 1749 may be made low at the presence of timing signal OT 1 (i.e., high on corresponding conductor of cable 1596) as inverted by inverter 1742. A third input to gate 1749 is made low by gate 1743 whenever either timing OT 2 or OT 3 is present on the corresponding conductors of cable 1596.

Signal LOAD COUNTER 2 (i.e., high on corresponding conductor of cable 1542) is generated by gate 1748 whenever either of its two inputs are low. A first input is made low by gate 1740 whenever signal WC=0 is present (i.e., high on line 1551) and signal WC=0 ENBL is present (i.e., high on corresponding conductor of cable 1538). As explained above, WC=0 is generated when MICRO PROCESSOR 1511 senses that the word count (to be transferred) reaches zero. Thus WC=0 signifies that all data has been transferred for a given transaction. A second input of gate 1748 is made low by inverter 1747 whenever it receives a high output from gate 1746. The presence of signal BUFFER ACTIVE (i.e., low on corresponding conductor of cable 1585) and the absence of signal INIT F/F causes gate 1746 to output a high to inverter 1747.

Gate 1745 generates signal ENBL COUNTER TO 0 (i.e., high on line 1539) whenever both inputs to gate 1745 are low. One input is received from gate 1740 whose function is discussed above. A second input of gate 1745 is low whenever signal MONITOR ENBL is not present. Similarly, gate 1744 generates signal Q4 COUNTER INPUT whenever it receives a low from gate 1740 and signal $\overline{\text{MONITOR ENBL}}$ is present (i.e., low on corresponding conductor of cable 1585).

D-TYPE F.F. 1750 is set whenever signal MCLR is present (i.e., low on line 1585). D-TYPE F.F. 1750 remains set until a low is received at the data input (i.e., input D) and signal SYNC CLK (i.e., high on line 1596) is received. The low data input corresponds to absence of signal ENBL COUNTER TO 0 the generation of which is explained above. Whenever D-TYPE F.F. 1750 is set, output Q is high and signal CLR INIT F/F is transferred to MODE CONTROL 1575 via line 1584.

Figure 25:
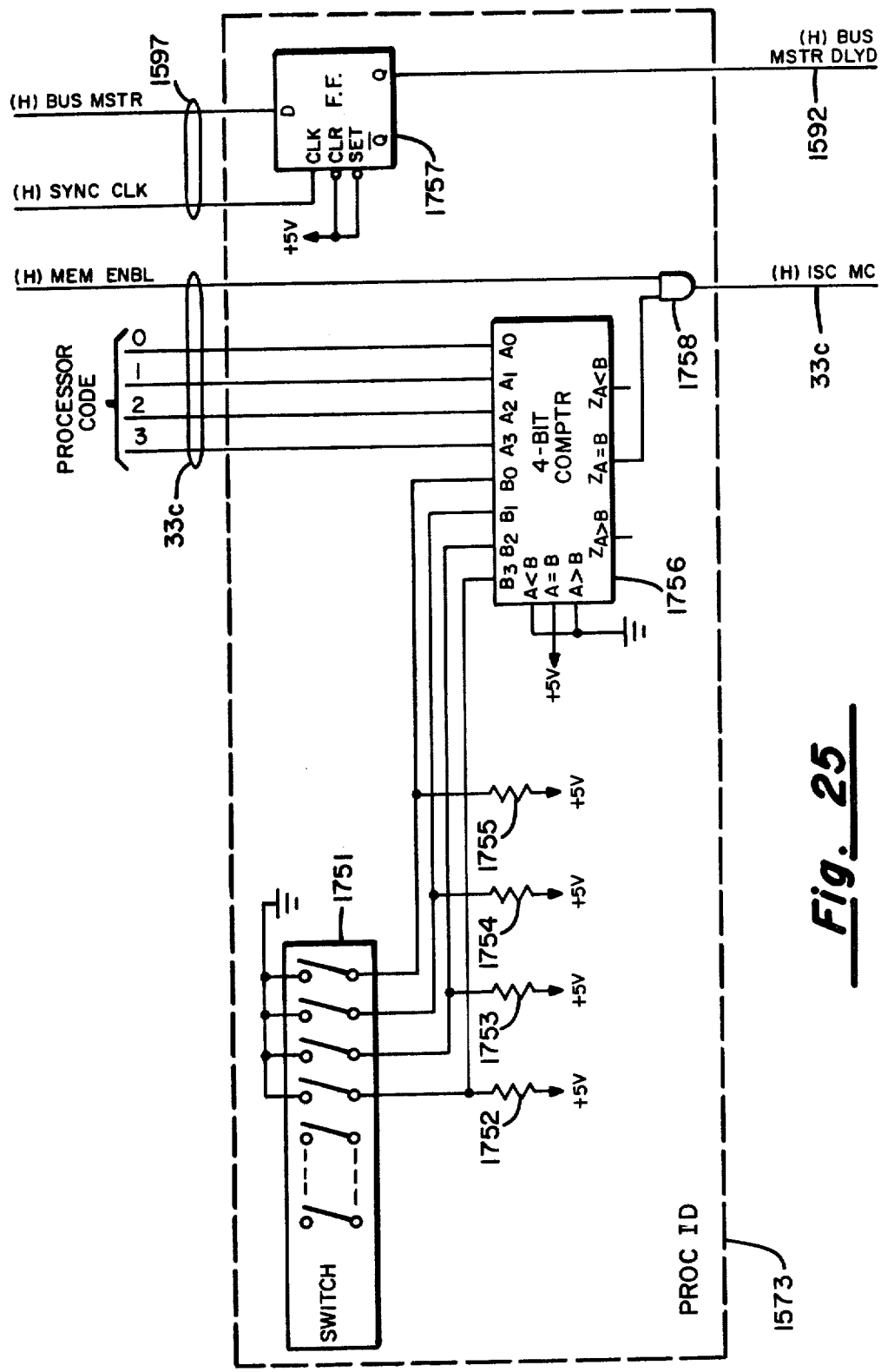
FIG. 25 is a diagram of PROC ID 1573.
Figure 26A:
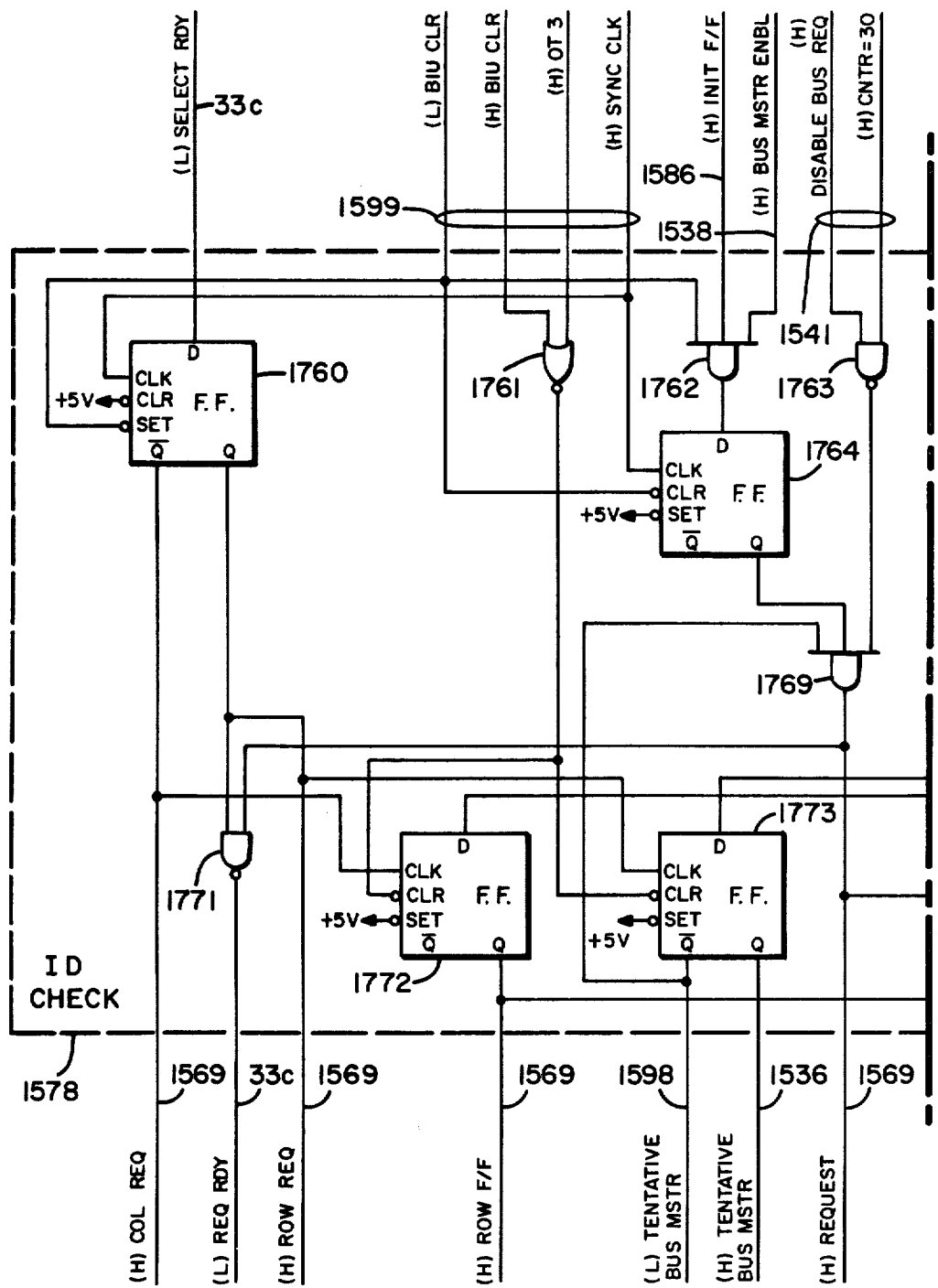
Figure 26B:
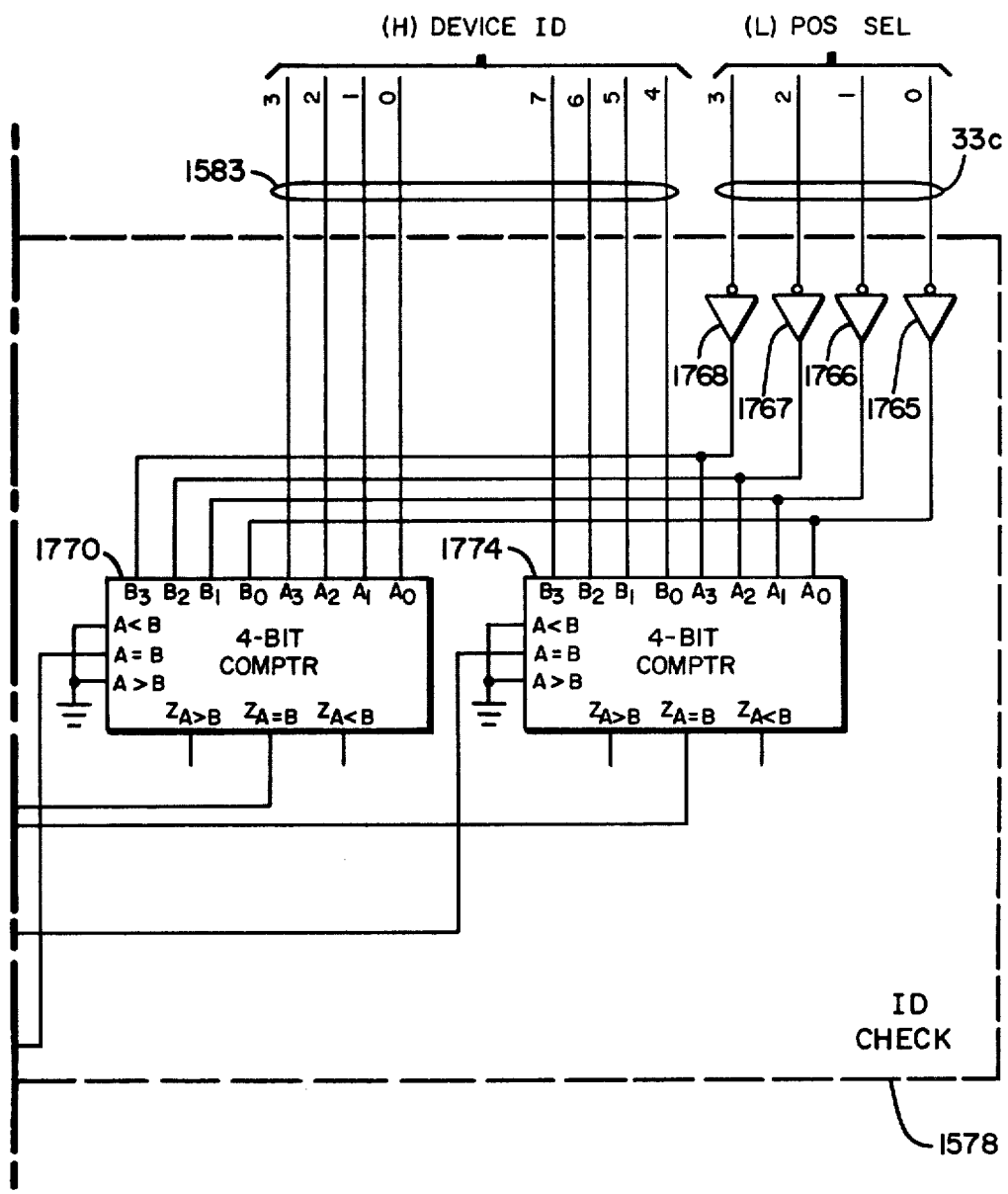
Figure 27A:
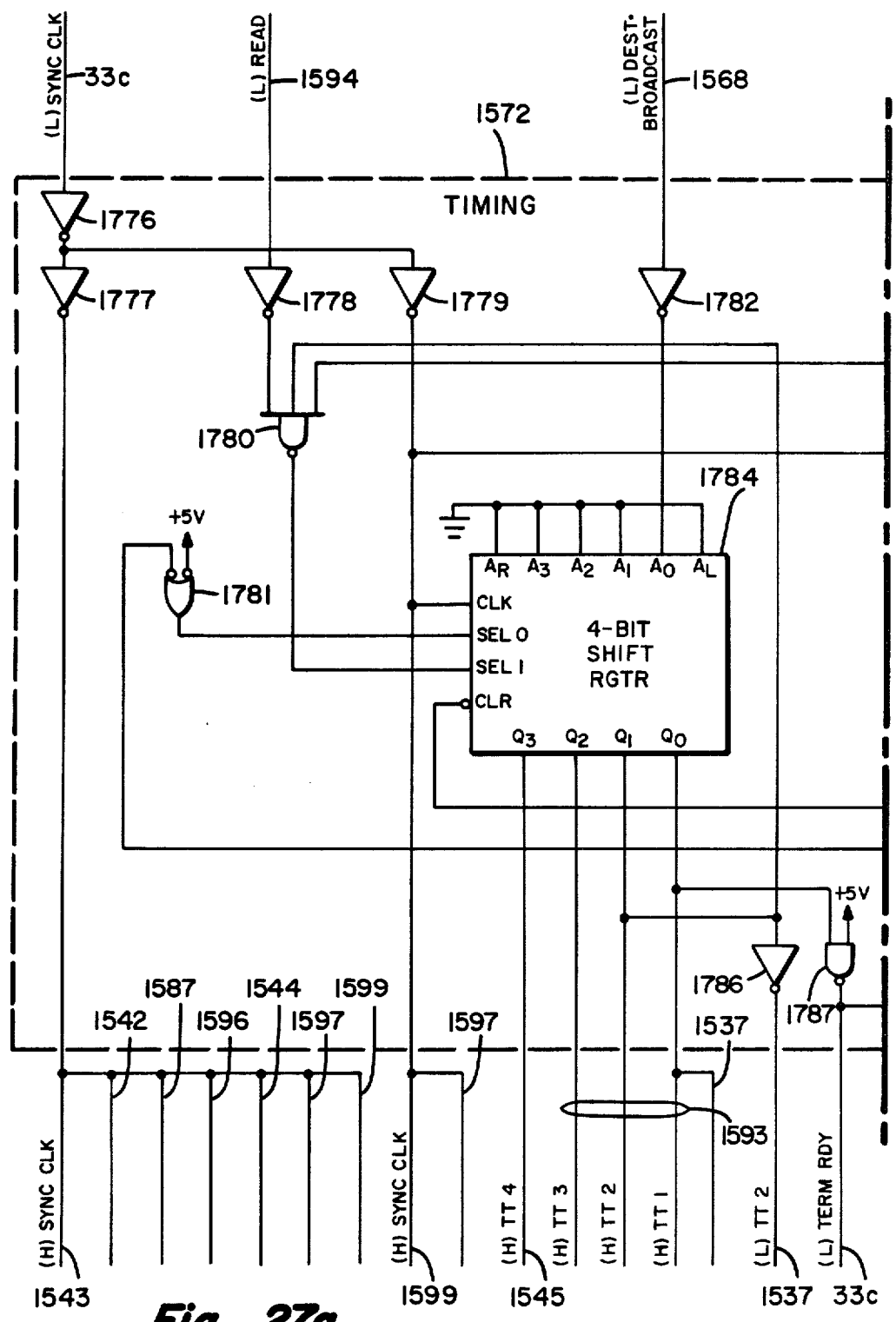
Figure 27B:
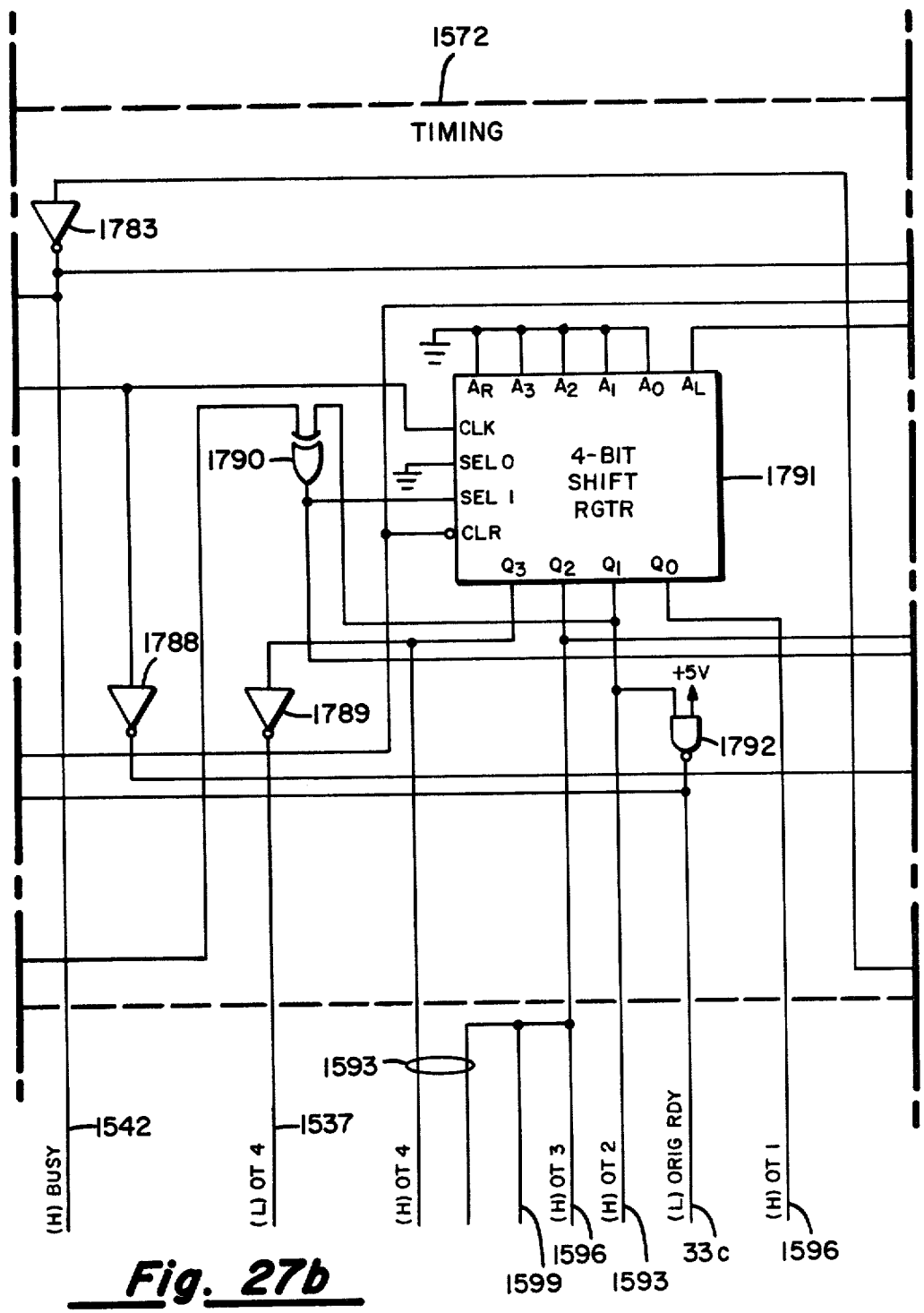
Figure 27C:
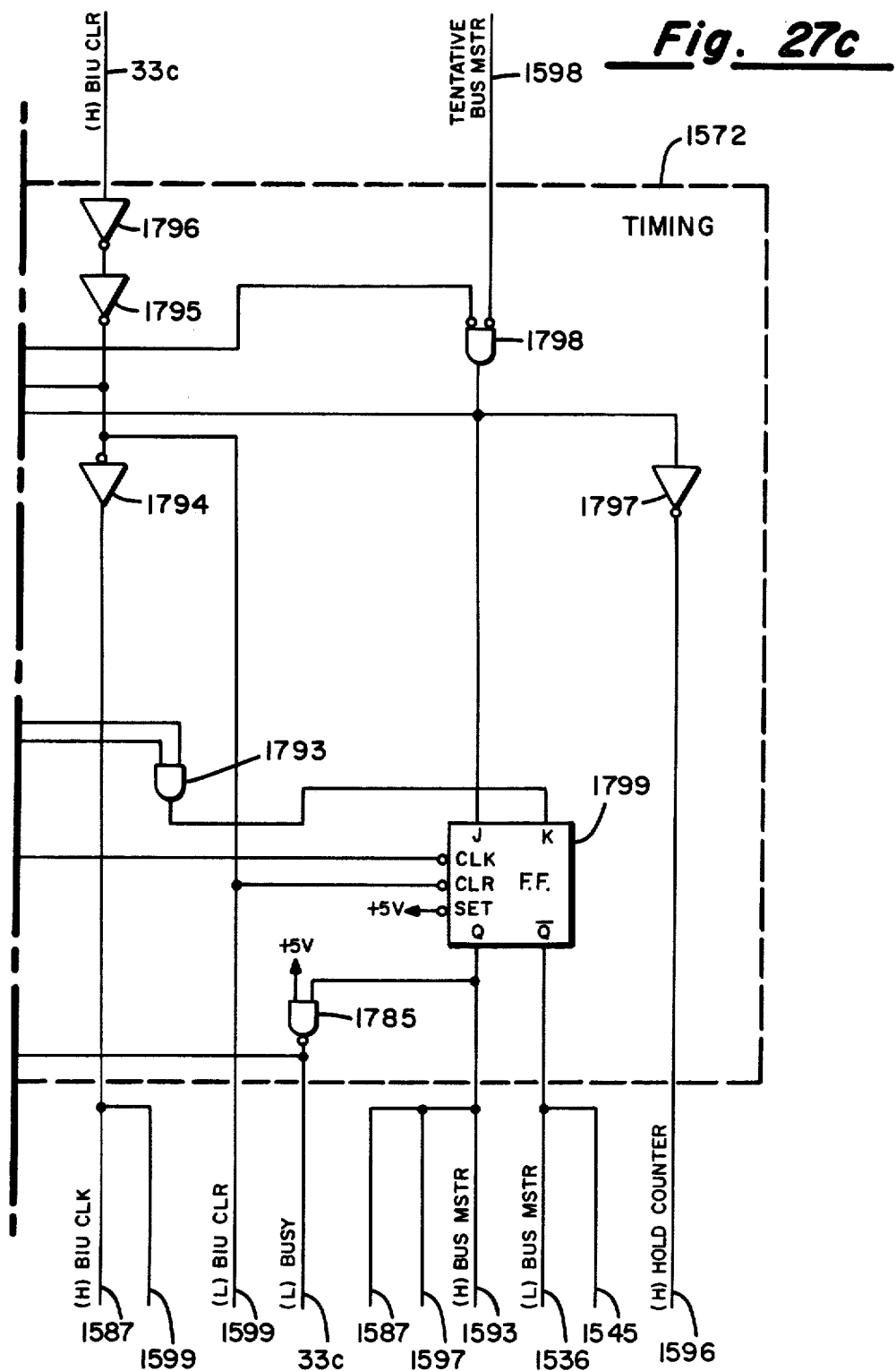

FIG. 25 illustrates an optional feature of BUS INTERFACE UNIT 15. It is used to control a second high speed interface between MAIN BUS 10 and LOCAL MEMORY 20 which is not shown in FIG. 1. The optional feature uses a four bit processor code (i.e., PROCESSOR CODE 0-3) transferred via dedicated conductors of MAIN BUS 10 and received by PROC ID 1573 via cable 33c. A four bit code unique to BUS INTERFACE UNIT 15 is manually entered into SWITCH 1751. 4-BIT COMPTR 1756 compares each four bit Processor Code transferred via MAIN BUS 10 and received via cable 33c with the four bit code manually entered into SWITCH 1751. If a match is found, output ZA=B of 4-BIT COMPTR becomes high. When signal MEM ENBL is also present (i.e., high on corresponding optional conductor of cable 33c), gate 1758 generates signal ISC MC via another optional conductor of cable 33c. In this manner, it can be seen that an additional interface may be established via MAIN BUS 10 through the use of Processor Codes.

D-TYPE F.F. 1757 is a required element of the preferred embodiment. The function of D-TYPE F.F. is the generation of signal BUS MSTR DLYD (i.e., high on line 1592). D-TYPE F.F. has signal BUS MSTR as its data input (i.e., input D) and has timing signal SYNC CLK as its clock input (i.e., input CLK). In this manner, D-TYPE F.F. delays signal BUS MSTR until the next succeeding timing signal SYNC CLK.

Figure 26:
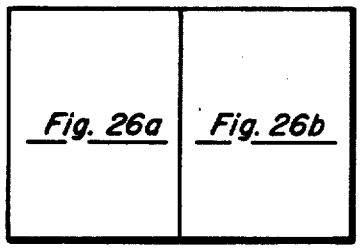
FIGS. 26a and 26b are diagrams of ID CHECK 1578.

FIG. 26 shows the detail of ID CHECK 1578. Arbitration is the process whereby an individual BUS INTERFACE UNIT is granted control of MAIN BUS 10 for the origination of a transaction (i.e., transfer of data when the designated BUS INTERFACE UNIT controls the transfer). Arbitration is accomplished by RESOURCE CONTROLLER 11 as explained below. Arbitration for a given transaction occurs during the period of time wherein the previous transaction is being accomplished (i.e., overlapped). ID CHECK 1578 receives a four bit Position Select code (i.e., POS SEL 0-3) from MAIN BUS 10 via cable 33c which uniquely identifies which BUS INTERFACE UNIT will be assigned as the next bus master. ID CHECK 1578 compares the Position Select code against the unique Device ID code (i.e., DEVICE ID 0-7) to determine if BUS INTERFACE UNIT 15 is the tentative (i.e., next assigned) bus master. MAIN BUS 10 actually transfers two four bit quantities (i.e., row address and column address) sequentially which must be compared four bits at a time.

Inverters 1765, 1766, 1767, and 1768 receive the negative going (i.e., binary one is low) Position Select code from cable 33c and electrically invert the signals. 4-BIT COMPTR 1770 compares DEVICE ID 0-3 received via cable 1583 with the output of inverters 1765, 1766, 1767, and 1768 to make the column address comparison. 4-BIT COMPTR 1774 compares DEVICE ID 4-7 received via cable 1583 to the output of inverters 1765, 1766, 1767, and 1768 to make the row address comparison. Signal SELECT RDY (i.e., low on corresponding conductor of cable 33c) received from RESOURCE CONTROLLER 11 via MAIN BUS 10 indicates row address is contained on POS SEL 0-3. Signal $\overline{\text{SELECT RDY}}$ (i.e., high on SELECT RDY of cable 33c) indicates column address is contained on POS SEL 0-3. D-TYPE F.F. 1760 is the row/column flip flop. It is set by signal BIU CLR (i.e., low on corresponding conductor of cable 1599). D-TYPE F.F. 1760 is clocked (i.e., input CLK) from signal SYNC CLK also received via cable 1599. Signal SELECT RDY is the data input (i.e., input D) of D-TYPE F.F. 1760. Therefore, whenever signal BIU CLR is received, D-TYPE F.F. 1760 is set to the row position. At the receipt of SELECT RDY and SYNC CLK, D-TYPE F.F. 1760 is cleared to the column position. Direct outputs of D-TYPE F.F. 1760 are signal COL REQ (i.e., from output $\overline{Q}$) and signal ROW REQ (i.e., from output Q).

Arbitration is begun within BUS INTERFACE UNIT 15 with the setting of D-TYPE F.F. 1764 which is cleared by signal BIU CLR. D-TYPE F.F. 1764 is set as a result of receipt of a clock signal (i.e., signal SYNC CLK at input CLK) and a high at the data input (i.e., input D). Gate 1762 produces the high data input as a result of $\overline{\text{BIU CLR}}$ and receipt of signal INIT F/F (i.e., high on line 1586) and signal BUS MSTR ENBL (i.e., high on line 1538). When set, D-TYPE F.F. supplies a high from output Q to gate 1769. A second input to gate 1769 is also high if gate 1763 does not receive both signal DISABLE BUS REQ and signal CNTR=30 via cable 1541 signifying that a monitor interrupt is being processed. The third input of gate 1769 is also high if D-TYPE F.F. 1773 is clear signifying BUS INTERFACE UNIT 15 is not the tentative bus master. If all three inputs to gate 1769 are high, signal REQUEST (i.e., high on corresponding conductor of cable 1569) is generated. Gate 1769 also supplies a high to one input of gate 1771. The second input to gate 1771 is also high if D-TYPE F.F. 1760 is set which occurs as a result of signal BIU CLR or state of SELECT RDY as explained above. If gate 1771 has two high inputs, signal REQ RDY (i.e., low on corresponding conductor of cable 33c) is generated which is transferred via MAIN BUS 10 to RESOURCE CONTROLLER 11 to inform it that BUS INTERFACE UNIT 15 is ready for arbitration. Notice that signal REQUEST generated by gate 1769 also enables 4-BIT COMPTR 1774 to make a comparison for equality by applying a high to enable input A=B. After RESOURCE CONTROLLER 11 receives signal REQ RDY, the four bit row address is impressed upon POS SEL 0-3 and signal SELECT RDY (i.e., low) is generated. If the row address received as POS SEL 0-3 is equal to DEVICE ID 4-7, output ZA=B of 4-BIT COMPTR 1774 becomes high which is transferred to input D of D-TYPE F.F. 1772. Presence of signal SELECT RDY causes D-TYPE F.F. 1760 to be cleared at the occurrence of signal SYNC CLK. As a result of being cleared, D-TYPE F.F. 1760 transfers a high from output $\overline{Q}$ to input CLK of D-TYPE F.F. 1772. D-TYPE F.F. 1772 is set when input CLK is high if input D is also high (i.e., row address match). Signal ROW F/F (i.e., high on corresponding conductor of cable 1569) is generated when D-TYPE F.F. 1772 is set. Setting D-TYPE F.F. 1772 also provides a comparison enable signal to 4-BIT COMPTR (i.e., input 1770) thereby enabling 4-BIT COMPTR 1770 to compare the column address.

When D-TYPE F.F. 1760 is cleared as a result of receipt of SYNC CLK and SELECT RDY, signal REQ RDY is removed from the corresponding conductor of cable 33c. RESOURCE CONTROLLER 11 senses the disappearance of signal REQ RDY and places the column address on POS SEL 0-3 and places signal $\overline{\text{SEL RDY}}$ (i.e., high) on corresponding conductor of cable 33c. If 4-BIT COMPTR finds a match between DEVICE ID 0-3 and column address on POS SEL 0-3, output ZA=B becomes high transferring a high to input D of D-TYPE F.F. 1773. Because signal $\overline{\text{SEL RDY}}$ is present at input D, D-TYPE F.F. 1760 is set again at the occurrence of signal SYNC CLK. Upon being set, output Q becomes high supplying a clock input (i.e., input CLK) to D-TYPE F.F. 1773. If 4-BIT COMPTR has found a match and therefore also supplies a high to input D, D-TYPE F.F. 1773 is set. When set, D-TYPE F.F. 1773 generates signal TENTATIVE BUS MSTR (i.e., high on line 1536 and low on 1598). Signal TENTATIVE BUS MSTR (i.e., setting of D-TYPE F.F. 1773) indicates that BUS INTERFACE UNIT 15 has been selected by arbitration (in RESOURCE CONTROLLER 11) to be bus master (i.e., control) for the next transaction. Arbitration is discussed further below in describing RESOURCE CONTROLLER 11.

Figure 27:
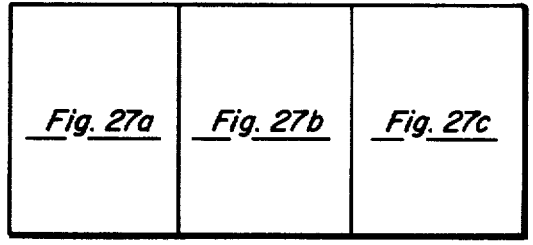
FIGS. 27a, 27b and 27c are diagrams of TIMING 1572.

The basic timing signals are generated by TIMING 1572 as illustrated in FIG. 27. Two different timing chains are involved. 4-BIT SHIFT RGTR 1784 provides termination timing or timing signals required when BUS INTERFACE UNIT 15 is to participate in a transaction as other than the bus master. Originator timing signals generated by 4-BIT SHIFT RGTR 1791 are used to control BUS INTERFACE UNIT 15 when it is the bus master for a transaction. 4-BIT SHIFT RGTR 1784 and 1791 are implemented using industry standard part 74LS194. The basic time standard is a 5 megahertz master clock signal provided by RESOURCE CONTROLLER 11 to MAIN BUS 10. TIMING 1572 receives the master clock signal from MAIN BUS 10 via cable 33c as signal SYNC CLK. Inverter 1776 inverts signal SYNC CLK. Inverters 1777 and 1779 again invert the signal and supply the drive required to provide SYNC CLK internally to the many circuits requiring it. Notice that inverter 1779 also drives the clock input (i.e., input CLK) of 4-BIT SHIFT RGTR 1784 and 1791. As can be seen, signal SYNC CLK is the time standard for BUS INTERFACE UNIT 15 and therefore, each user of MAIN BUS 10.

4-BIT SHIFT RGTR 1784 supplies termination timing. Signal DEST.BROADCAST (i.e., low on line 1568) from ID SET 1570 is received signifying that BUS INTERFACE UNIT 15 is to terminate a transaction. Inverter 1782 inverts signal DEST.BROADCAST and applies it to input A0 of 4-BIT SHIFT RGTR 1784. A high at input A0 along with a high at input CLK causes loading of the least significant bit position of 4-BIT SHIFT RGTR. Each succeeding clock signal (i.e., SYNC CLK) causes that least significant bit to be shifted to the next most significant bit position. Loading of the least significant bit position causes a high at output Q0 generating signal TT1. A shift to the next most significant bit position causes a high at output Q1 generating signal TT2. A shift to the next most significant bit position causes a high at output Q2 generating signal TT3. And a shift to the most significant bit position causes a high at output Q3 generating signal TT4. The timing signals thus generated (i.e., TT1, TT2, TT3, and TT4) control the timing of BUS INTERFACE UNIT 15 as the terminator (or slave) of a transaction from MAIN BUS 10 in synchronism with signal SYNC CLK.

Inputs SEL 0 and SEL 1 of 4-BIT SHIFT RGTR 1784 control the functions performed to accomplish these results. The loading of the least significant bit position, for example, requires both SEL 0 and SEL 1 to receive high inputs. SEL 0 is made high by gate 1781 when signal ORIG RDY (i.e., low on corresponding conductor of cable 33c) is present. Note that ORIG RDY is generated by the current bus master. The generation of ORIG RDY by the bus master is discussed below. SEL 1 is made high by gate 1780 whenever any one of its inputs is low. A first input of gate 1780 is made low by inverter 1778 when signal READ is not present on line 1594. A second input of gate 1780 is made low whenever output Q1 of 4-BIT SHIFT RGTR 1784 is low. Notice that this corresponds to timing signal TT2 not present as will normally be the case when termination timing is to be initiated. A third input to gate 1780 is made low whenever signal BUSY is not present on line 1542. This occurs when inverter 1783 receives a high from gate 1785 which occurs when signal BUSY is received from MAIN BUS 10 via cable 33c. This corresponds to the condition wherein BUS INTERFACE UNIT 15 is not the bus master and the bus master makes the corresponding conductor of cable 33c low. A further explanation is given below.

The shifting process occurs when SEL 0 goes low which results from signal ORIG RDY being removed from the corresponding conductor of cable 33c. Gate 1781 has, therefore, a high input and applies a low to SEL 0. Notice that with SEL 0 low, SEL 1 high, and inputs AR and AL grounded, 4-BIT SHIFT RGTR 1784 will continue to shift the bit loaded into the least significant bit position, to the next most significant bit position with each positive transition of input CLK (from signal SYNC CLK) filling each shifted (lesser significant) bit position with a low. The shifting process, and hence, terminator timing is halted for that period of time wherein SEL 0 and SEL 1 are both low. To make SEL 1 low, gate 1780 must receive a high at each of its three inputs. A first input is made high by inverter 1778 whenever signal READ (i.e., a low) is present on line 1594. As is explained above, this corresponds to condition 5 of SEQUENCE CONTROL 1571 (see also FIG. 22 and FIG. 23). A second input to gate 1780 occurs when output Q1 of 4-BIT SHIFT RGTR 1784 is high causing generation of timing signal TT2. A third input to gate 1780 is high when inverter 1783 receives a low input. This occurs when signal BUSY (i.e., low) is present at the corresponding conductor of cable 33c and hence MAIN BUS 10. Notice that as with signal ORIG RDY, signal BUSY is generated by wire-oring the output of each BUS INTERFACE UNIT such that the bus master (or originator) actually generates the signal. Therefore, terminator timing may be stopped for a read (i.e., condition 5) at terminator timing TT2 when the bus master generates signal BUSY.

Inverter 1786 is used to invert signal TT2 for transfer via line 1537. Gate 1787 is used to invert signal TT1. The output of gate 1787 is wire-ored via the corresponding conductor of cable 33c and hence MAIN BUS 10 with each BUS INTERFACE UNIT. Signal TERM RDY is used to notify the originator that the terminator is ready (i.e., is at terminator timing TT1).

The originator timing is developed by 4-BIT SHIFT RGTR 1791 in a quite similar fashion. However, 4-BIT SHIFT RGTR 1791 is not loaded at any bit position but has input AL "shifted-in" to generate the desired timing pulses. To cause a high to be shifted-in, input AL must be made high by gate 1798. This occurs whenever both inputs to gate 1798 are low. A first input is low when signal TENTATIVE BUS MSTR (low) is received on line 1598 from output Q̄ of D-TYPE F.F. 1773 (see also FIG. 26). This corresponds to notification that arbitration has selected BUS INTERFACE UNIT 15 to become the next bus master. A second input to gate 1798 is caused to be low by inverter 1783 if signal BUSY is not present on the corresponding conductor of cable 33c and MAIN BUS 10 (see above). The high at input AL is shifted to the least significant bit position of 4-BIT SHIFT RGTR 1791 at a positive transition at input CLK (from signal SYNC CLK via inverters 1776 and 1779) whenever input SEL 1 is high. Notice that input SEL 0 is always low. Exclusive-or 1790 makes SEL 1 low if both of its inputs are high or both of its inputs are low. Exclusive-or 1790 makes SEL 1 high if only one of its inputs is high. One of the inputs to exclusive-or 1790 is output Q1 of 4-BIT SHIFT RGTR 1791. The second input is the wired-ored output of gate 1787 received from the corresponding conductor of cable 33c and hence MAIN BUS 10. Therefore, 4-BIT SHIFT RGTR 1791 will not shift whenever signal TERM RDY (generated by the terminating BUS INTERFACE UNIT) is present and timing signal OT 2 is not present nor whenever signal TERM RDY is not present and timing signal OT 2 is present. If both signals are present or are not present, 4-BIT SHIFT RGTR 1791 will shift at each positive transition at input CLK. It can be seen, therefore, that exclusive-or 1790 operating in this manner causes originator timing to wait for synchronization of terminator timing.

As with terminator timing, originator timing causes each of the successive timing signals (i.e., OT 1, OT 2, OT 3, and OT 4) to be generated as a high is shifted from one bit position to the next most significant bit position of 4-BIT SHIFT RGTR 1791. Gate 1792 inverts timing signal OT 2 to produce signal ORIG RDY (i.e., low on corresponding conductor of cable 33c) which is wired-ored within MAIN BUS 10.

JK FF 1799 is set to record when BUS INTERFACE UNIT 15 is actually bus master. Input CLK is driven by signal SYNC CLK as inverted by inverters 1788, 1779, and 1776 so JK FF 1799 operates synchronously with MAIN BUS 10. The J input is received from gate 1798 in the same manner as input AL of 4-BIT SHIFT RGTR 1791. The K input of JK FF 1799 is high if both inputs to gate 1793 are high. The state of a first input is determined by the output of exclusive-or 1790 as explained above. A second input is high if a high is present at output Q2 of 4-BIT SHIFT RGTR 1791 generating signal OT 3. The outputs of JK FF 1799 (i.e., outputs Q and $\overline{Q}$) are designated signal BUS MSTR.

4-BIT SHIFT RGTR 1784 and 1791 and JK FF 1799 may be cleared by receipt of signal BIU CLR (i.e., low on corresponding conductor of cable 33c) via inverters 1795 and 1796. This occurs at power-up and catastrophic loss of communication. BIU CLR is inverted by inverter 1794 and supplied to other circuits also. Inverter 1797 inverts the output of gate 1798 and supplies it to INITIATE CONTROL 1577 via the corresponding conductor of cable 1596. A high is termed signal HOLD COUNTER.

Figure 28:
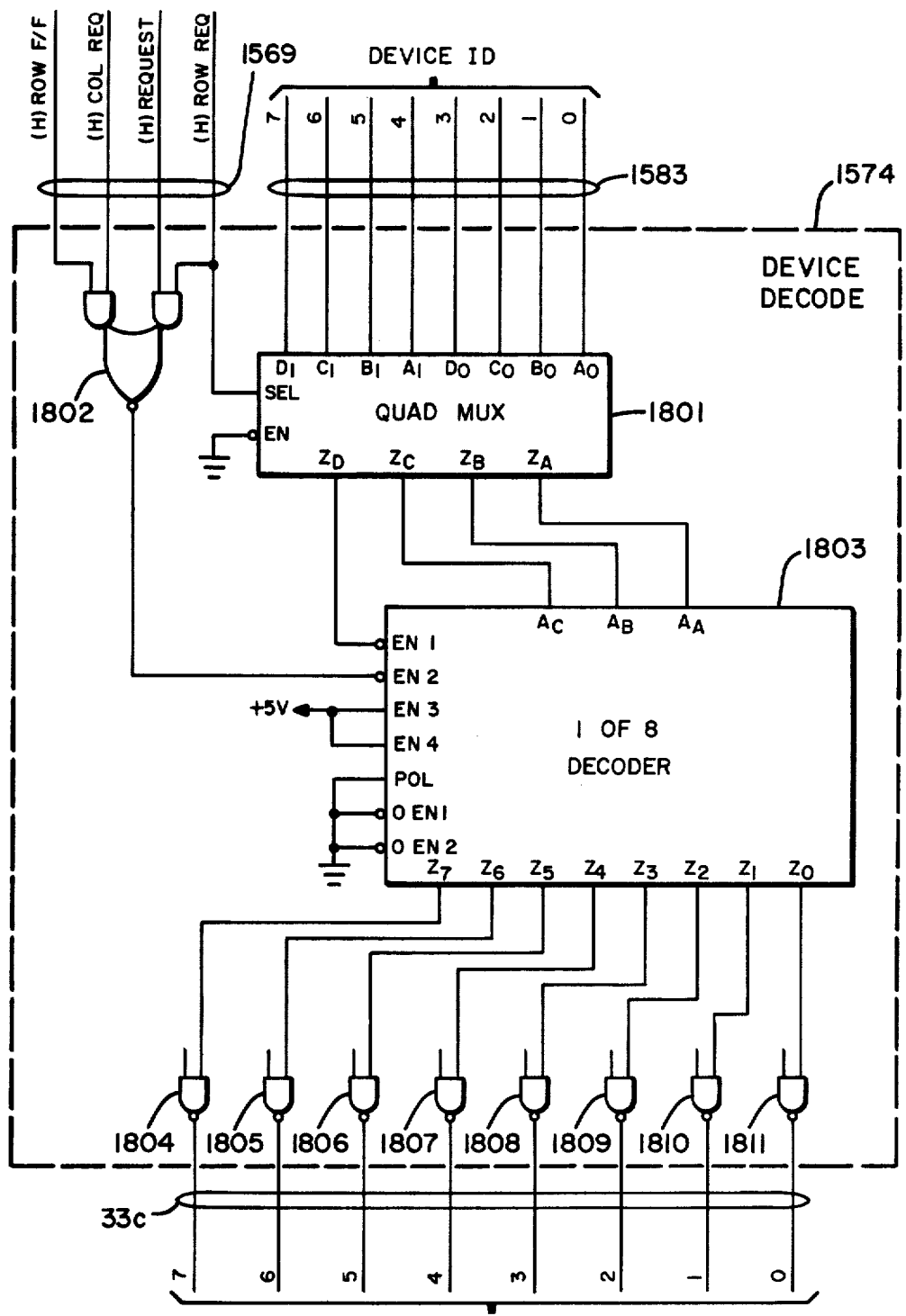
FIG. 28 is a diagram of DEVICE DECODE 1574.
Figure 29A:
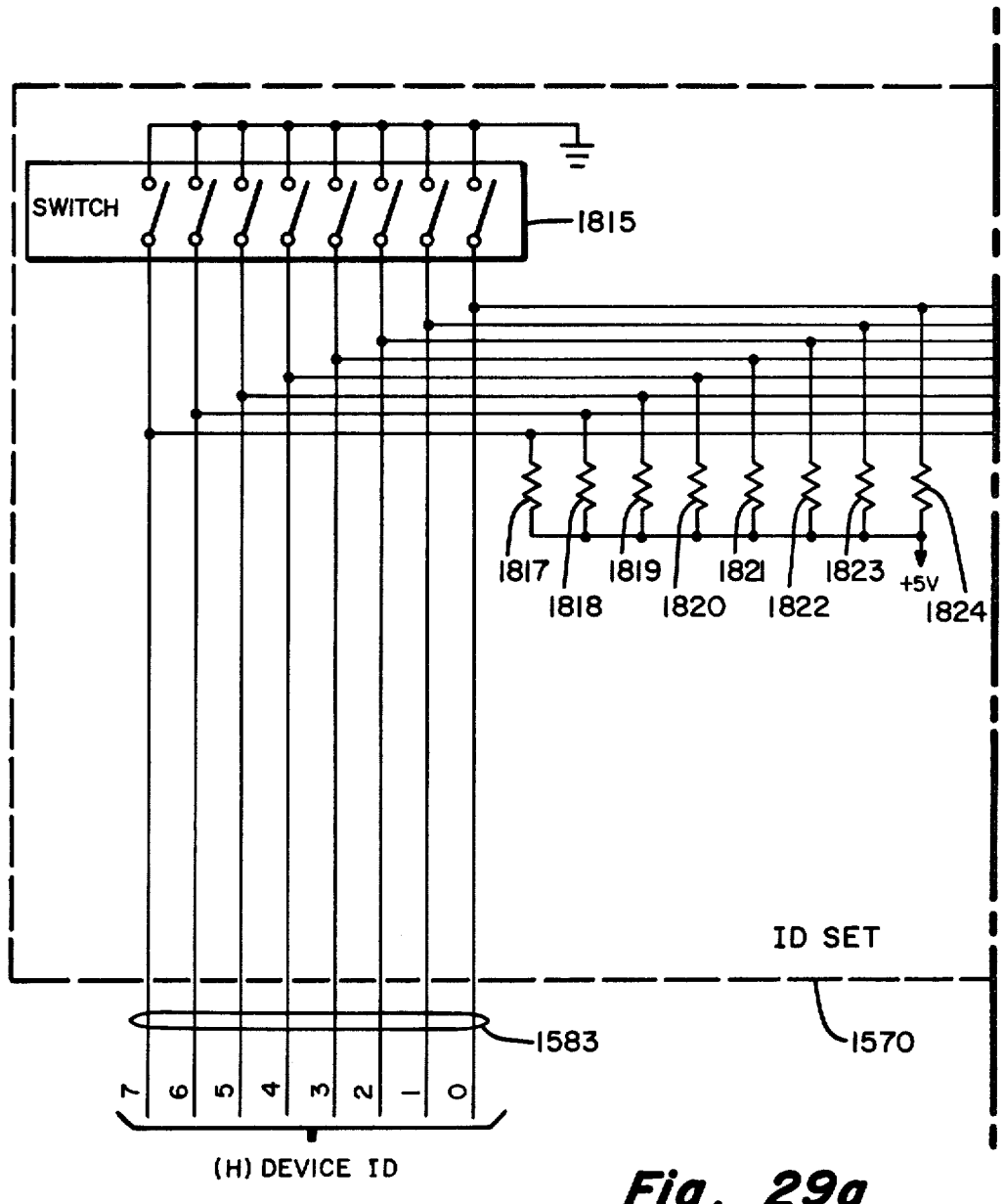
Figure 29B:
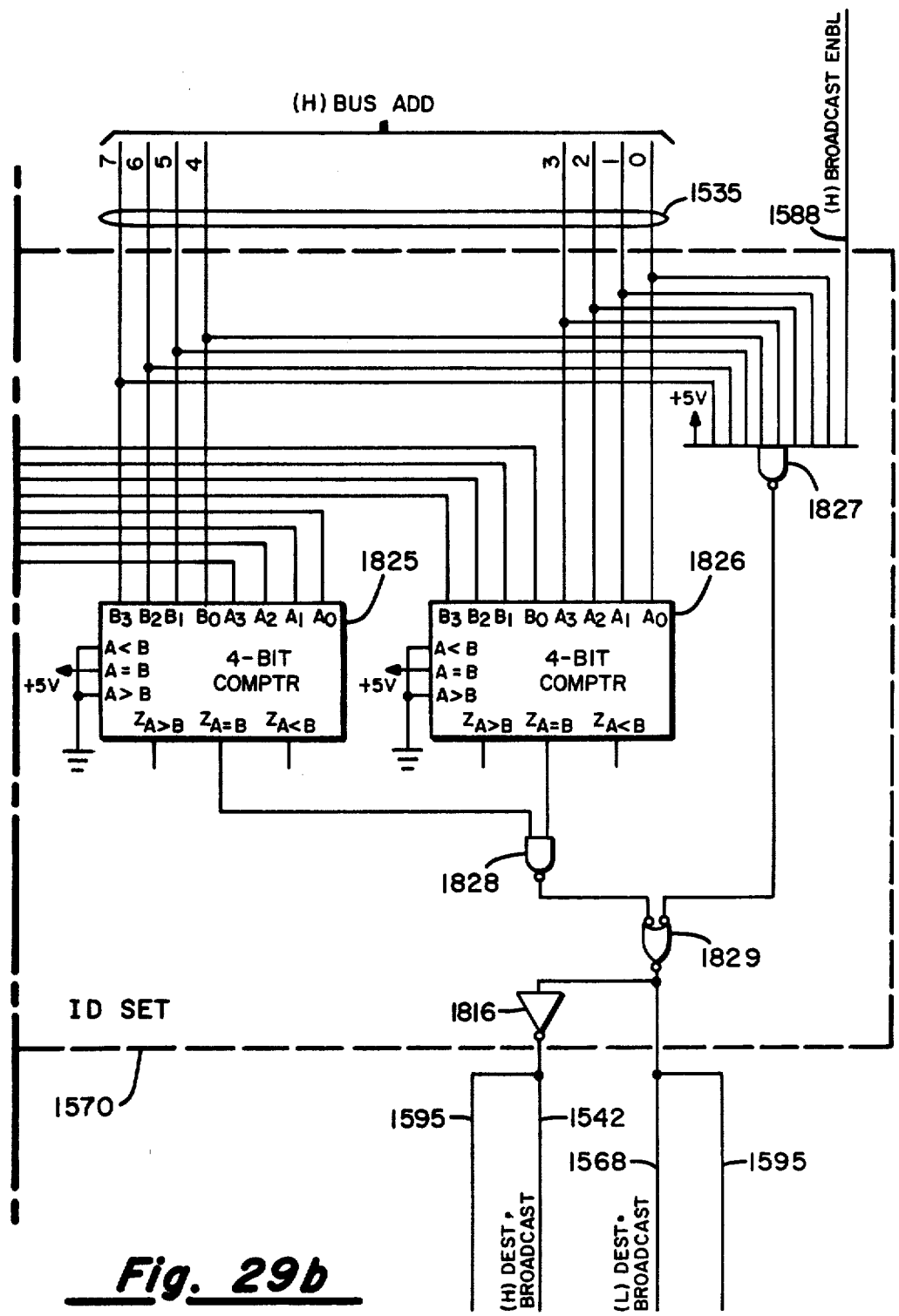

FIG. 28 shows the detail of DEVICE DECODE 1574. DEVICE DECODE 1574 receives the device identification code (i.e., DEVICE ID 0–7) from ID SET 1570 via cable 1583 and decodes it into individual position request lines (i.e., POS REQ 0–7) for transfer via cable 33c and hence MAIN BUS 10 for arbitration. Notice that the outputs of DEVICE DECODE 1574 (i.e., POS REQ 0–7) are wire-ored within MAIN BUS 10.

QUAD MUX 1801 receives the eight conductors of cable 1583 (i.e., DEVICE ID 0–7) and selects four at a time for transfer to 1 OF 8 DECODER 1803. The most significant bits (i.e., DEVICE ID 4–7) are selected if signal ROW REQ is present (i.e., high on corresponding conductor of cable 1569). The least significant bits (i.e., DEVICE ID 0–3) are selected if signal ROW REQ is not present. QUAD MUX 1801 is constantly enabled. Notice that only the three least significant bits of output of QUAD MUX 1801 are transferred to the data inputs (i.e., inputs AA, AB, and AC) of 1 OF 8 DECODER 1803. The most significant bit position (i.e., output ZD of QUAD MUX 1801) is connected to an enable input (i.e., EN 1) of 1 OF 8 DECODER 1803. This means that if signals DEVICE ID 3 and DEVICE ID 7 are high, 1 OF 8 DECODER 1803 is disabled. The significance of this is discussed below. A second enable (i.e., input EN 2) is connected to gate 1802 which times the output of 1 OF 8 DECODER 1803. To be enabled for output, gate 1802 must have a low output. The output of gate 1802 is low if signals ROW REQ and REQUEST are present (i.e., high on the corresponding conductors of cable 1569) or if signals COL REQ and ROW F/F are present (i.e., high on the corresponding conductors of cable 1569). This ensures that the column and row address are placed on the appropriate conductors of cable 33c and hence MAIN BUS 10 to be entered into the arbitration process.

Figure 29:
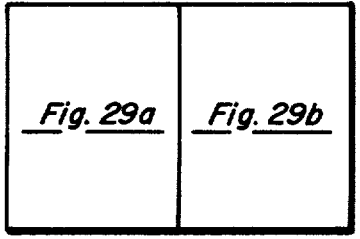
FIGS. 29a and 29b are diagrams of ID SET 1570.

FIG. 29 shows a detailed view of ID SET 1570. ID SET 1570 permits entry of a unique device identification code used to identify BUS INTERFACE UNIT 15 and also determines whether BUS INTERFACE UNIT 15 is being addressed as a terminator of data. SWITCH 1815 permits the entry of an eight bit code. The least significant bits (i.e., DEVICE ID 0–3) represent the column address of BUS INTERFACE UNIT 15 and the most significant bits (i.e., DEVICE ID 4–7) represent the row address. Only eight column addresses and eight row addresses are defined within the preferred embodiment. Therefore, as explained above, DEVICE ID 3 and DEVICE ID 7 are used as enables to 1 OF 8 DECODER 1803 (see also FIG. 28). The remaining circuitry of ID SET 1570 is used to determine whether BUS INTERFACE UNIT 15 is being addressed as a terminator. 4-BIT COMPTR 1825 compares the row address (i.e., DEVICE ID 4–7) from SWITCH 1815 with the row address (i.e., BUS ADD 4–7) received via cable 1535. If a match is found, output ZA=B becomes high. 4-BIT COMPTR 1826 compares the column address (i.e., DEVICE ID 0–3) from SWITCH 1815 with the column address (i.e., BUS ADD 0–3) received via cable 1535. If a match is found, output ZA=B becomes high. If a match is found for both row and column address, gate 1828 outputs a low to gate 1829 which generates signal DEST.BROADCAST (i.e., low on lines 1595 and 1568).

Broadcast is a transfer from one BUS INTERFACE UNIT to all other BUS INTERFACE UNITS. Broadcast mode is indicated by a bus address of all ones (i.e., row address of all ones and column address of all ones). Gate 1827 transfers a low to gate 1829 if BUS ADD 0–7 are all ones and signal BROADCAST ENBL is present (i.e., high on line 1588). Gate 1829 generates signal DEST.BROADCAST (i.e., low on lines 1595 and 1568) whenever it receives a low from gate 1828 (i.e., row address and column address match) or it receives a low from gate 1827 (i.e., broadcast mode).

By way of review, FIG. 30 presents a list of the most significant signals transferred via MAIN BUS 10. Each is connected to BUS INTERFACE UNIT 15 via cable 33a, 33c, or 33d as shown. Those signals generated only by RESOURCE CONTROLLER 11 are labeled BIU INPUT FROM MAIN BUS. CLASS III LO is the class three interrupt lock out. It is used to prohibit a BUS INTERFACE UNIT from using MAIN BUS 10 to interrupt the operation of CONTROL PROCESSOR 21. SELECT RDY is used during the arbitration process to signify row and column address. POS SEL 0→3 is used to transfer the row and column addresses of the tentative bus master selected during arbitration. BIU CLR is a clear signal used during power-up and certain catastrophic situations. SYNC CLOCK is the five megahertz master clock signal.

Those signals termed BIU INPUT/OUTPUT TO/FROM MAIN BUS are the signals generated by each BUS INTERFACE UNIT and wired-ored with every other BUS INTERFACE UNIT. INFO BUS BITS 0-15 provide the actual 16 bit data transfer path for MAIN BUS 10. BUS ADR 0→7 is the eight bit wide device address transfer path. TYPE 0→2 is the type code transfer. OP CODE 0→2 similarly is the operation code. REQ RDY is the line used to request bus arbitration. BUSY acknowledges control of MAIN BUS 10 by the bus master. TERM RDY shows terminator timing TT1. ORIG RDY shows originator timing OT 2. POS REQ 0→7 transfers device identification code for arbitration. IOC SCAN ENABLE allows CONTROL PROCESSOR 21 to scan for monitor interrupts.

BUS INTERFACE UNIT 15 is described in detail above. Referring to FIG. 1, it can be seen that additional BUS INTERFACE UNITS are present in the preferred embodiment. Actually, as many as 16 BUS INTERFACE UNITS may be used wherein each is constructed and operates as described for BUS INTERFACE UNIT 15. Each, of course, must have a unique device identification code entered into SWITCH 1815 (see also FIG. 29). As can be appreciated by those skilled in the art, each of the BUS INTERFACE UNITS described is responsible for transferring data and commands between MAIN BUS 10 and its corresponding LOCAL MEMORY permitting each ARITHMETIC UNIT to operate upon its own data stream under overall control of CONTROL PROCESSOR 21 which executes the single instruction stream.

Figure 31A:
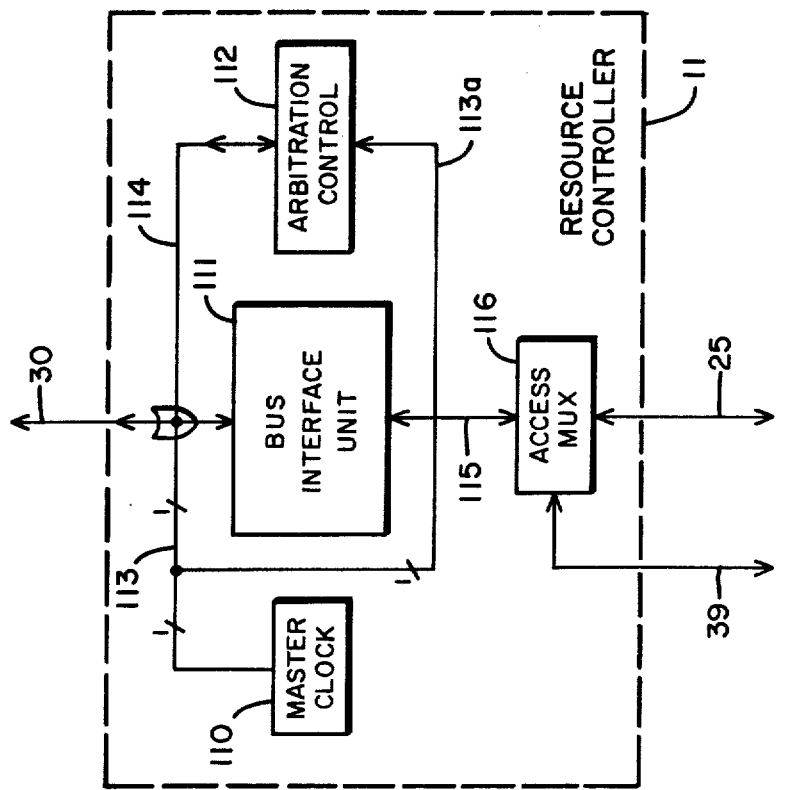
FIG. 31a gives a functional description of RESOURCE CONTROLLER 11.
Figure 3I:
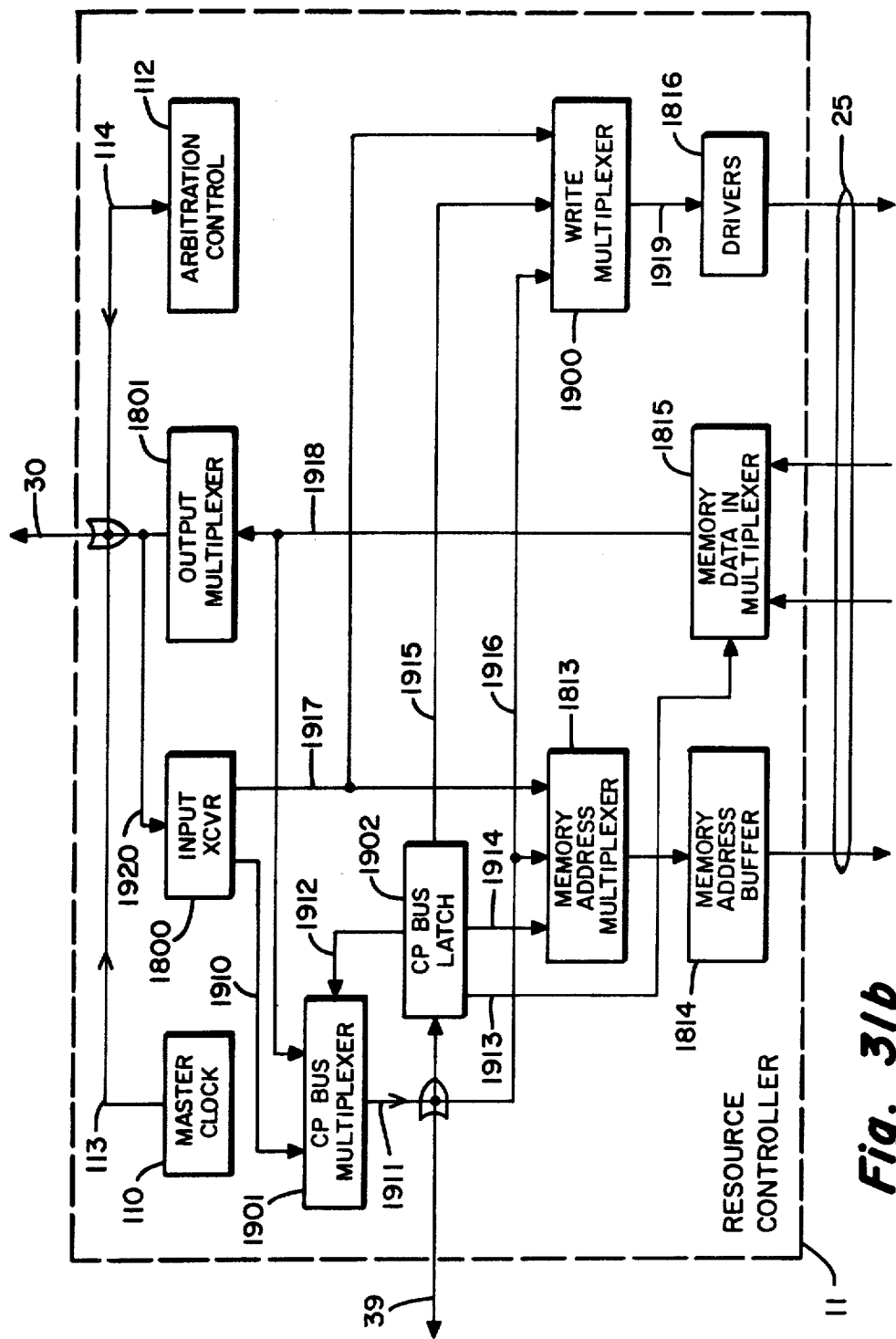
Figure 33A:
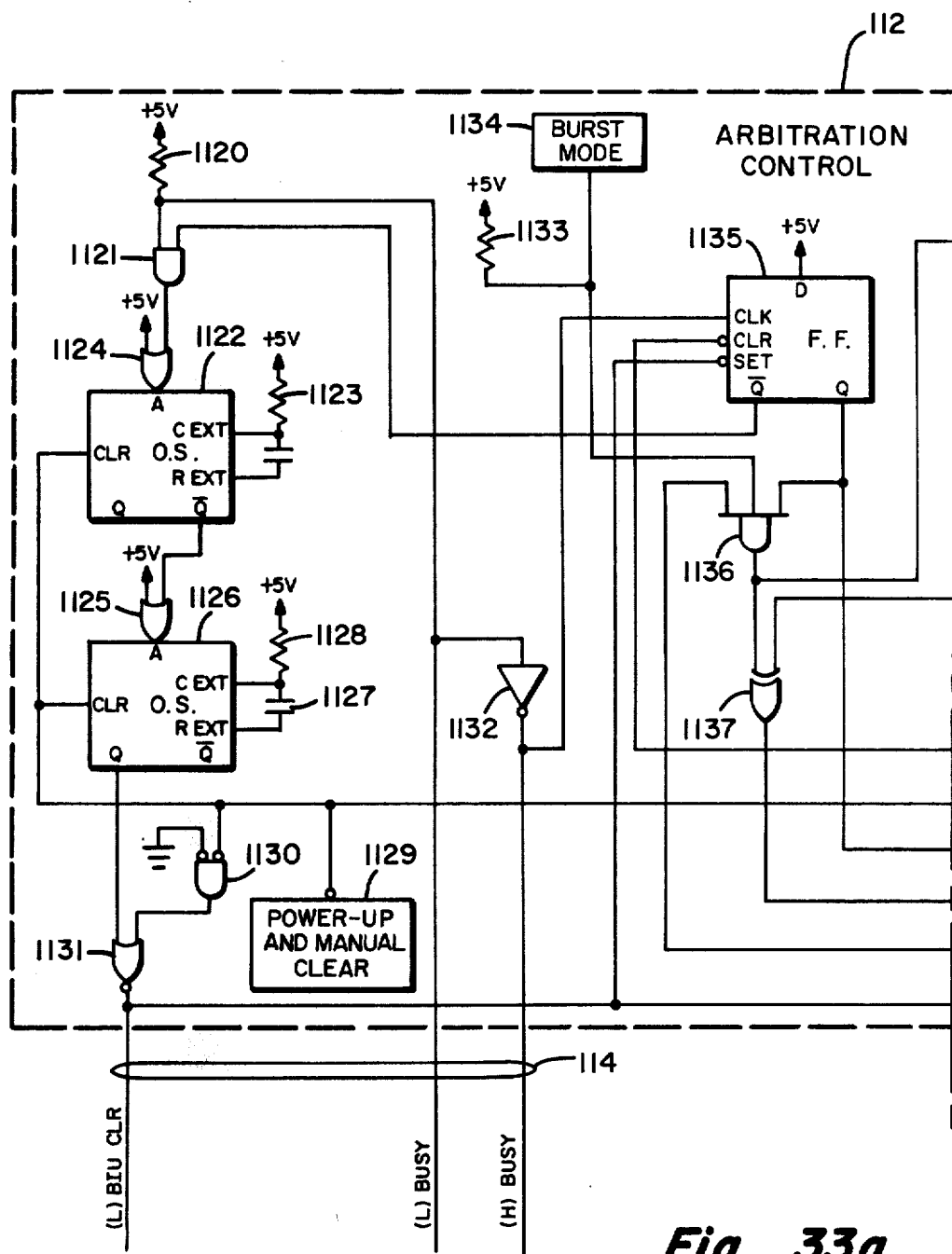
Figure 33B:
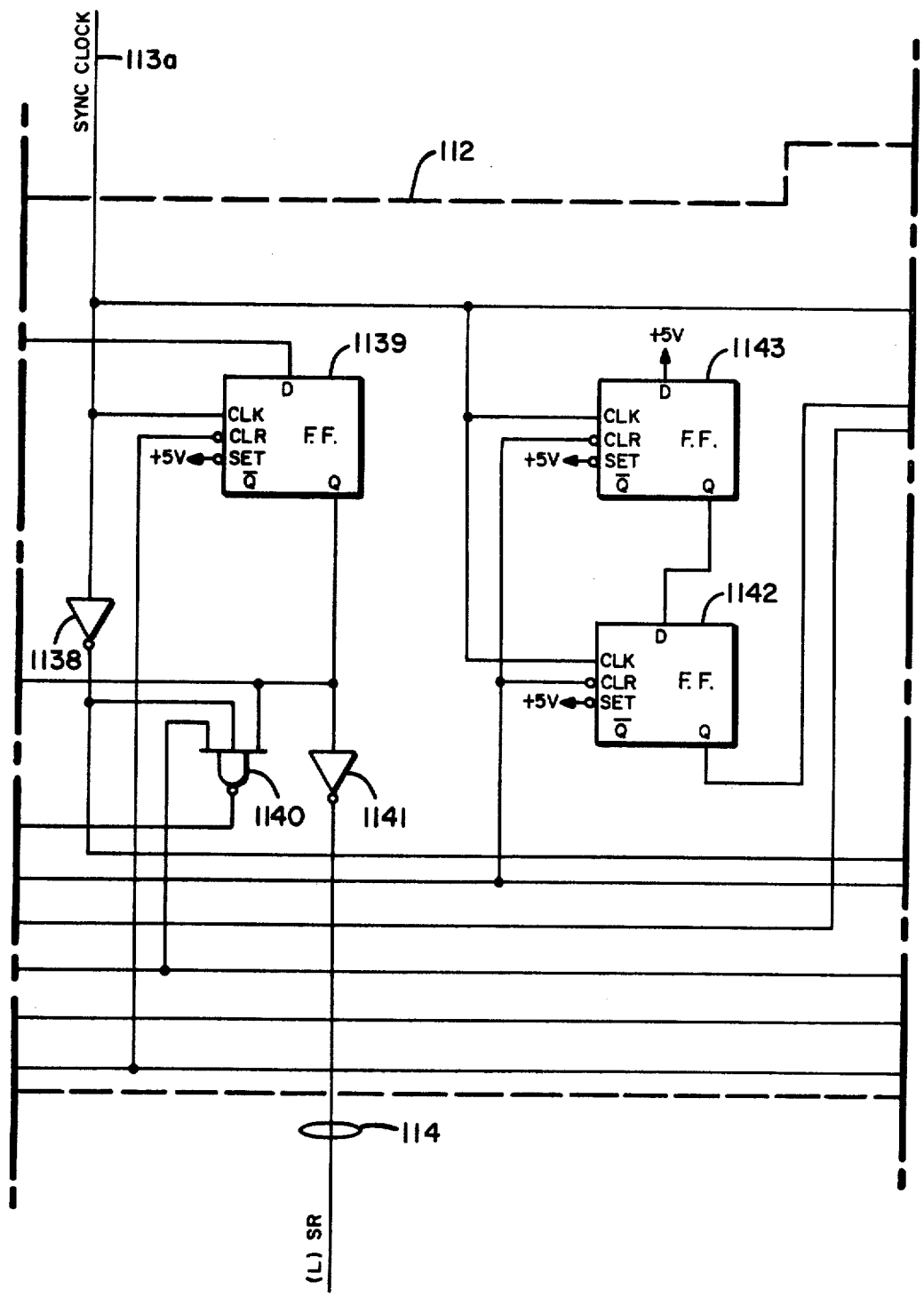
Figure 33C:
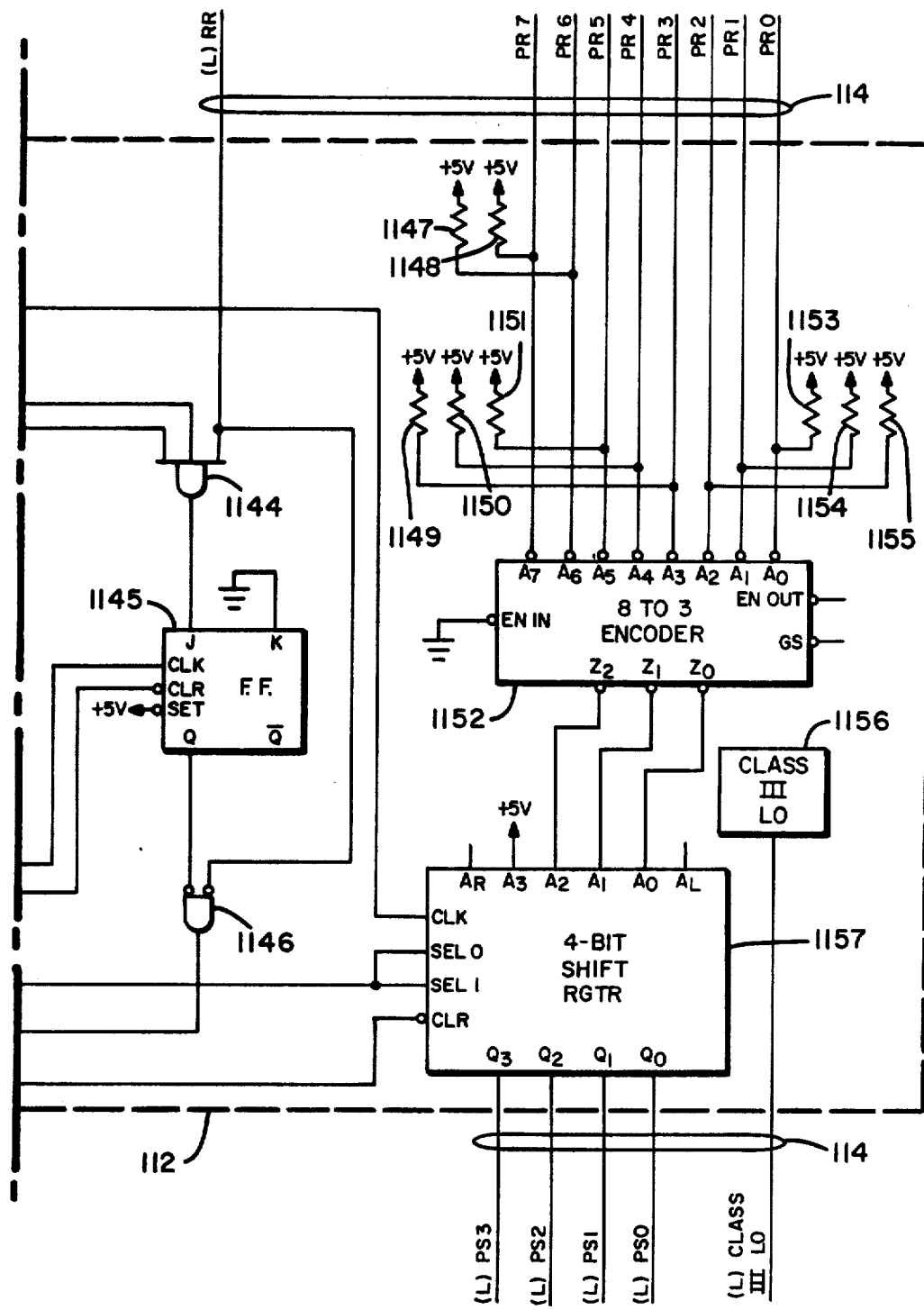

The remaining element which communicates with MAIN BUS 10 is RESOURCE CONTROLLER 11. It performs the basic functions of a BUS INTERFACE UNIT. In addition, RESOURCE CONTROLLER 11 performs arbitration and supplies the five megahertz master clock signal. Referring to FIG. 31a, RESOURCE CONTROLLER 11 is essentially a BUS INTERFACE UNIT 111, along with MASTER CLOCK 110, ARBITRATION CONTROL 112 and ACCESS MUX 116. Cable 30 connects RESOURCE CONTROLLER 11 to MAIN BUS 10 in the same manner as BUS INTERFACE UNIT 15 is connected to MAIN BUS 10 via cable 33. ACCESS MUX 116 is required to permit CONTROL PROCESSOR 21 to access LOCAL MEMORY 17 through RESOURCE CONTROLLER 11.

FIG. 31b shows a more detailed view of RESOURCE CONTROLLER 11. MASTER CLOCK 110 and ARBITRATION CONTROL 112 are discussed in more detail below. INPUT XCVR 1800 is similar to INPUT XCVR 1500 shown in detail in FIG. 3. OUTPUT MULTIPLEXER 1801 is similar to OUTPUT MULTIPLEXER 1501 shown in detail in FIG. 4. MEMORY ADDRESS MULTIPLEXER 1813 is similar to MEMORY ADDRESS MULTIPLEXER 1513 shown in detail in FIG. 15. MEMORY ADDRESS BUFFER 1814 is similar to MEMORY ADDRESS BUFFER 1514 shown in detail in FIG. 16. MEMORY DATA IN MULTIPLEXER 1815 is similar to MEMORY DATA IN MULTIPLEXER 1515 shown in detail in FIG. 17. DRIVERS 1816 are similar to DRIVERS 1516 shown in detail in FIG. 18.

CP BUS MULTIPLEXER 1901 is a multiplexer which selects either the 16 bits received from INPUT XCVR 1800 via cable 1910 or the 16 bits received from MEMORY DATA IN MULTIPLEXER 1815 via cable 1918 for transfer to CONTROL PROCESSOR 21 via cable 1911 and hence cable 39. CP BUS MULTIPLEXER 1901 is similar in function and construction to OUTPUT MULTIPLEXER 1501 being a multiplexer having a single 16 bit output selected from one of two 16 bit inputs. WRITE MULTIPLEXER 1900 is a similar 16 bit multiplexer used to select data received via cable 1917 or cable 1916 for transfer to DRIVERS 1816 via cable 1919. Functionally WRITE MULTIPLEXER 1900 selects which data (i.e., from MAIN BUS 10 or CONTROL PROCESSOR 21) is to be written into LOCAL MEMORY 17.

CP BUS LATCH 1902 is a register which controls operation of RESOURCE CONTROLLER 11. BUS INTERFACE MODULE 15 has MICRO PROCESSOR 1511 to implement internal control. This scheme could also easily be used for RESOURCE CONTROLLER 11. However, RESOURCE CONTROLLER 11 is greatly simplified since CONTROL PROCESSOR 21 communicates directly with RESOURCE CONTROLLER 11 via cable 39. Therefore, CONTROL PROCESSOR 21 is used to provide the control logic required. To implement this control, CP BUS LATCH 1902 is used to store the control commands. CP BUS MULTIPLEXER 1901, for example, has its select and enable function controlled by bits in CP BUS LATCH 1902 transferred to CP BUS MULTIPLEXER 1901 via cable 1912. Similarly, MEMORY ADDRESS MULTIPLEXER 1813 is controlled by other bit positions of CP BUS LATCH 1902 via cable 1914. MEMORY DATA IN MULTIPLEXER 1815 and WRITE MULTIPLEXER 1900 are controlled in a similar fashion via cables 1913 and 1915, respectively. It is, therefore, easily seen that CONTROL PROCESSOR 21 uses CP BUS LATCH 1902 to perform the control operations unique to the implementation of the additional functions represented in FIG. 31a as ACCESS MUX 116.

Figure 32:
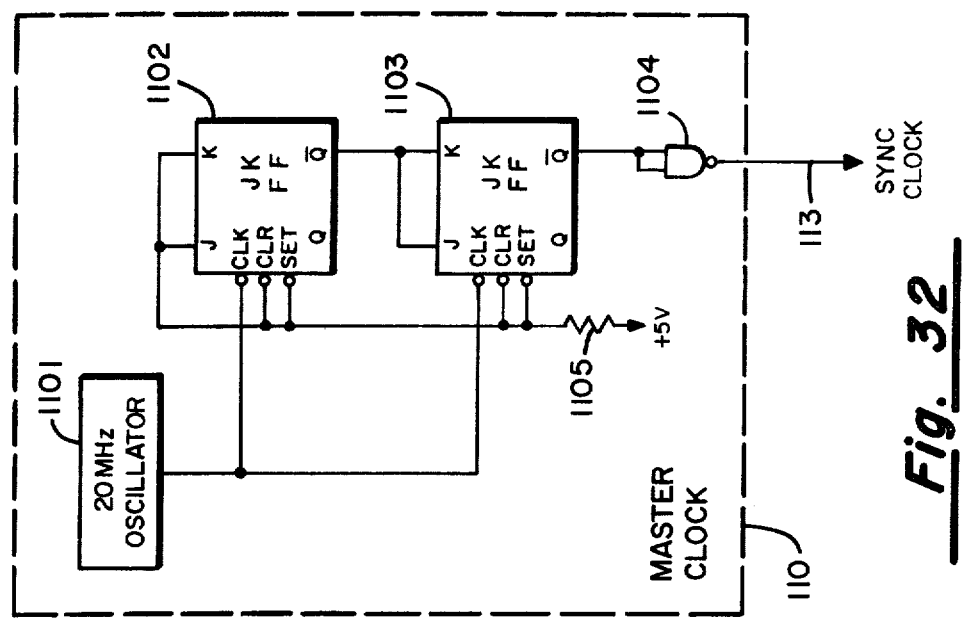
FIG. 32 is a diagram of MASTER CLOCK 110.

FIG. 32 shows the detailed operation of MASTER CLOCK 110. As explained above, MASTER CLOCK 110 generates the five megahertz signal used to synchronize all users of MAIN BUS 10. 20 MHZ OSCILLATOR 1101 is a commercially available timing standard. JK FF 1102 and JK FF 1103 are arranged to divide the output of 20 MHZ OSCILLATOR 1101 by four to produce the basic five megahertz output from JK FF 1103 (i.e., output $\bar{Q}$). Gate 1104 is used to invert the timing signal and produce additional drive. The timing signal thus generated is designated SYNC CLOCK (or SYNC CLK).

Figure 33:
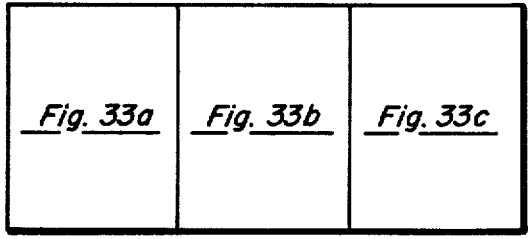
FIGS. 33a, 33b and 33c are diagrams of ARBITRATION CONTROL 112.
Figure 19A:
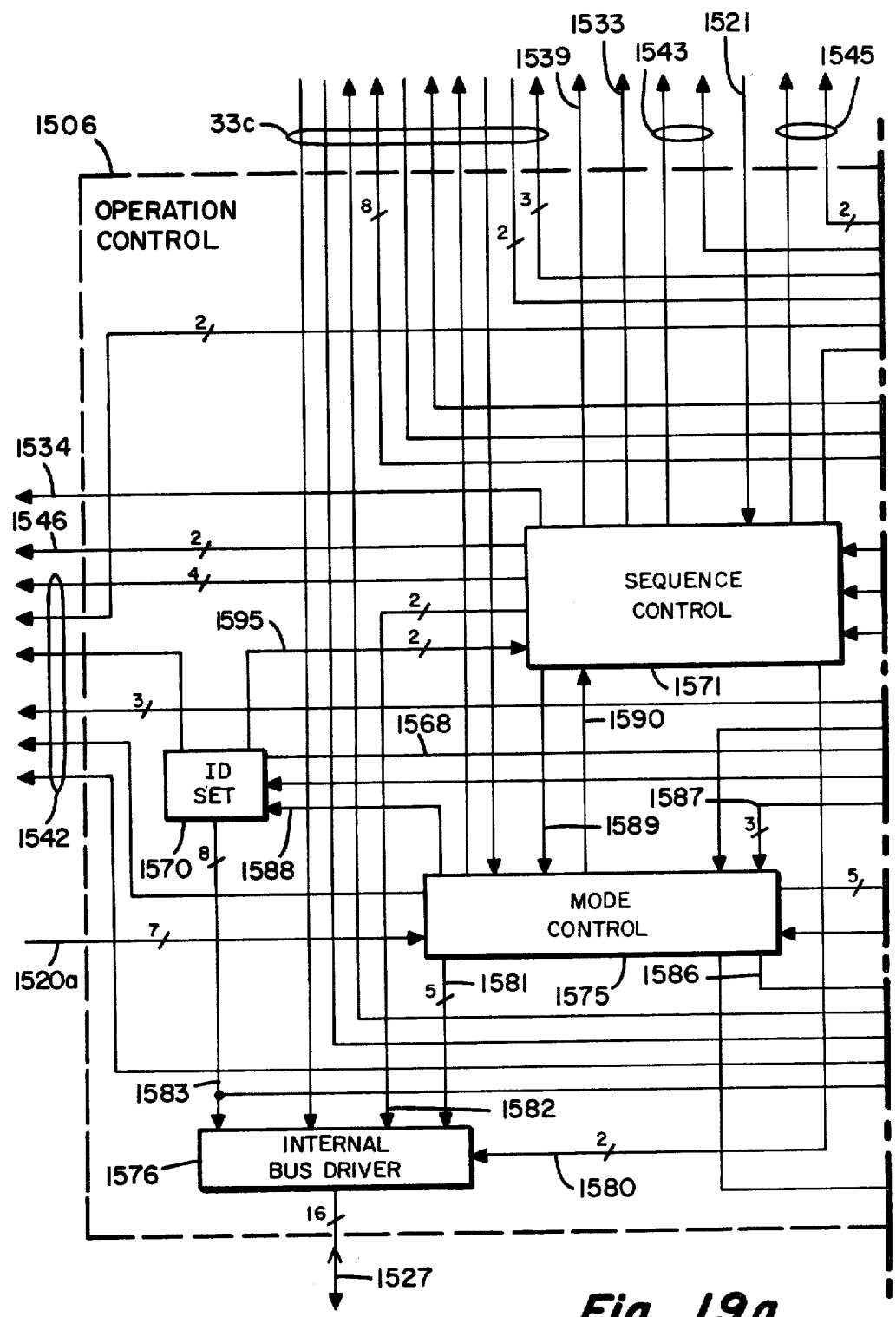
Figure 19B:
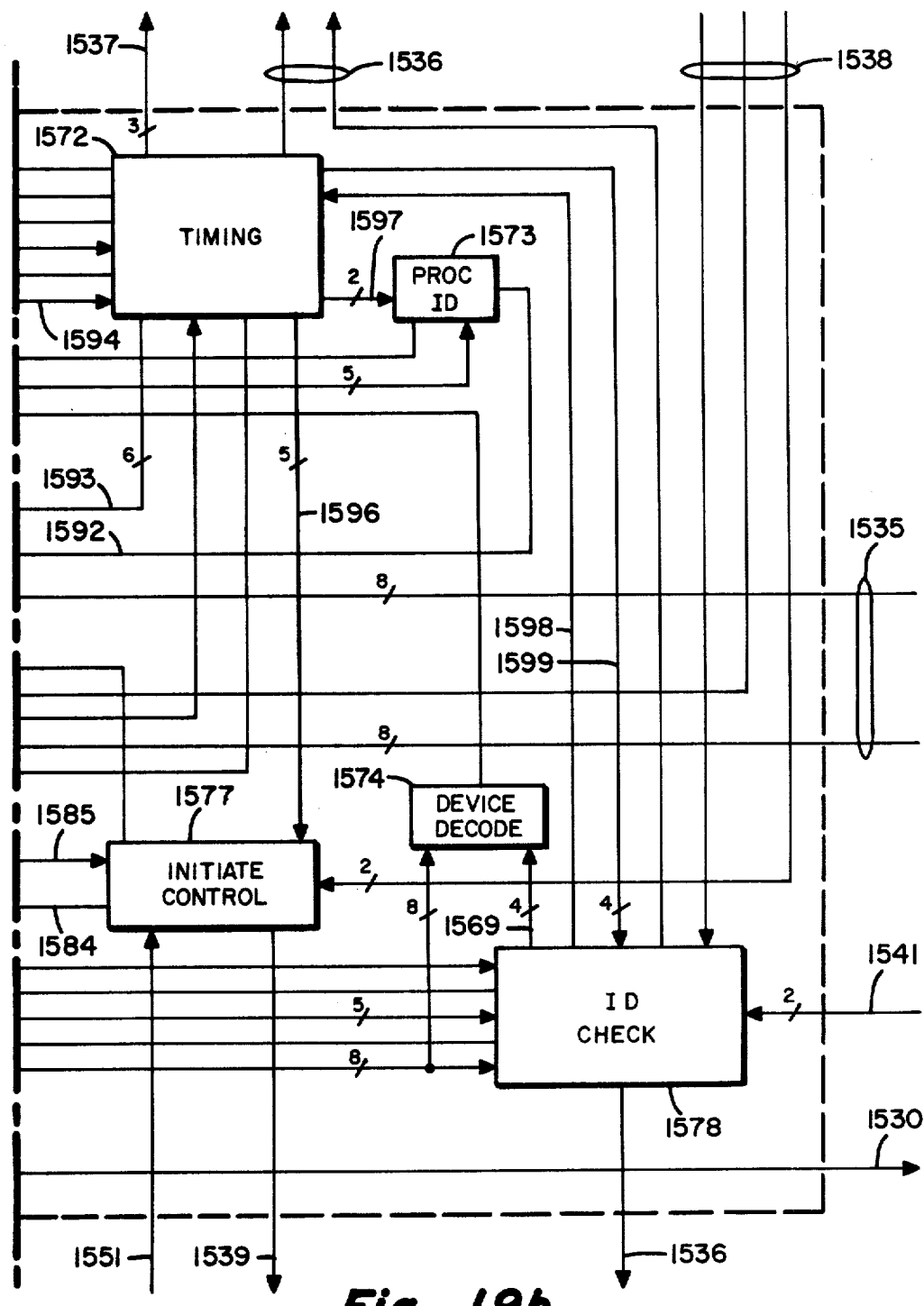
Figure 20A:
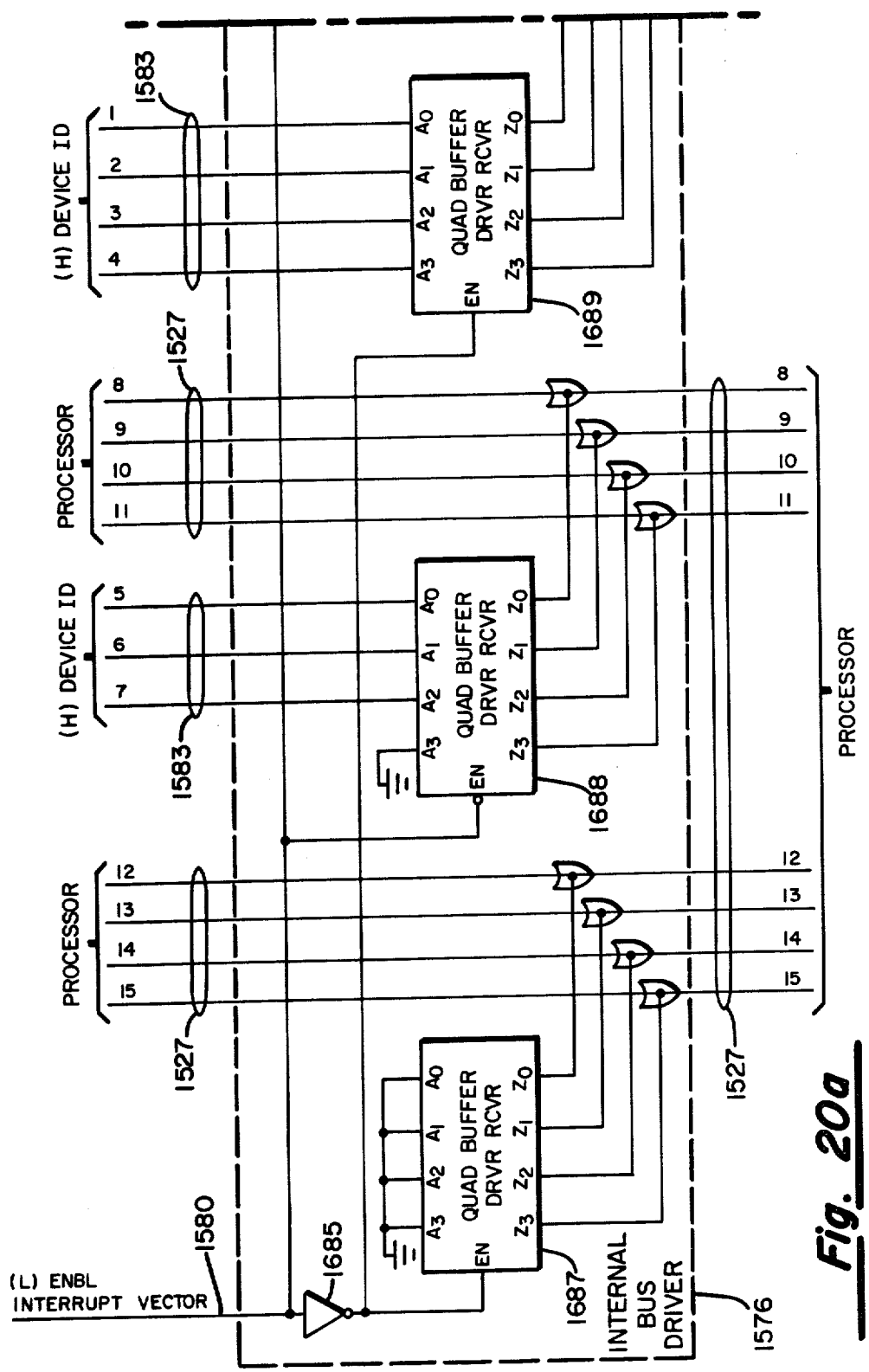
Figure 20B:
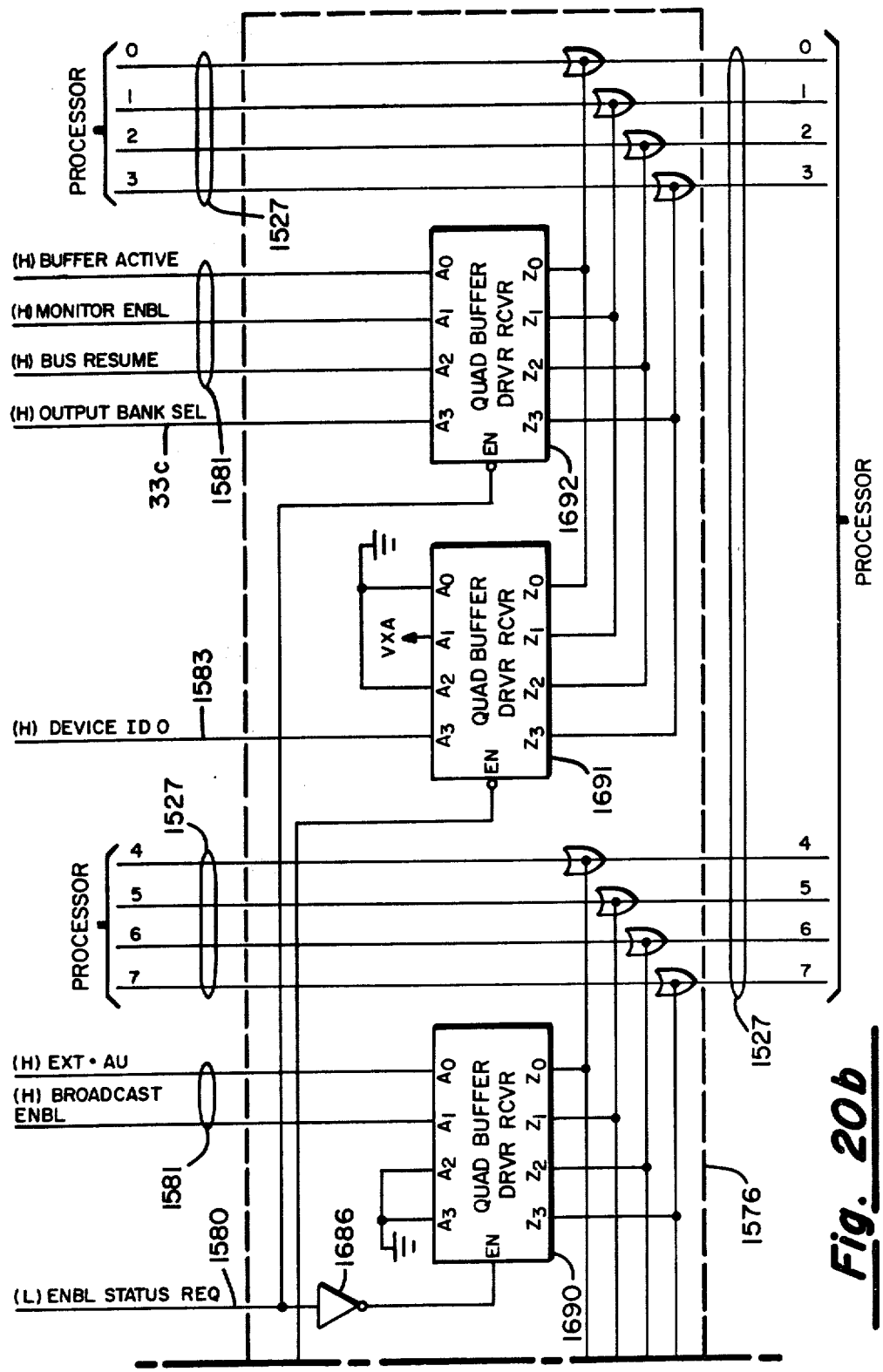
Figure 21A:
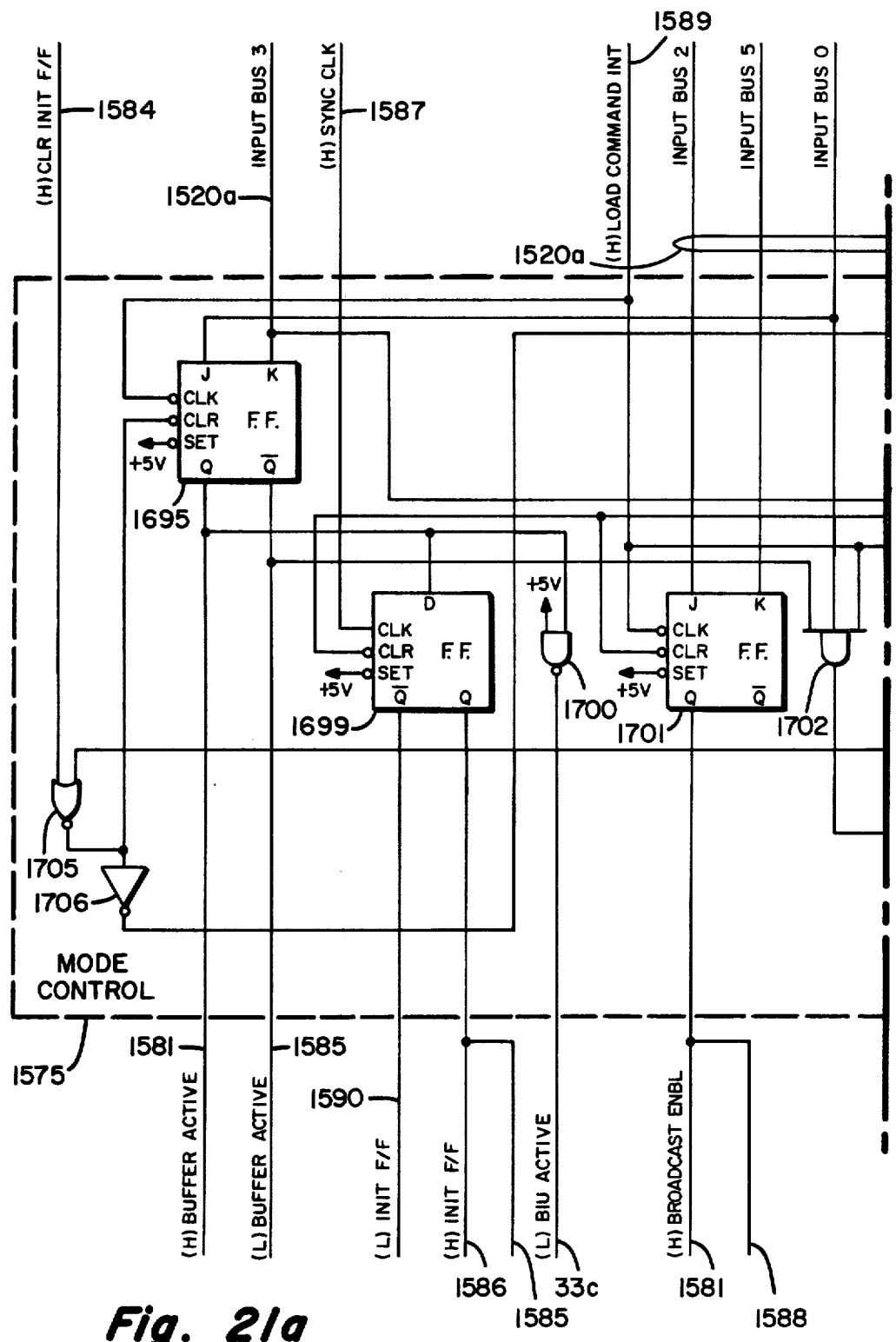
Figure 21B:
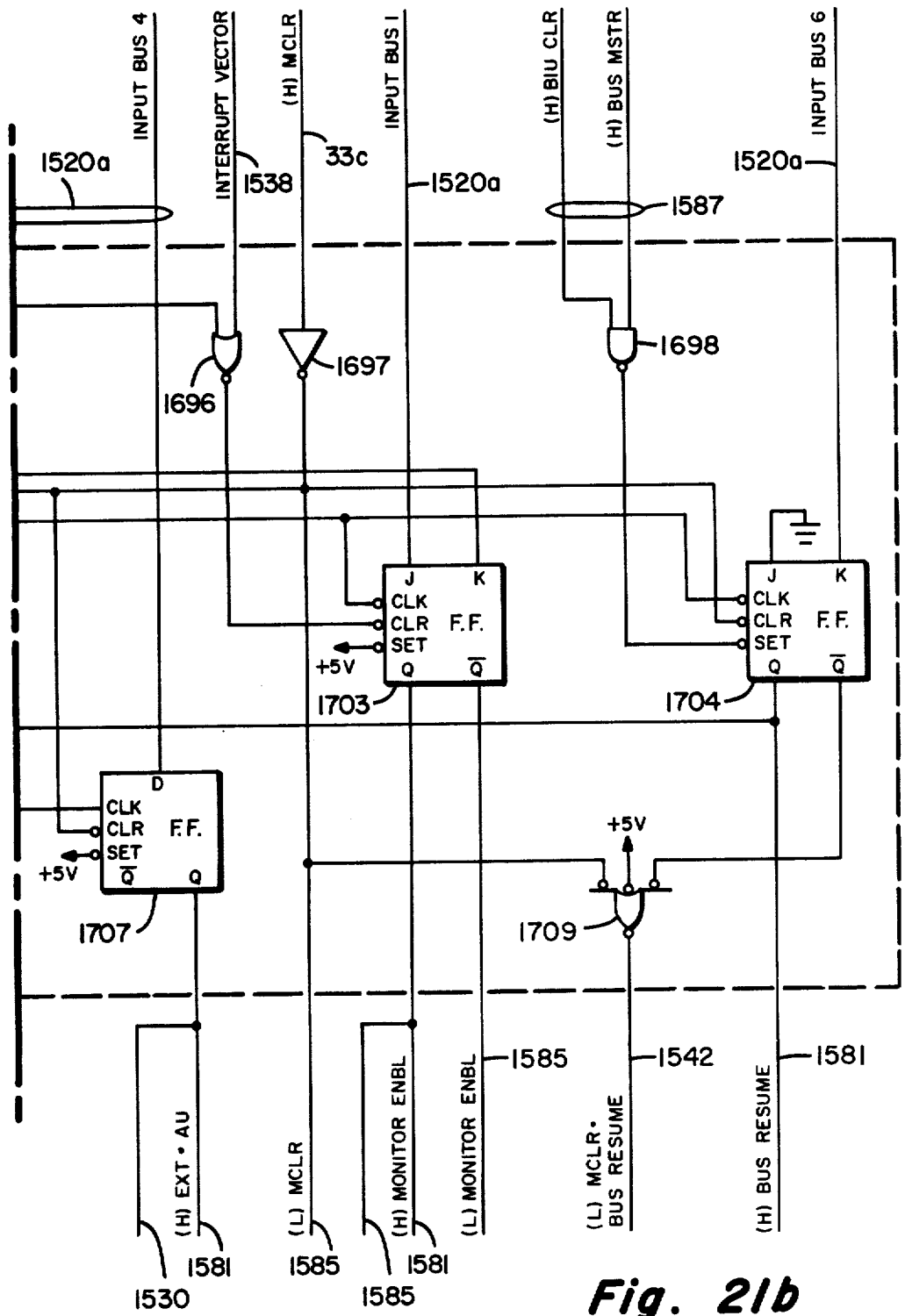
Figure 22A:
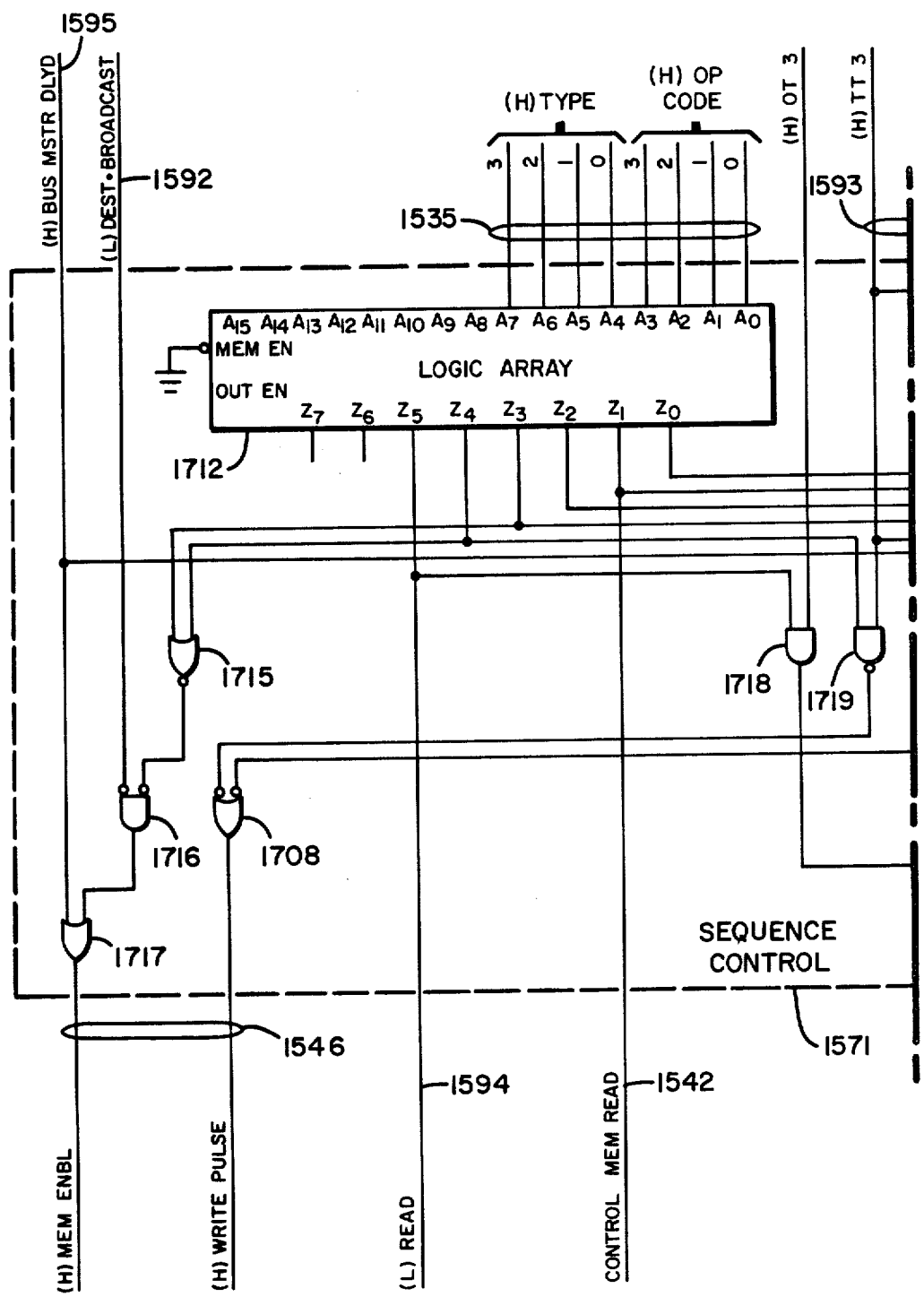
Figure 22B:
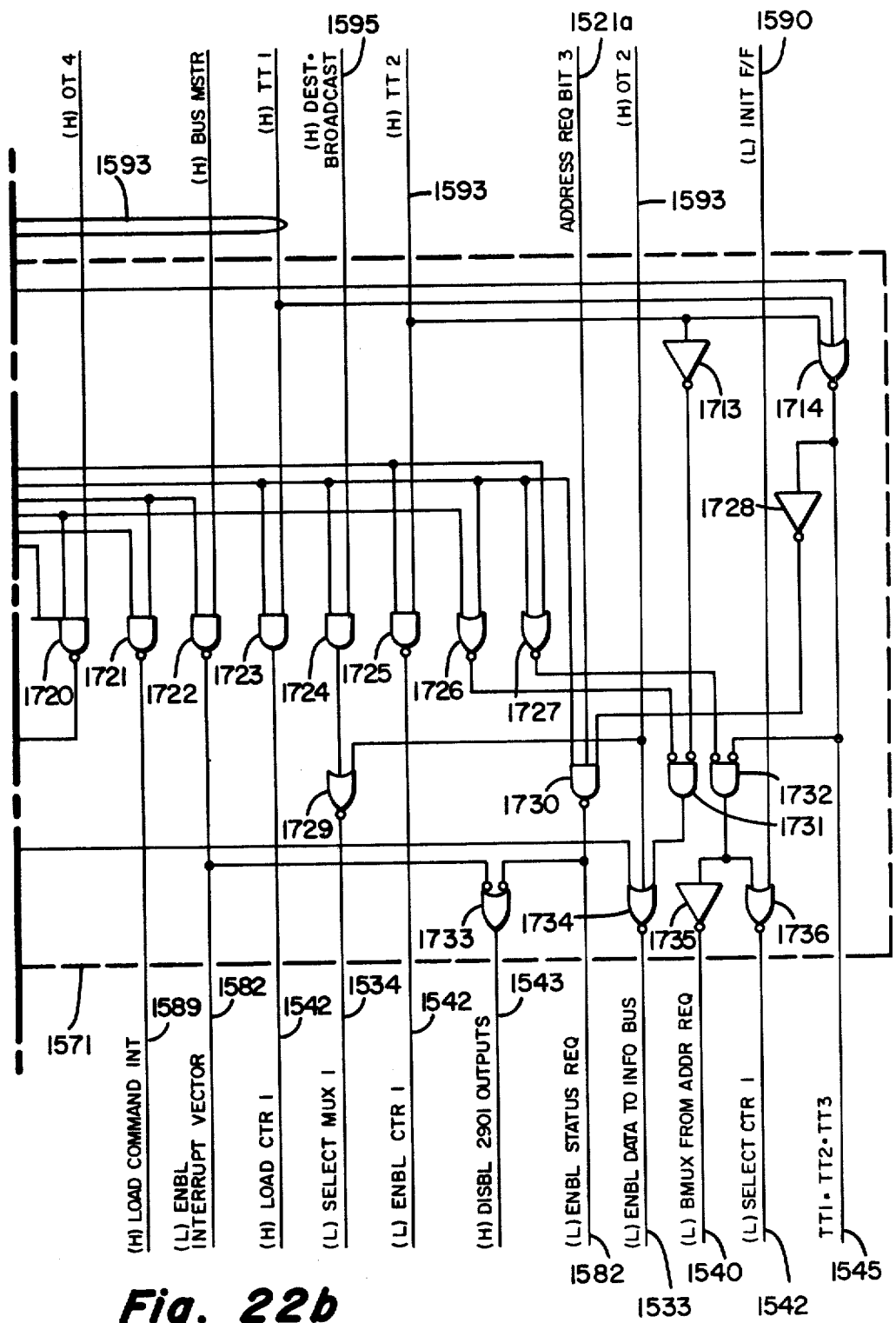

FIG. 33 shows the detailed operation of ARBITRATION CONTROL 112. The basic arbitration function is performed by 8 TO 3 ENCODER 1152 which encodes the highest priority one of the eight position requests (i.e., PR 0-PR 7) into a three bit quantity for transfer to 4-BIT SHIFT RGTR 1157. 4-BIT SHIFT RGTR 1157 has inputs SEL 0 and SEL 1 connected together. Therefore, 4-BIT SHIFT RGTR 1157 is not used for shifting but only for storing the output of 8 TO 3 ENCODER 1152. The outputs of 4-BIT SHIFT RGTR 1157 (i.e., outputs Q0, Q1, Q2, and Q3) become the position select value (i.e., signals PS0-PS3 on corresponding conductors of cable 114). Notice that input A3 of 4-BIT SHIFT RGTR 1157 is constantly high causing the most significant bit position to be loaded high and output Q3 (i.e., PS3) to be high. The clock input (i.e., input CLK) is signal SYNC CLOCK received via line 113a causing 4-BIT SHIFT RGTR 1157 to be loaded synchronously with other MASTER CLOCK 110 controlled functions. Since row address is transferred first followed by column address, 4-BIT SHIFT RGTR 1157 must be loaded twice to complete one arbitration. 4-BIT SHIFT RGTR 1157 is loaded with the output of 8 TO 3 ENCODER 1152 (and a high at the most significant bit position) at the positive going transition of timing signal SYNC CLOCK whenever inputs SEL 0 and SEL 1 are high. Inputs SEL 0 and SEL 1 are made high by exclusive-or 1137 whenever a one of its two inputs is high and a second of its two inputs is low. A first input is made high by gate 1136 if its three inputs are all high. The second input of exclusive-or 1137 is made high by output Q of D-TYPE F.F. 1139 if set. The exact sequence of events to perform arbitration is discussed in more detail below.

FIG. 34 shows the method in which BUS INTERFACE UNITS are addressed using row position (or row address) and column position (or column address). As explained above, a unique 8-bit device identifier code is entered into SWITCH 1815 of each BUS INTERFACE UNIT (see also FIG. 29). As also explained, DEVIDE ID 3 and DEVICE ID 7 must be zero. DEVICE ID 0-2 may be considered a 3 bit column address identifying one of the column positions of FIG. 34. Similarly, DEVICE ID 4-6 may be considered a 3 bit row address identifying one of the row positions of FIG. 34. Therefore, each BUS INTERFACE UNIT is assigned a unique combination of row position and column position such that each may be identified by a different one of the squares on the matrix of FIG. 34.

FIG. 35 shows the effect of the priorities as established by 8 TO 3 ENCODER 1152 (see also FIG. 33) during the arbitration process. The highest priority is the requestor (i.e., BUS INTERFACE UNIT) with a row address of zero and a column address of zero, and the lowest priority is the requestor with a row address of seven and a column address of seven. As shown, row address is the most significant in that a row address of zero and a column address of seven has a much higher priority than a row address of seven and a column address of zero.

FIG. 36 shows the general timing relationships of RESOURCE CONTROLLER 11 to the BUS INTERFACE UNITS. Notice that the ARBITRATION and INFORMATION TRANSACTION cycles are symetrical which permits overlap of these cycles (i.e., INFORMATION TRANSACTION occurring simultaneously with ARBITRATION to determine the bus master for the next INFORMATION TRANSACTION) using common timing sequences and common control lines.

FIG. 37a shows the transitions of signals REQUEST READY and SELECT READY for the ARBITRATION CYCLE. Similarly, FIG. 37b shows the transitions of signals ORIG READY and TERM READY during the INFORMATION TRANSACTION CYCLE. A comparison of FIGS. 37a and 37b will greatly highlight the symmetry of the arbitration and information transaction cycles.

FIG. 38 shows the detailed timing of the ARBITRATION cycle. At the top, the five megahertz output of MASTER CLOCK 110 (i.e., timing signal SYNC clock) is shown. Signal BUSY is shown to illustrate the overlap with the information transaction cycle. Signal REQUEST READY indicates readiness of the BUS INTERFACE UNITS to begin arbitration. The ROW REQUEST and COLUMN REQUEST shown are the function being performed rather than a specific signal. POSITION SELECT is the four bit output of 4-BIT SHIFT RGTR 1157 (see also FIG. 33) with the selected row and column addresses.

Figure 39:
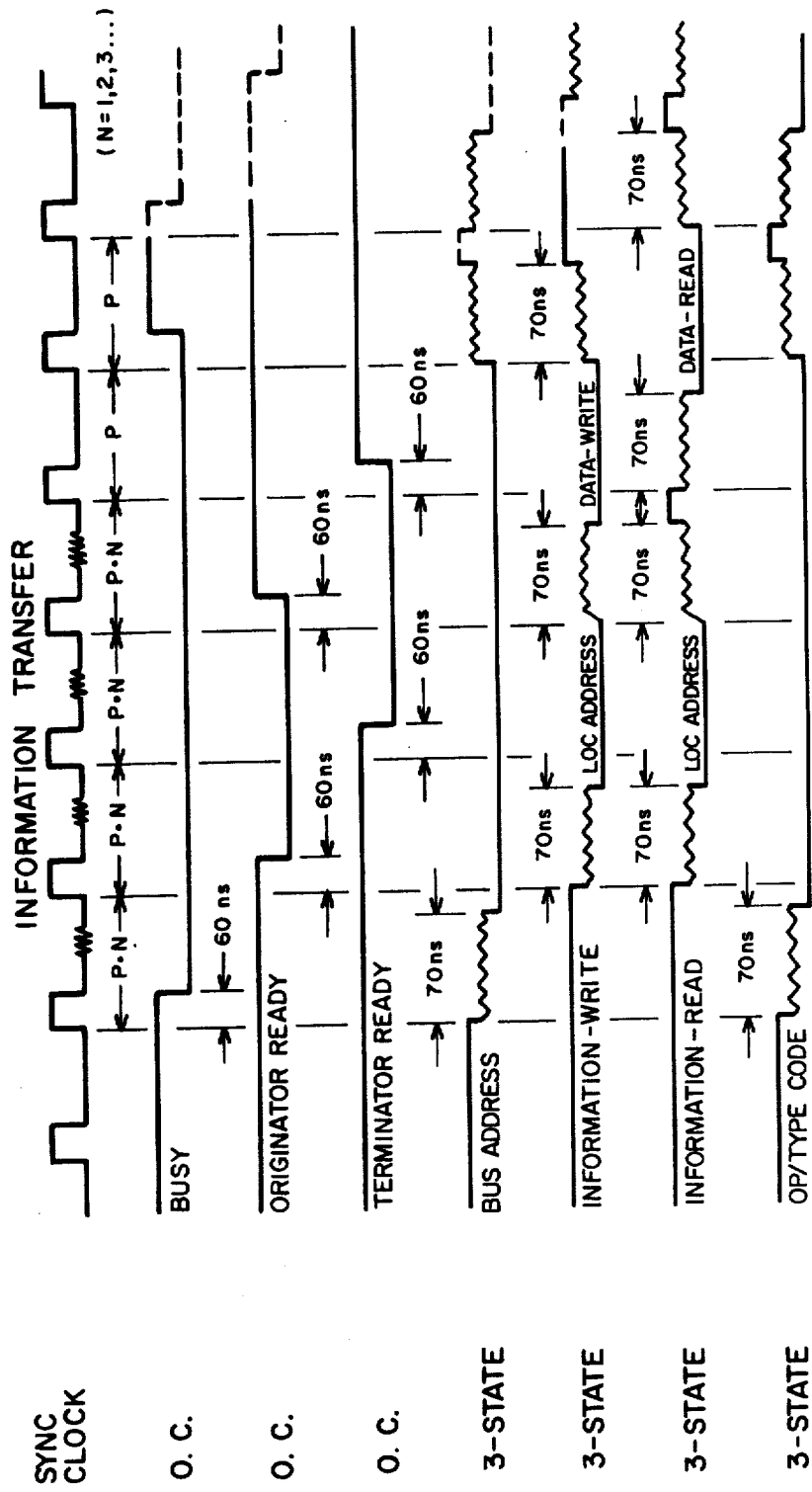
FIG. 39 shows the detailed timing of information transfer.

FIG. 39 shows the equivalent timing details for the INFORMATION TRANSFER (i.e., transaction) cycle. Again signal CLOCK is signal SYNC clock generated by MASTER CLOCK 110. The bus master after selection indicates via signal BUSY that an information transfer is in process. ARBITRATION CONTROL 112 is informed by signal ORIGINATOR READY that the bus master is prepared to transfer data. BUS ADDRESS is the eight bit parallel quantity transferred via dedicated lines to uniquely address the terminator BUS INTERFACE UNIT. INFORMATION-WRITE or INFORMATION-READ is the actual data transfer over INFO BUS BITS 0-15 (see also FIG. 30). Of course, a transaction involves only a write or a read but not both. The OP/TYPE CODE is both TYPE 0-2 and OP CODE 0-2 as explained above. Reference to FIG. 23 shows the decoding of TYPE and OP CODE into conditions 0-5 as explained above. As stated above, in referring to FIG. 23, INPUT VARIABLE bits 0-2 define OP CODE and INPUT VARIABLE bits 4-6 define TYPE.

Using the timing information of FIGS. 34, 35, 36, 37a, 37b, 38, and 39, the operation of ARBITRATION CONTROL 112 will be explained in detail. At power-up, POWER-UP AND MANUAL CLEAR 1129 transfers a low to clear D-TYPE F.F. 1143 and D-TYPE F.F. 1142. At the occurrence of the next timing signal SYNC CLOCK received from MASTER CLOCK 110 via line 113a, D-TYPE F.F. 1143 is set producing a high at output Q. At the occurrence of the next succeeding timing signal SYNC CLOCK, D-TYPE F.F. 1142 is set producing a high at output Q. Notice that D-TYPE F.F. 1143 and 1142 remain set during normal operation and are only used to ensure that two occurrences of timing signal SYNC CLOCK are received following a power-up or manual clear before arbitration is begun. The high output of D-TYPE F.F. 1142 (i.e., output Q) is transferred to gate 1144. A low output of POWER-UP AND MANUAL CLEAR 1129 also generates signal BIU CLR (i.e., low on corresponding conductor of cable 114) via gates 1130 and 1131. D-TYPE F.F. 1135 is set by signal BIU CLR causing output Q to become high transferring a high to a second input of gate 1144. Assuming that signal RR (i.e., request ready) is not present as a low on the corresponding conductor of cable 114, gate 1144 has all three inputs high and transfers a high to input J of JK FF 1145 which becomes set at the next succeeding timing signal SYNC CLOCK as inverted by inverter 1138. At such time as one or more BUS INTERFACE UNITS have a request to use MAIN BUS 10, signal RR (i.e., low on corresponding conductor of cable 114) is received by gate 1144 causing it to output a low to JK FF 1145. At the next succeeding timing signal SYNC CLK, JK FF 1145 is cleared causing output Q to transfer a low to gate 1146. Because signal RR is still present, gate 1146 outputs a high to gate 1136. BURST MODE 1134 will output a high whenever burst mode is not present (see below). Gate 1136 receives a third input of high from output Q of previously set D-TYPE F.F. 1135. Gate 1136, therefore, outputs a high to exclusive-or 1137. The second input of exclusive-or 1137 will be low because D-TYPE F.F. 1139 was cleared from signal BIU CLR or from previous timing cycle. Exclusive-or 1137 will output a high to inputs SEL 0 and SEL 1 causing 4-BIT SHIFT RGTR 1157 to load the row address selected by 8 TO 3 ENCODER 1152. Notice from FIG. 38 that generation of REQUEST READY by any BUS INTERFACE UNIT requires that the row address (i.e., ROW REQUEST) be simultaneously present on lines PR 0–PR 7 (i.e., position request 0–position request 7).

Referring again to FIG. 33, upon being loaded, 4-BIT SHIFT RGTR 1157 transfers the selected row address to MAIN BUS 10 (and hence all BUS INTERFACE UNITS) via cable 114 (i.e., PS0–PS3). D-TYPE F.F. 1139 becomes set at the next succeeding timing signal SYNC CLOCK as a result of the high input from gate 1136. D-TYPE F.F. 1139 then transfers a high from output Q to exclusive-or 1137 causing lows to be present at inputs SEL 0 and SEL 1 of 4-BIT SHIFT RGTR 1157. A high at output Q of D-TYPE F.F. 1139 also is transferred to inverter 1141 which generates signal SR (i.e., Select Ready) as a low on the corresponding conductor of cable 114. Signal SR (i.e., Select Ready) is transferred via MAIN BUS 10 to all BUS INTERFACE UNITS to inform them that row address has been selected and column address will be selected next.

At such time as all BUS INTERFACE UNITS requesting use of MAIN BUS 10 have placed the column address on the position request lines of MAIN BUS 10, signal REQUEST READY (RR) is removed from the corresponding conductor of MAIN BUS 10 and hence cable 114 (see also FIG. 38 for timing relationship). The output of gate 1144 then goes low. JK FF 1145 is set at the next occurrence of timing signal SYNC CLOCK as inverted by inverter 1138. The output of gate 1146 becomes a low which makes the output of gate 1136 low. Since exclusive-or 1137 has one low input (i.e., output of gate 1136) and one high input (i.e., output Q of D-TYPE F.F. 1139), its output goes high for a second time causing inputs SEL 0 and SEL 1 of 4-BIT SHIFT RGTR 1157 to become high. The column address presented by 8 TO 3 ENCODER 1152 is then loaded into 4-BIT SHIFT RGTR 1157 for output to all BUS INTERFACE UNITS via the conductors of cable 114 and MAIN BUS 10 corresponding to position select (i.e., PS0–PS3). Again FIG. 38 should be consulted to view the time relationship of the signals selection of the column address.

Referring again to FIG. 33, it can be seen that CLASS III LO 1156 generates signal CLASS III LO for distribution to all BUS INTERFACE UNITS. CLASS III LO 1156 may be implemented using a single stage flip-flop which may be set or cleared upon determination of system conditions warranting such action. Similarly, BURST MODE 1134 may be implemented using a similar flip-flop to activate burst mode. Notice that burst mode is entered as a result of a low output of BURST MODE 1134 to gate 1136. The setting and clearing of BURST MODE 1134 may be relegated to one or more BUS INTERFACE UNITS depending upon a specific application of the present invention. POWER-UP AND MANUAL CLEAR 1129 may be similarly implemented using common sensors for the power-up condition and a common switch for the manual clear input.

Signal BIU CLR is generated by gate 1131 also as a result of a time-out on MAIN BUS 10. The time-out is generated by ONE SHOT 1122 and 1126 with delay values determined by the resistor/capacitor network associated with each ONE SHOT. In the preferred embodiment the values were chosen to provide about a one millisecond delay for each ONE SHOT. ONE SHOT 1122 is reset by gates 1124 and 1121 as a result of the transition of signal BUSY (i.e., low on corresponding conductor of cable 114) and the state of D-TYPE F.F. 1135. Notice that D-TYPE F.F. is set by signal BIU CLR and will continue to be set by the presence of signal BUSY from inverter 1132. D-TYPE F.F. 1135 is cleared by gate 1140 whenever the output of exclusive-or 1137 is high, D-TYPE F.F. 1139 is set (i.e., output Q is high), and timing SYNC CLOCK is not present (inverted by inverter 1138). Therefore, ONE SHOT 1122 is reset during each arbitration cycle. If a one millisecond time lapses between arbitration cycles, ONE SHOT 1122 triggers ONE SHOT 1126 via gate 1125. After passage of a second millisecond time period, output Q of ONE SHOT 1126 goes high causing gate 1131 to generate signal BIU CLR.

What is claimed is:

1. In a single instruction stream/multiple data stream processor having a control processor for exercising control of said single instruction stream/multiple data stream processor in accordance with said single instruction stream, having a plurality of arithmetic units for performing arithmetic operations upon a plurality of data streams, and having a corresponding like plurality of local memories for buffering said plurality of data streams to and from said plurality of arithmetic units, an apparatus for transferring said plurality of data streams to said like plurality of local memories neither under centralized control arising from any centralized resource controller, nor under distributed control arising from said plurality of arithmetic units, but rather under distributed control autonomous of, and non-conflicting with, the function of said plurality of arithmetic units, said apparatus for the distributed control of data transfers within said single instruction stream/multiple data stream processor comprising:

a main bus means for according the transfer of data thereon;

a plurality of arithmetic unit means each for processing data each connected to, and reading and writing data contained in, an associated one of a plurality of local memory means;

a plurality of said local memory means each for storing data of use, at a time, to an associated one of said plurality of arithmetic unit means, each responsively coupled for reading and writing of said data to said associated one of said plurality of arithmetic unit means, and each responsively coupled also for reading and writing of said data to an associated one of a plurality of bus interface units means; and a plurality of bus interface unit means each coupled to said main bus for transferring data thereon, and also coupled to an associated one of said plurality of local memory means for the reading and writing of data, and for each controlling and effectuating the transferring, through said each one of said plurality of bus interface unit means and via said main bus means and through another one of said plurality of bus interference unit means, of data read and written of the one of said plurality of local memory means associated with said each one of said plurality of bus interface unit means, and of data written and read of the another one of said plurality of local memory means associated with said another one of said plurality of bus interface unit means WHEREIN said controlling and effectuating transferring, via said main bus means and through said each open and said another one of said plurality of bus interface unit means, is autonomously controlled in said each one of said plurality of bus interface unit means which commands said another one of said plurality of bus interface unit means to participate in said controlling and effectuating transferring wherein autonomously controlled does not mean devoid of any outside initiation but does mean that the conduct of said controlling and effectuating transferring without the involvement of any agency outside said each one of said plurality of bus interface unit means;

a main memory means for storing data of use, at times, to plural one of said plurality of arithmetic unit means; and a further one bus interface unit means; identical to each of said plurality of bus interface unit means, associated with said main memory means and responsively coupled to said main bus means for transferring data thereon, and responsively coupled to said associated main memory means for the reading and writing of data stored therein said main memory means IN ORDER THAT said further one bus interface unit means will transfer, through said further one bus interface unit means and via said main bus means and through another one of said plurality of bus interface unit means, data between said memory means and one of said plurality of local memory means;

wherein a first difference between said main memory means and each of said plurality of local memory means is that said memory means is storing data of use, at times, to plural ones of said plurality of arithmetic unit means whereas each said local memory means is storing data of use, at at a time, to one of said plurality of arithmetic unit means;

wherein a second difference between said main memory means and each of said plurality of local memory mean is that said memory means is not responsively coupled to any one of said plurality of arithmetic unit means;

wherein said transfer of said data, of use at times to plural ones of said plurality of arithmetic unit means, between said main memory means and said ones of said plurality of local memory means, which said ones of said plurality of local memory means are responsively coupled for reading and writing to associated ones of said plurality of arithmetic unit means, is thusly a way that said data at times of use to plural said ones of said plurality of arithmetic unit means should be emplaced in locations, mainly said ones of said plurality of local memory means, wherein it may be read and written for said use, wherein that said each one of said plurality of bus interface unit means is controlling and effectuating said transferring autonomously thusly requires that said transferring is without the involvement or control of any of said plurality of arithmetic unit means, or of said control processor, or of any other agency without said bus interface unit means whatsoever;

wherein because said controlling and effectuating said transferring of data resides in each of said plurality of bus interface unit means, then data transfer control within said apparatus may be said to be distributed.

2. An apparatus according to claim 1 further comprising:

a resource controller means responsively coupled to said main bus means for arbitrating requests from ones of said plurality of bus interface unit means for use during said transfer of data of said main bus means;

wherein one resource that said resource controller means controls is thusly, via said arbitrating, the usage of said main bus means.

3. An apparatus according to claim 2 wherein said resource controller means of said apparatus further comprises:

a resource controller means responsively coupled to said main bus means for arbitrating requests for use of said main bus means, responsively coupled to said main bus means for transferring data thereon, responsively coupled to an associated one of said plurality of local memory means for reading and writing of data, and responsively coupled to said control processor for receiving and executing commands causing transfer—through said resource controller means and via said main bus means and through a one of said plurality of bus interface unit means—of data between said associated one of said plurality of local memory means and another one of said plurality of local memory means or said main memory means;

wherein said resource controller means is responsively coupled to said main bus means and to said associated one of said plurality of local memory means for, and does, transfer of data is thusly equivalent to each of said plurality of bus interface unit means, wherein said resource controller means is firstly distinguishable from each of said plurality of bus interface unit means in that it is responsively coupled to said control processor for receiving and executing commands causing transfer of data;

wherein said resource controller means is secondly distinguishable from each of said plurality of bus interface unit means by said arbitrating of said requests for use of said main bus means.

4. A single instruction stream multiple data stream data processor comprising:

a main bus means for transmitting information of the type of (1) data streams and (2) control, said main bus means connected only to single one bus interface unit means, to a resource controller means, and to a plurality of bus interface unit means identical to, and additional to, said single one bus interface unit means;

a control-processor-plus-program means executing a single instruction stream control program for, resultantly to said executing, producing initiation-control information, which said initiation-control information, in times of occurrence and in the contents thereof, does contain when and, indirectly as an index, where multiple said (1) data streams—which said (1) data streams needs be executed, at times, by a plurality of arithmetic unit means—are referenceable, said control-processor-plus-program means connecting only to said resource controller means;

a first memory means for storing said (2) control information, which (2) control information is utilizable by, as and when obtained, said bus interface unit means, said resource controller means, and/or said plurality of bus interface unit means to locate each of multiple said (1) data streams as are stored, at times, in a bulk second memory means and/or in a plurality of local third memory means, said first memory means connecting only to said resource controller means;

a resource controller means responsively coupled between said control-processor-plus-program means, said first memory means, and said main bus means for enabling, responsively to said initiation-control information received from said control-processor-plus-program means, indexed retrieval within said first memory means of said (2) control information, and for transmitting, responsively to part of said (2) control information indexably retrieved, said (2) control information upon said main bus means to a selected one of said bus interface unit means and/or said plurality of bus interface unit means;

a bulk second memory means for storing multiple said (1) data streams, said bulk second memory means connecting only to said single one bus interface unit means;

a single one bus interface unit means responsively coupled between said main bus means and said bulk second memory means for controlling, responsively to said (2) control information received upon said main bus means from said resource controller means, transfers of said (1) data streams between said second memory means and a selected one of additional said plurality of bus interface unit means upon said main bus;

a plurality of arithmetic unit means each for processing a one of multiple said (1) data streams as contained within a corresponding one of a plurality of local third memory means, each said plurality of arithmetic units connected to a corresponding one of said plurality of local third memory means;

a plurality of local third memory means responsively coupled to associated ones of said plurality of arithmetic unit means, each for storing a one of multiple said (1) data streams which is utilized by said connected associated one of said plurality of arithmetic unit means; and a plurality of bus interface unit means, identical to and additional to said single one bus interface unit means, each responsively coupled between said main bus and an associated one of said plurality of local third memory means for controlling, responsively to said (2) control information received upon said main bus means from said resource controller means, transfers of said (1) data streams between said associated one of said plurality of local third memory means and a selected one of either said plurality of bus interface unit means or said single one of said plurality of bus interface unit means;

wherein said (2) control information, responsively to which said single one bus interface unit means and said plurality of bus interface units means do transfer said (1) data streams upon said main bus means, is retrieved from said first memory means and transmitted upon said main bus means by said resource controller means enabled responsively to said control-processor-plus-program means;

wherein said (1) data streams are transferred upon said main bus means by said single one bus interface unit and by said additional plurality of bus interface units which are, in their individual physical existences, distributed;

wherein the (2) control, or initiation, of said transfer of multiple ones of said (1) data streams originates in said control-processor-plus-program means for executing a single instruction stream control program, but the conduct of said transfer of multiple ones of said (1) data streams upon said main bus means is distributed in said single one bus interface unit and in said additional plurality of bus interface units.

* * * * *